INVENTORS
DAVID C. EVANS
MAURICE W. HORRELL
BY
Byard G. Nilsson
ATTORNEY

INVENTORS
BY DAVID C. EVANS
MAURICE W. HORRELL
Byard G. Nilsson
ATTORNEY

Sept. 20, 1966 D. C. EVANS ETAL 3,274,376

DIGITAL DIFFERENTIAL ANALYZER IN CONJUNCTION WITH A GENERAL PURPOSE COMPUTER

Filed May 18, 1955 23 Sheets-Sheet 3

INVENTORS

BY DAVID C. EVANS
MAURICE W. HORRELL

Byard G. Nilsson
ATTORNEY

Fig 17
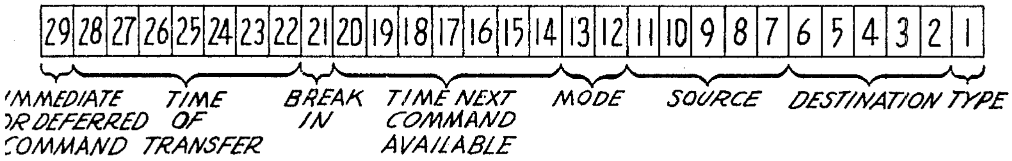
Fig 22
| | | | |
|---|---|---|---|
| PASS | nI11 | nI12 | |
| ADD | nI11 | I12 | |
| ABSOLUTE VALUE | I11 | nI12 | S7 OR D7 |
| SUBTRACT | I11 | I12 | S7 OR D7 |
| PASS VIA ACCUMULATOR | I11 | nI12 | nS7 AND nD7 |
| ADD VIA ACCUMULATOR | I11 | I12 | nS7 AND nD7 |
Fig 25
| | | | | | | | | |
|---|---|---|---|---|---|---|---|---|
| DIGIT POSITION | 1 | 6 | 5 | 4 | 3 | 2 | 1 | |
| DECIMAL EQUIVILANT | SIGN | 16 | 8 | 4 | 2 | 1 | SIGN | |
| BINARY COMPLIMENT OF 18 = | | 0 | 1 | 1 | 1 | 0 | 1 | |
| BINARY COMPLIMENT OF 13 = | | 1 | 0 | 0 | 1 | 1 | 1 | |
| SUM = | 1 | 0 | 0 | 0 | 0 | 1 | 0 | =COMPLIMENT OF 31 |
Fig 8 Fig 9
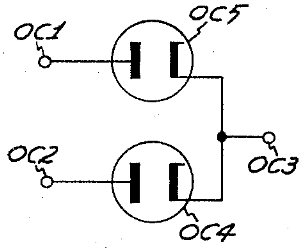
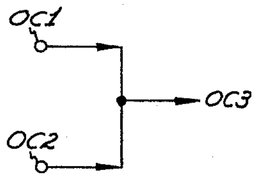
INVENTORS
BY DAVID C. EVANS
MAURICE W. HORRELL
Byard G. Nilsson
ATTORNEY

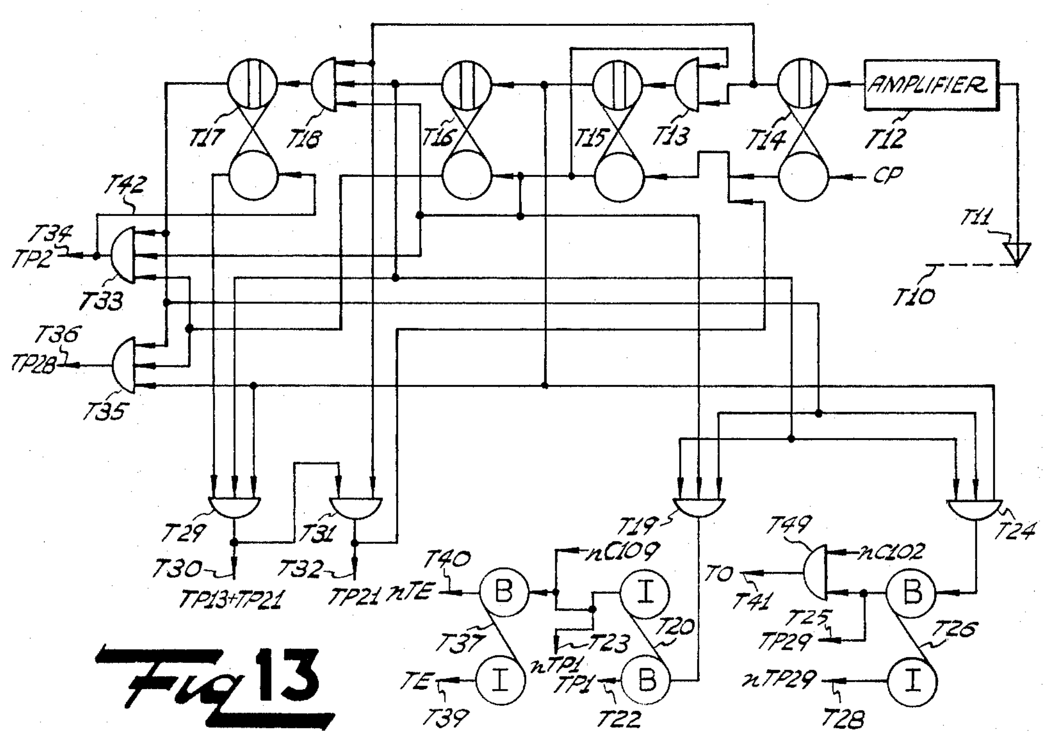
Fig 13
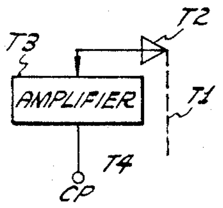
Fig 12
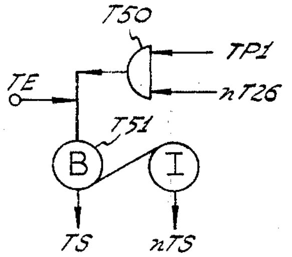
Fig 16
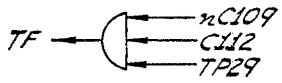
Fig 15
| | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|---|---|---|---|---|
| T14 | | 1 | 1 | | 1 | | | | 1 | 1 | 1 | | | | | | | 1 | 1 | | | | | | | | | | |
| T15 | 1 | 1 | | 1 | | | | | 1 | 1 | | | | | | | 1 | 1 | | | | | | | | | | | |
| T16 | 1 | | 1 | | | | | 1 | 1 | | | | | | | 1 | 1 | | | | | | | | | | | | 1 |
| T17 | 1 | 1 | | | | | | | | | | | | | | | | | | | | | | | | | | 1 | 1 |
Fig 14
INVENTORS
BY DAVID C. EVANS
MAURICE W. HORRELL
Byard G. Nilsson
ATTORNEY INVENTORS
BY DAVID C. EVANS
MAURICE W. HORRELL
Byard G. Nilsson
ATTORNEY

| SOURCE SIGNALS | SOURCE INDEX |
|---|---|
| S0 SU | MAGNETIC STORAGE CIRCUIT 0 |
| S0 SV | MAGNETIC STORAGE CIRCUIT 1 |
| S0 SW | 2 |
| S0 SX | 3 |
| S1 SU | 4 |
| S1 SV | 5 |
| S1 SW | 6 |
| S1 SX | 7 |
| S2 SU | 8 |
| S2 SV | 9 |
| S2 SW | 10 |
| S2 SX | 11 |
| S3 SU | 12 |
| S3 SV | 13 |
| S3 SW | 14 |
| S3 SX | 15 |
| S4 SU | 16 |
| S4 SV | 17 |
| S4 SW | MAGNETIC STORAGE CIRCUIT 18 |
| S5 SU | REGISTER I |
| S5 SV | REGISTER II |
| S5 SW | CHANNEL DA 20 |
| S5 SX | CHANNEL DA 21 |
| S6 SU | RQ REGISTER |
| S6 SV | ID REGISTER |
| S6 SW | PN REGISTER |
| S6 SX | (REG.I)•(REG.II)+(nREG.I)•(PN REG.) |
| S7 SU | ACCUMULATOR |
| S7 SV | (REGISTER I)•(REGISTER II) |
| S7 SW | (nREGISTER I)•(REGISTER II) |
| S7 SX | (REGISTER I)+(REGISTER II) |

| DESTIN. SIGNALS | DESTINATION SIGNALS |
|---|---|
| D0 DU | MAGNETIC STORAGE CIRCUIT 0 |
| D0 DV | MAGNETIC STORAGE CIRCUIT 1 |
| D0 DW | 2 |
| D0 DX | 3 |
| D1 DU | 4 |
| D1 DV | 5 |
| D1 DW | 6 |
| D1 DX | 7 |
| D2 DU | 8 |
| D2 DV | 9 |
| D2 DW | 10 |
| D2 DX | 11 |
| D3 DU | 12 |
| D3 DV | 13 |
| D3 DW | 14 |
| D3 DX | 15 |
| D4 DU | 16 |
| D4 DV | 17 |
| D4 DW | MAGNETIC STORAGE CIRCUIT 18 |
| D5 DU | REGISTER I |
| D5 DV | REGISTER II |
| D5 DW | CHANNEL DA 20 |
| D5 DX | CHANNEL DA 21 |
| D6 DU | RQ REGISTER |
| D6 DV | ID REGISTER |
| D6 DW | PN REGISTER |
| D6 DX | TEST |
| D7 DU | ACCUMULATOR |
| D7 DV | ADD TO ACCUMULATOR |
| D7 DW | ADD TO PN REGISTER |
| D7 DX | COMMAND (SEE BELOW) |

| DESTIN. SIGNALS | SOURCE SIGNALS | COMMAND |
|---|---|---|
| D7 DX | S4 SU | HALT |
| D7 DX | S4 SW | DIFFERENTIAL ANALYSIS – START |
| D7 DX | S4 SX | DIFFERENTIAL ANALYSIS – STOP |
| D7 DX | S5 SU | COMMANDS FROM MAGNET. CIRCUIT 0 |
| D7 DX | S5 SV | COMMANDS FROM MAGNET. CIRCUIT 1 |
| D7 DX | S5 SX | CLEAR REGISTERS RQ, ID & PN |
| D7 DX | S6 SU | MULTIPLY |
| D7 DX | S6 SV | DIVIDE |
| D7 DX | S6 SW | SHIFT DIGITS IN REGISTERS RQ & ID |
| D7 DX | S6 SX | NORMALIZE RQ REGISTER |
| D7 DX | S7 SV | TP1 • ACCUMULATOR |

Fig 19

INVENTORS
BY DAVID C. EVANS
MAURICE W. HORRELL
Byard G. Nilsson
ATTORNEY

INVENTORS
BY DAVID C. EVANS
MAURICE W. HORRELL
Byard G. Nilsson
ATTORNEY

INVENTORS
BY DAVID C. EVANS
MAURICE W. HORRELL
Byard G. Nilsson
ATTORNEY

INVENTORS
BY DAVID C. EVANS
MAURICE W. HORRELL

Byard G. Nilsson
ATTORNEY

INVENTORS
DAVID C. EVANS
MAURICE W. HORRELL
BY Byard G. Nilsson
ATTORNEY

FIG 27

| STEPS | ID REGISTER (MULTIPLICAND) ODD | ID REGISTER (MULTIPLICAND) EVEN | N72 | RQ REGISTER (MULTIPLIER) ODD | RQ REGISTER (MULTIPLIER) EVEN | | PN REGISTER (PRODUCT) ODD | PN REGISTER (PRODUCT) EVEN |
|---|---|---|---|---|---|---|---|---|
| 0 | 011000 | 000000 | 0 | 110000 | 000000 | | 000000 | 000000 |
| 1 | 001100 | 000000 | 1 | 100000 | 000000 | 001100→ | 001100 | 000000 |
| 2 | 000110 | 000000 | 1 | 000000 | 000000 | 000110→ | 010010 | 000000 |
| 3 | 000011 | 000000 | 0 | 000000 | 000000 | | 010010 | 000000 |

FIG 28

$\frac{15}{32} \div \frac{5}{16} = 1\frac{1}{2}$

01111 ÷ 01010 = 1.10000

| Operation | Quotient | Step |
|---|---|---|
| .0 1 1 1 1<br>− .1 0 1 1 0<br>1.0 0 1 0 1 | 1. | STEP 1 |
| .0 1 0 1 0<br>− .1 0 1 1 0<br>1.0 0 0 0 0 | 1.1 | STEP 2 |
| .0 0 0 0 0<br>− .1 0 1 1 0<br>.1 0 1 1 0 | 1.1 0 | STEP 3 |
| .0 1 1 0 0<br>+ .0 1 0 1 0<br>.1 0 1 1 0 | 1.1 0 0 | STEP 4 |
| .0 1 1 0 0<br>+ .0 1 0 1 0<br>.1 0 0 1 0 | 1.1 0 0 0 | STEP 5 |

FIG 29

| INPUTS TO ADDER N16 AT SIGN INDICATING DIGIT POSITION | | | OUTPUT OF ADDER N16 |
|---|---|---|---|
| NX22 SIGN CONTROL | N15 PN REGISTER | N29 CARRY | SUM NEW X22 − |
| 1 | 0 | 0 | 1 |
| 1 | 0 | 1 | 0 |
| 1 | 1 | 0 | 0 |
| 1 | 1 | 1 | 1 |
| 0 | 0 | 0 | 0 |
| 0 | 0 | 1 | 1 |
| 0 | 1 | 0 | 1 |

FIG 31

| OPERATIONAL STATE | C10 | C12 |
|---|---|---|
| WAIT COMMAND | 0 | 0 |
| READ COMMAND | 0 | 1 |
| WAIT TRANSFER | 1 | 1 |
| TRANSFER | 1 | 0 |

INVENTORS
DAVID C. EVANS
BY MAURICE W. HORRELL
Byard G. Nilsson
ATTORNEY

INVENTORS
DAVID C. EVANS
MAURICE W. HORRELL
BY Byard G. Nilsson
ATTORNEY

INVENTORS
BY DAVID C. EVANS
MAURICE W. HORRELL
Byard G. Nilsson
ATTORNEY

INVENTORS
BY DAVID C. EVANS
MAURICE W. HORRELL
Byard G. Nilsson
ATTORNEY

INVENTORS
BY DAVID C. EVANS
MAURICE W. HORRELL
Byard G. Nilsson
ATTORNEY

Sept. 20, 1966 D. C. EVANS ETAL 3,274,376

DIGITAL DIFFERENTIAL ANALYZER IN CONJUNCTION WITH A GENERAL PURPOSE COMPUTER

Filed May 18, 1955 23 Sheets-Sheet 17

INVENTORS

BY DAVID C. EVANS
MAURICE W. HORRELL

Byard G. Nilsson
ATTORNEY

INVENTORS
BY DAVID C. EVANS
MAURICE W. HORRELL
Byard G. Nilsson
ATTORNEY

INVENTORS
BY DAVID C. EVANS
MAURICE W. HORRELL
Byard G. Nilsson
ATTORNEY

INVENTORS
BY DAVID C. EVANS
MAURICE W. HORRELL
Byard G. Nilsson
ATTORNEY

INVENTORS
BY DAVID C. EVANS
MAURICE W. HORRELL
Byard G. Nilsson
ATTORNEY

| NUMBER | DC1 | DC2 | DC3 | DC4 |
|---|---|---|---|---|
| +7 | 0 | 1 | 1 | 1 |
| +6 | 0 | 1 | 1 | 0 |
| +5 | 0 | 1 | 0 | 1 |
| +4 | 0 | 1 | 0 | 0 |
| +3 | 0 | 0 | 1 | 1 |
| +2 | 0 | 0 | 1 | 0 |
| +1 | 0 | 0 | 0 | 1 |
| +0 | 0 | 0 | 0 | 0 |
| -1 | 1 | 1 | 1 | 1 |
| -2 | 1 | 1 | 1 | 0 |
| -3 | 1 | 1 | 0 | 1 |
| -4 | 1 | 1 | 0 | 0 |
| -5 | 1 | 0 | 1 | 1 |
| -6 | 1 | 0 | 1 | 0 |
| -7 | 1 | 0 | 0 | 1 |
| -8 | 1 | 0 | 0 | 0 |

INVENTORS
BY DAVID C. EVANS
MAURICE W. HORRELL
Byard G. Nilsson
ATTORNEY

Sept. 20, 1966 D. C. EVANS ETAL 3,274,376

DIGITAL DIFFERENTIAL ANALYZER IN CONJUNCTION WITH A GENERAL PURPOSE COMPUTER

Filed May 18, 1955 23 Sheets-Sheet 23

INVENTORS

BY DAVID C. EVANS
MAURICE W. HORRELL

Byard G. Nilsson
ATTORNEY 3,274,376

DIGITAL DIFFERENTIAL ANALYZER IN CONJUNCTION WITH A GENERAL PURPOSE COMPUTER

David C. Evans and Maurice W. Horrell, Playa Del Rey, Calif., assignors to The Bendix Corporation, a corporation of Delaware Filed May 18, 1955, Ser. No. 509,271
19 Claims. (Cl. 235—150.31)

This invention relates to methods and apparatus for electronic computing and more particularly to high speed digital stored program type electronic computing.

To solve extremely complex mathematical problems, the art to which this invention relates has developed computing machines capable of rapidly solving problems of a type which may be stated in mathematical terms. Computing machines have found utilization particularly for inventory control, the solution of problems previously impracticable of solution, and the solution of problems which must be solved from rapidly varying data in a relatively short time.

Two broad types of electronic computing machines have developed: the analogue type and the digital type. The digital type computing machines represent numbers and other information generally by means of electrical pulses, each of which may be considered as a binary digit. It is to this general class of computing machines to which this invention is applicable.

In the solution of problems by electronic computing machines, it sometimes occurs that certain parts of a particular problem could best be performed by means of the mathematical process of integration, whereas other parts of the problem could best be performed by various arithmetic processes such as addition, subtraction, multiplication, division, and logical operations. There is, therefore, a need for a single computing machine capable of performing, by the cooperative action of various function performing systems, both arithmetic computing operations and integration computing operations.

The present invention in its more general form contemplates a plurality of information storage devices. Several systems are then associated with the information storage devices for causing predetermined of the information stored in the information storage devices to control the movement of, the combination of, and the operations performed upon certain other predetermined information stored in the information storage devices, in such a manner that various types of arithmetic operations may be performed including multiplication, division, various logical operations, addition, subtraction, and differential analysis by the process of numerical integration.

It is therefore an object of this invention to provide improved methods and systems for electronic computing.

A further object of this invention is to provide an improved method and system of computing for the solution of differential type equations.

A further object of the present invention is to provide a new and improved method and apparatus for high speed computing capable of arithmetic type computing and integration process type computing.

Other and incidental objects of the present invention will become apparent from the following detailed description taken in conjunction with the attached figures in which:

FIGURE 8 shows a circuit diagram of an "or" circuit.

FIGURE 9 shows a symbolic representation of an "or" circuit.

FIGURE 12 shows a symbolic block diagrammatic representation of a portion of a timing circuit.

FIGURE 13 shows a symbolic block diagrammatic representation of a portion of the timing circuit.

FIGURE 14 shows a chart illustrative of the operation of the timing circuit.

FIGURE 15 shows a symbolic block diagram of a portion of the timing circuit.

FIGURE 16 shows a symbolic block diagram of a portion of the timing circuit.

FIGURE 17 shows a chart illustrative of a command word used in the described embodiment of the invention.

FIGURE 19 shows a chart illustrative of the index of commands of the computer of the described embodiment.

FIGURE 22 shows a chart illustrative of the various modes of operation of a portion of the described embodiment.

FIGURE 25 shows a chart illustrative of the manner in which the computer of the described embodiment performs addition.

FIGURE 27 shows a chart indicative of the manner in which the computer of the described embodiment performs multiplication.

FIGURE 28 shows a chart indicative of the manner in which the computer of the described embodiment performs division.

FIGURE 29 shows a chart further illustrative of the process by which the computer performs division.

FIGURE 31 shows a chart indicative of the various states of a control circuit.

Very briefly described, the practice according to this invention is to convert information, as numbers, into electrical pulses or magnetic impulse arrays which, in certain patterns on a time base or recorded on a magnetic material, will be utilized to represent numerical information. The system of representation is to utilize electrical pulses, or magnetic impulses such that the presence or absence of such electrical pulses or magnetic impulses at a particular instant will indicate the presence or absence of a binary digit. In the described embodiment a number may be represented by up to 29 impulses, thereby forming a 29-bit word during one type of operation. The presence or absence of an electrical pulse or magnetic impulse in each of the 29-digit positions, then will be utilized to indicate particular numerical values.

In addition to the utilization of the 29-digit positions to represent numerical information, certain instructions for the operation of the computing machine are also represented by means of similar 29-bit words and are called command words. The command words are utilized to control the interval of the flow of the information within the computer, the address from which information is taken and the address to which information shall flow, and the functions performed upon information flowing within the computing machine. The structure of the command words will be discussed later in the specification in greater detail.

In order to facilitate an understanding of the invention, the system of the described embodiment will be first described in extremely basic block diagram form, indicating in a very general way the functional operation of the system. A detailed description will then follow each of the component block diagrams in order to effect a complete understanding of the described embodiment.

GENERAL STRUCTURE

Figure 1:
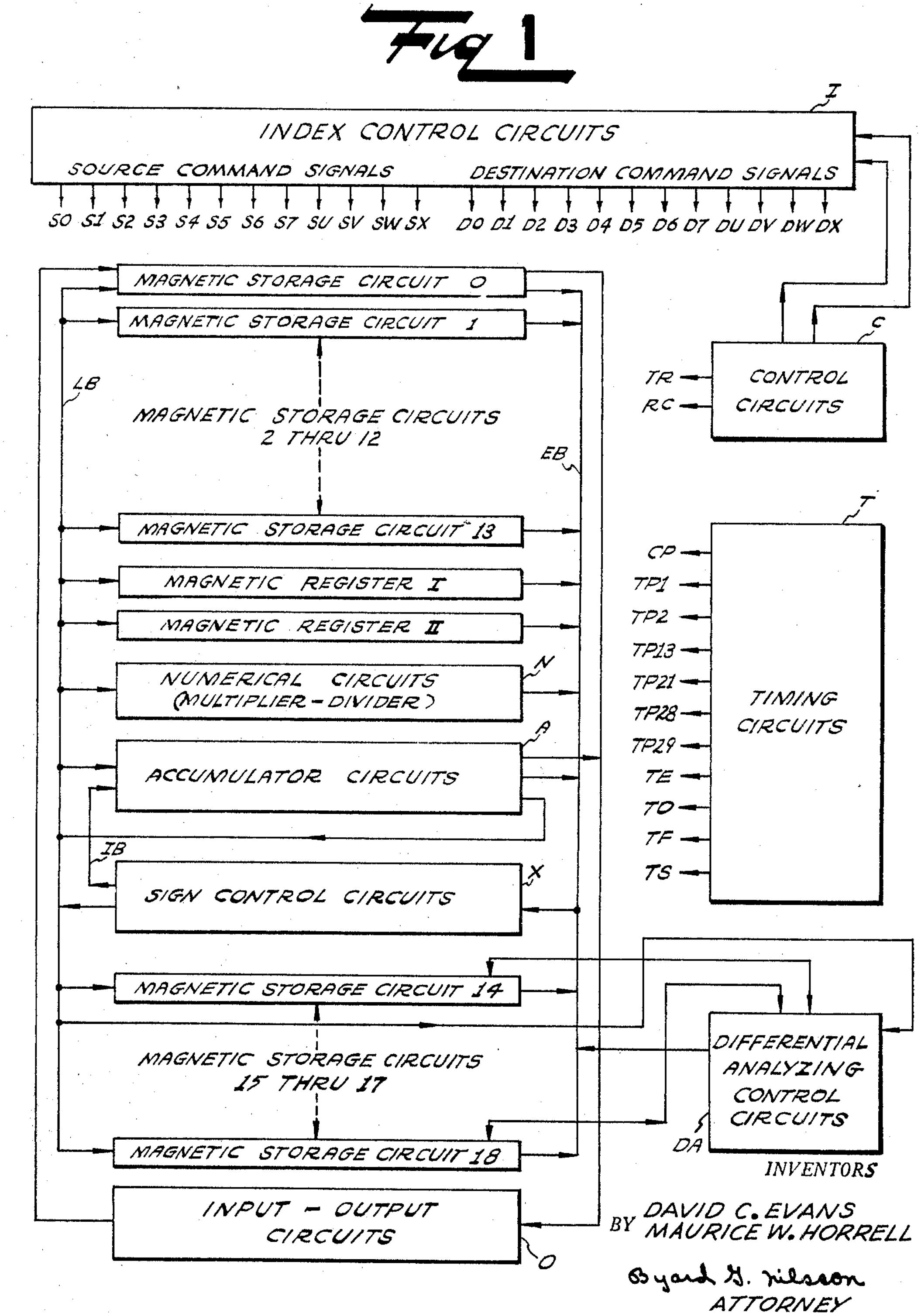
FIGURE 1 shows a block diagrammatic representation of the described embodiment of this invention.

In FIGURE 1 there are shown a number of magnetic storage circuits, magnetic storage circuits 0 through 18. Magnetic storage circuits 0 through 18 are a means of storing numerical information wherein electrical pulses, representing numerical information, are stored in a magnetic medium. A predetermined time delay occurs between the instant the information is delivered to the storage circuit, and the instant which it is received from the storage circuit. Recycling means are then provided such that information cycling in the magnetic storage circuits may be removed during predetermined intervals. New information may also replace other information in the magnetic storage circuits at desired time intervals. The magnetic storage circuits 0 through 18 feed information to an early bus EB. The information which is to be fed into the magnetic storage circuits 0 through 18 is coupled by means of a late bus LB.

Each of the magnetic storage circuits 0 through 18 have a capacity of 108 words, each word being of 29-bit length. In addition to the magnetic storage circuits 0 through 18, which provide the major storage capacity, there are magnetic registers I and II. The magnetic registers I and II are utilized for storing information to which fast access is desired. The magnetic registers I and II have a capacity of only four 29-bit words so that information is recycled rapidly to provide fast access. The magnetic registers I and II are connected to the early bus EB, and the late bus LB, in a manner similar to the magnetic storage circuits 0 through 18.

Also shown in FIGURE 1 is a block N representing a numerical circuit. The numerical circuit N functions to perform arithmetic function operations including multiplication and division, upon numerical information circulated in the computer. The numerical circuit N is connected between the late bus LB, and the early bus EB, in a manner similar to the magnetic drum channels 0 through 18.

FIGURE 1 also includes an accumulator circuit shown as a block A, for accumulating the sum or totalizing numbers in the computer. The accumulator circuit A is connected between the late bus LB and the early bus EB. The accumulator circuit A is also connected directly to input-output circuit shown as a block O. The accumulator circuit A is utilized during the output process, in that, numerical information is placed in the accumulator circuit A prior to being transferred to the input-output circuit O.

Also connected between the late bus LB, and the early bus EB, is a sign control circuit represented by a block X. The sign control circuit X is so connected as to receive information from the early bus EB and pass information to the late bus LB, or to the accumulator circuit A. The sign control circuit X is the only path for information on the early bus EB to return to the late bus LB, therefore, information in transfer will normally pass through the sign control circuit X. The numerical information passing through the sign control circuit X may take either of two alternate paths. The numerical information in the sign control circuit X may pass directly to the late bus LB, or the information may, as an alternative path, pass by means of an intermediate bus IB to the accumulator circuit A, and then to the late bus LB. The alternative path for the information, through the accumulator circuit A, is provided to introduce a predetermined delay in the delivery of the numerical information to the late bus LB.

Differential analyzing control circuit shown as block DA is also connected between the early bus EB and the late bus LB.

In a very general way, one example of the movement of numerical information through the computer is as follows: from a particular magnetic storage circuit, or magnetic register, to the early bus EB, into the sign control circuit X, and thence to the late bus LB, to return to any of the blocks shown connected thereto. Assume now that it is desired to shift numerical information from the magnetic storage circuit 0 into the magnetic storage circuit 1. Such numerical information will be passed from the magnetic storage circuit 0 over the early bus EB, through the sign control circuit X, and over the late bus LB, to the magnetic storage circuit 1. This is simply a straight transfer of information from one location to another, and no operation is performed.

Consider now that it is desired to add one number, which is stored in the form of magnetic impulses recorded in the magnetic storage circuit 0, to another number, which is stored in the magnetic storage circuit 1. Such an addition may be accomplished by passing the numerical information from the magnetic storage circuit 0 to the early bus EB, then through the sign control circuit X with an instruction that addition is to be effected. The sign control circuit X is responsive to the sign of the number, and passes the number either complemented or not, according to its sign, into the accumulator circuit A. The number stored in the magnetic storage circuit 1 will then be taken by means of the early bus EB, passed through the sign control circuit X, then applied to the accumulator circuit A, by means of the late bus LB. Again the sign of the number and the operation to be performed is considered by the sign control circuit X to determine if complementation is necessary. The accumulator circuit A, will in this manner serve to accumulate the numbers received, and hold them in storage with respect to sign. The sign control circuit X effects the proper accumulation with respect to sign by either complementing or not complementing the numerical information.

The transfers of information to perform functions of multiplication and division are carried out in a manner similar to the addition described above, by placing the numerical information to be multiplied or divided in the numerical circuit N, by means of the early bus EB, and instructing the numerical circuit N to perform either a multiplication or a division arithmetic operation.

In the flow of the numerical information from one of the blocks representing various circuits, to the early bus EB, into the sign control circuit X, to be returned to one of the blocks having its input connected to the late bus LB, it shall be noted that the sign control circuit X will inspect all cycling numerical information, to determine the sign of the number. In the event the sign is negative, and in certain situations where the sign is positive, i.e., where subtraction is to be performed, the number shall be complemented. The sign control circuit X, therefore is instructed as to what is to be done, and as to the signs of the numbers, complementation of certain numbers is then effected when such complementation is necessary to the arithmetic operation to be performed. A more detailed explanation of the operation of the sign control circuit X will be made at the time when this circuit is considered in detail.

In certain situations, it may be desirable to effect a shift in the position of storage of certain words within a magnetic storage circuit. Such a shift may be accomplished by transferring the numerical information from one of the magnetic storage circuits 0 through 18, or magnetic registers I or II, to the early bus EB, through the sign control circuit X, and thence via the intermediate bus IB, to the accumulator circuit A, from which the numerical information may circulate back to the late bus LB, to be returned to some location in the storage facilities of the computer. It may therefore be seen that in the transfer, the information by passing through the delay means utilized for storage in the accumulator circuit A, is delayed by a predetermined amount of time, and a shift is effected in the location of the information.

To control the flow of information within the numerical information handling circuits which have just been described, including the magnetic storage circuits 0 through 18, the magnetic registers I and II, the numerical circuit N, the accumulator circuit A, the sign control circuit X, and the differential analyzing control circuit DA, it is necessary that certain other circuits function to generate switching signals to control the numerical information flow.

In FIGURE 1 there is shown a block I which is representative of the index control circuit. The index control circuit I is utilized to determine the address from which numerical information shall be taken to be applied to the early bus EB, and the address to which the information shall go from the late bus LB. In addition, the index control circuit I controls the mode of transfer of numerical information. The index control circuit I receives a portion of a command word, and generates a plurality of switching signals, depending upon the instruction indicated by the portion of the command word received by the index control circuit I. These switching signals are used to switch the numerical information handling circuits such as to control the flow of numerical information. The index control circuit I, upon receiving the portion of the command word which contains the address and mode of transfer instruction, will generate a plurality of source command signals, and a plurality of destination command signals. The source command signals so generated will include source command signals S0, S1, S2, S3, S4, S5, S6, S7, SU, SV, SW, and SX. The destination command signals will be generated by the index control circuit I, and will include signals D0, D1, D2, D3, D4, D5, D6, D7, DU, DV, DW, and DX. The source and destination command signals are two state signals, i.e., the amplitude of such signals is either relatively high or it is relatively low. In the event that a signal is high, a digit is indicated, in the event that a signal is low, no digit is indicated. The occurrence of certain high source command signals will indicate the address of numerical information which shall be operated upon during a particular interval, and the presence of certain high destination command signals will indicate the destination address of the information operated upon. It may, therefore, be seen that depending upon which of the source command signals are high, and which of the destination command signals are high, certain addresses will be indicated from which the information shall be taken, and to which the information shall be sent. The source command signals and the destination command signals will, therefore, function to control which of the circuits connected to the early bus EB, and the late bus LB, shall be operatively interconnected through the signal control circuit X. The mode-of-transfer signals, which are also set up in the index control circuit X, will be later discussed. The function of the mode-of-transfer control signals is to instruct the sign control circuit X in the operation to be performed upon the numerical information undergoing transfer.

It may therefore be seen, that as previously stated, certain of the 29-bit words are utilized to represent numerical information, and these words are circulated in the numerical information-handling circuits, while certain other of the 29-bit words are utilized to represent commands, i.e., the command words, and are used to instruct the computer as to the method of handling the numerical information-representing words.

The index control circuit I is utilized to indicate the operation to be performed by information-handling circuits, i.e., those circuits handling the 29-bit numerical words. On the other hand, the control circuit C of FIGURE 1, acts as the means of controlling the time of execution of particular operations to be performed. The control circuit C receives the portion of the command word which is not utilized by the index control circuit I, and provides the numerical information-handling circuits with signals which indicate sequences of operation.

The control circuit C generates a signal TR, which indicates an interval of time during which information shall be transferred within the information-handling circuits, and a signal RC, which indicates a time interval when a new command should be read and passed into the index control circuit I, and the control circuit C. The signals RC and TR are two state signals and when they are high they indicate read-command and transfer periods, respectively.

The operation of the computer may be divided into four states. First, a command word is read and set up in the index control circuit I and the control circuit C. During this read-command state, the signal RC is high and a new command word is taken from one of the magnetic storage circuits 0 or 1, which are utilized to store command words. During the next state, the computer will wait the occurrence of a transfer signal during which the actual transfer of numerical information shall be executed. The wait-transfer state is provided to allow for the availability of the desired numeral information that is to be transferred. With the termination of the wait-transfer state, the machine will go into the state of transfer, during which the TR signal will be high, and the information will actually be transferred within the information handling circuits. At the end of the high transfer signal TR, indicating the termination of the transfer state, the computer will go into a state of wait-next-command, during which the machine idles, waiting until a new command may be set up in the index control circuit I and the control circuit C.

The control circuit C generates the signals TR and RC which indicates the state of operation of the computer. The control circuit C may, therefore, be thought of as performing the function of telling the computer exactly when and for how long to perform a particular operation.

A similar form of basic information flow in a computer is shown and described in a copending U.S. patent application, Serial Number 505,186 of Dr. Harry Huskey, filed May 2, 1955, now Patent No. 2,982,472.

In the operation of the computer, to analyze different equations, the differential analyzing control circuit DA cooperates primarily with the index control circuit I and the magnetic storage circuits to effect the control of the movement of numerical information in such a manner as to provide differential analyzing type operation. The magnetic storage circuits 14 through 18 are provided with connections to the differential analyzing control circuit DA, in addition to connections from the early bus EB, and the late bus LB. The operation of the system to perform differential analysis will be later described in detail as will the operation of the other blocks of FIGURE 1 to perform various functions.

During the operation of the overall computer, it is necessary to have facilities for placing information into the computing system, and for removing information from the computing system. Such a function is performed by the input-output circuit 0. The input-output circuit 0 is utilized as the connecting link between the operator of the machine and the computer. Numerical information is transferred into the computer by means of the input-output circuit 0, shifting the numerical information to the magnetic storage circuit 0, by means of direct connections. The transfer of numerical information out of the computer is effected by transferring such numerical information to the accumulator circuit A, by means of the early bus EB and the late bus LB, then by means of a direct connection to the input-output circuit 0.

It shall be understood that there are provided facilities for transferring information from the information-handling circuits into the controlling circuits comprising the index control circuit I, and the control circuit C. However, these facilties are not shown in FIGURE 1, as it is desired only to show the basic flow of information within the computer.

During the operation of the computer, it is necessary to provide certain timing signals which act to time the operations within the computer. The timing circuit shown in block T of FIGURE 1 provides the necessary timing signals. The basic timing signal is the so-called clock pulse CP, which occurs at regularly scheduled intervals, and performs the basic timing of the computer. The word time of the computer consists of 29 clock pulse CP periods, and each clock pulse CP allows for one digit position, i.e. bit.

Within the 29-bit word, it is necessary to form certain timing pulses which occur simultaneously with various of the clock pulses CP. The necessary timing pulses include a timing pulse TP1, coinciding in time to the first clock pulse of each word; timing pulse TP2, coinciding in time to the second clock pulse of each word; timing pulse TP13, coinciding in time to the 13th clock pulse of each word; timing pulse TP21, coinciding in time to the 21st clock pulse of each word; and timing pulse TP29, coinciding in time to the 29th clock pulse of each word. The timing circuit T is utilized in connection with the computer to generate the timing signals enumerated above. In addition, certain timing pulses are formed by the timing circuit T. The special timing signals are special timing pulses TE, TO, TF, and TS. These special timing signals will be described later. However, it is to be understood that they are signals which do not occur in coincidence with a particular clock pulse during each word time, but occur at particular word intervals. These special timing pulses are utilized to time certain of the various movements of information within the computing system. All the timing pulses form two-state signals which are of a high amplitude at a time coinciding to the time period of which they are indicative.

The connections of the timing signals to various other parts of the computer are not made in the block diagram shown in FIGURE 1 in order to simplify the diagram showing the basic movement of numerical information within the computer.

The block diagram shown in FIGURE 1 has been set forth in order to show the manner in which information, i.e. numerical data, flows from various function performing circuits within the machine to various other function performing circuits in such a manner as to effect calculation and the basic modes of control. The specification will now describe the various basic electronic building blocks which will be utilized to make up the described embodiment; and, in addition, a consideration of the terminology utilized will be made.

COMPONENTS AND TERMINOLOGY

In the construction of the computer, certain circuits are repeatedly used to make up the system. Each of these certain circuits will, therefore, be described in detail herein, and associated with a particular symbol which will then identify that particular component circuit throughout the specification.

Figure 2:
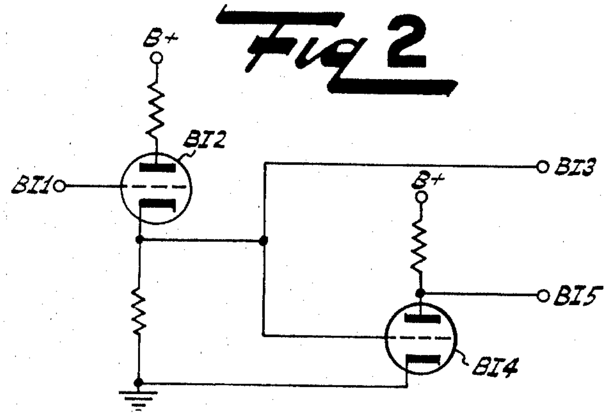
FIGURE 2 shows a circuit diagram of a buffer inverter circuit.
Figure 3:
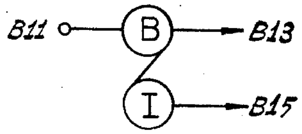
FIGURE 3 shows a symbolic representation of a buffer inverter circuit.

Consider first a buffer inverter circuit as shown in FIGURE 2 in a circuit diagram, and in FIGURE 3 in a symbolic representation. The buffer inverter circuit functions to derive two output signals, each having two states, from a single input signal having two states. Consider the application of a high signal at the terminal BI1, of FIGURE 2. The high signal will be fed to the grid of a tube BI2, wherein, due to cathode follower action, there will be generated a somewhat amplified high signal at the terminal BI3. The action of the tube BI2, as a cathode follower, is in accordance with a well-known form of amplification, and further description is not deemed necessary. The terminal BI3 is coupled to a grid of a vacuum tube BI4. The vacuum tube BI4 acts in the usual manner of a plate output amplifier, and inverts the two-state signal which appears at its grid, causing an amplified two-state signal to appear at the terminal BI5.

Referring now to FIGURE 3, there is shown a symbol which will be utilized throughout the specification to indicate the buffer inverter circuit shown in FIGURE 2. The terminals of the symbol shown in FIGURE 3 are labelled similarly to the terminals of the schematic diagram of FIGURE 2.

The function performed by the buffer inverter circuit, as symbolically shown in FIGURE 3, and as shown in the circuit diagram of FIGURE 2, is to receive a two-state signal at its terminal BI1, amplify the signal and deliver the signal at the terminal BI3, and to amplify and invert the signal and deliver it at the terminal BI5. It may therefore be seen that if a signal received at the terminal BI1 is relatively high, then the signal at the terminal BI3 will also be relatively high, however, the signal at the terminal BI5 will be relatively low. Conversely, in the event that a signal which is applied at the terminal BI1 is relatively low, then the signal appearing at the terminal BI3 will also be relatively low, however, the signal appearing at the terminal BI5 will be relatively high.

By reason of the fact that digital computation is used in the practice of this invention, and that the computer uses binary numbers, it is necessary to provide a bi-stable device which is capable of storing a single digit. A bi-stable device is one which has two stable states, and which is capable of being changed from one state of stability to another state of stability at a relatively high speed. Such a bi-stable device is generally referred to in the electric computer art as a flip-flop circuit.

Figure 4:
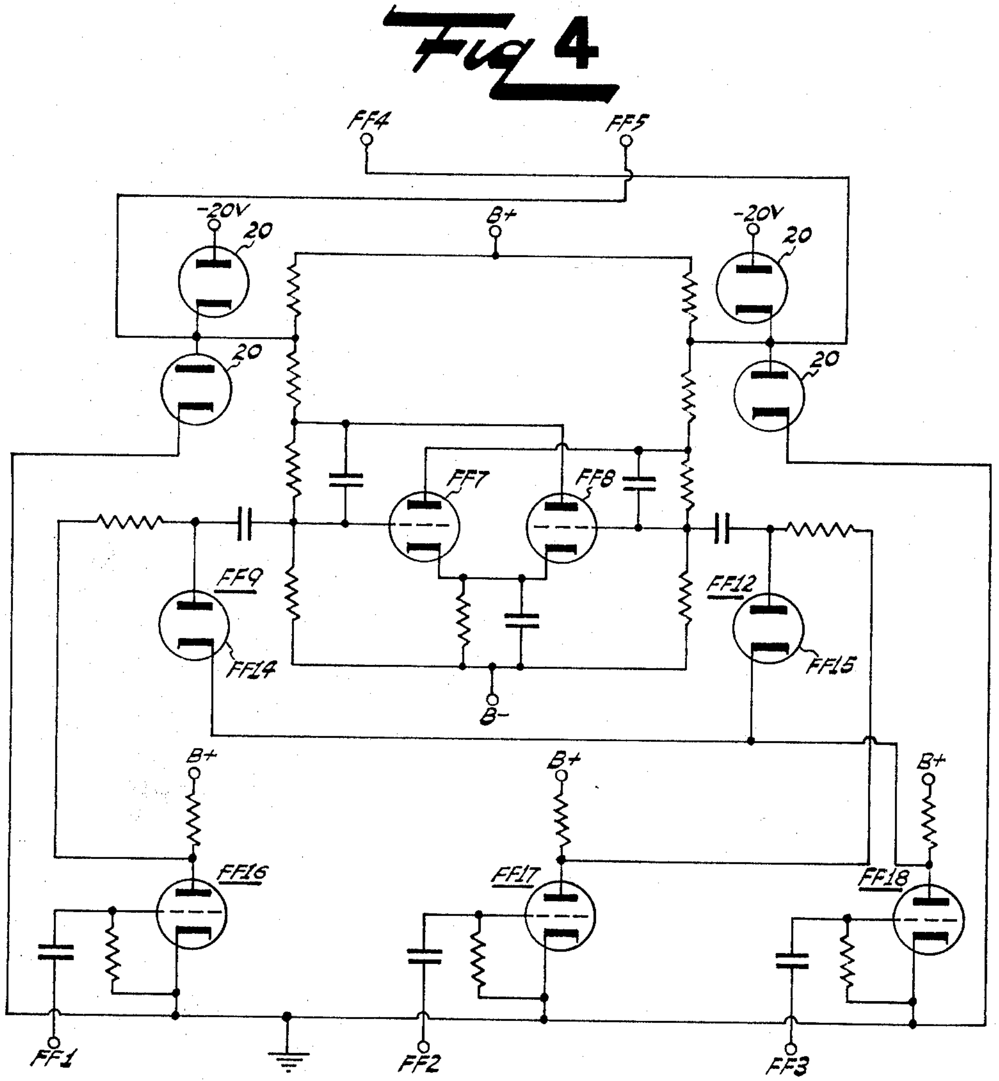
FIGURE 4 shows a circuit diagram of a flip-flop circuit.
Figure 5:
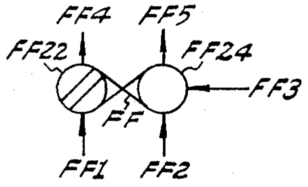
FIGURE 5 shows a symbolic representation of a flip-flop circuit.

FIGURE 4 shows a circuit diagram representing a flip-flop circuit. The flip-flop circuit shown in FIGURE 4 will be used throughout the specification as the two-state device necessary for storing a single binary digit. The flip-flop circuit diagram shown in FIGURE 4 has three input terminals, terminals FF1, FF2, FF3, and two output terminals FF4 and FF5. FIGURE 5 shows a symbolic representation which will be utilized to represent the flip-flop circuit shown in FIGURE 4.

In FIGURE 4 there are shown two trode vacuum tubes, FF7 and FF8. The two triodes FF7 and FF8 have interconnections between their plates and grids, such that depending upon which of the triodes FF7 or FF8 is set into conduction, the other of the triodes will be held in a cut-off state. Such an arrangement is common and well known in the art of bi-stable devices. The terminal FF1 is connected through a signal inverting amplifier FF16 and an input circuit FF9 to a grid of the tube FF7. A terminal FF2 is connected through a signal inverting amplifier FF17 and an input circuit FF12 to a grid of the triode FF8. A terminal FF3 is connected into both of the input circuits FF9 and FF12 through a signal inverting amplifier FF17 and by means of a pair of diodes respectively FF14 and FF15.

Assume that the circuit shown in FIGURE 4 is in operation, and that the triode FF7 is in a conductive state, and by its plate voltage holds the triode FF8 in a cutoff state. In the event now that the terminal FF1 receives a more positive signal, the grid of the tube FF7 will be reduced in potential due to the inverting action of the amplifier FF16, however, the reduction in potential at the grid of the tube FF7 is not sufficient to cut off the tube FF7 until such time as a positive signal is received at the terminal FF3. The positive signal at the terminal FF3 is passed through the amplifier FF17 to cause the grid of the tube FF7 to become more negative. On the arrival of the positive signal at the terminal FF3, the triode FF7 will be cut off, and as the plate of the triode FF7 rises toward a positive value, the grid of the tube FF8 will also become more positive until such time as the triode FF8 enters a state of conduction. In this manner the state of the flip-flop circuit shown in FIGURE 4 may be altered. The circuit is symmetrical, and it may therefore be seen that the application of a more positive, i.e., high signal, at either of the terminals FF1 or FF2, accompanied by a high signal applied to the terminal FF3 will cause the flip-flop circuit to change its state. The two-state output signals from the flip-flop circuit appear at the terminals FF4 and FF5. In the event that the triode FF8 is in a conductive state, then the signal at the terminal FF5 will be low, and due to the nonconducting state of the triode FF7 the signal at the terminal FF4 will be high.

Diodes 20 are connected to the output terminals FF4 and FF5 to maintain the two possible states of the output signals regulated.

In the use of the flip-flop circuit of FIGURE 4 in the computer, the signals applied at the terminal FF3 are the clock pulses CP. The clock pulses CP may therefore be seen to synchronize the change of state of the flip-flop circuits in the computer.

Referring back now to FIGURE 5, it may be seen that the input terminals FF1, FF2 and FF3 coincide to the similarly labelled input terminals of FIGURE 4. Functionally, the symbol shown in FIGURE 5 is such that the circle FF22 and the circle FF24 indicate the two tubes FF7 and FF8, each of which may carry an electrical current to the exclusion of the other. The circle F22 carries two diagonal lines to indicate that during the time when the flip-flop circuit stores a 0, the side of the flip-flop circuit having the two diagonal lines is in a nonconducting state. That is, the output from the circle FF22, as it appears at the terminal FF4, will be low at a time when the flip-flcp circuit of FIGURE 5 is in a zero state, and high when the flip-flop circuit is in a set state indicating the presence of a one digit. The output from the terminal FF5 will be opposite to the output on the terminal FF4. In the event that it is desired to alter the state of the flip-flop circuit, it will be necessary that a high signal be applied to the terminal FF1 or FF2 of the flip-flop circuit depending upon which side of the flip-flop circuit is presently conducting, and in addition, a clock pulse CP must be applied at the terminal FF3. It may therefore be seen that the change of state of the flip-flop circuit shown in FIGURE 4 may only occur at the interval of a clock pulse CP.

At the time when a digit is stored in a flip-flop circuit, as the flip-flop symbolically shown in FIGURE 5, the output from the circle containing lines is high thereby providing a high output at the terminal FF4, and a low output at the terminal FF5. Either of the two-state signals from the flip-flop circuit of FIGURE 4 will indicate the presence or the absence of a digit in the flip-flop circuit. At a time when a digit is present in the flip-flop circuit shown in FIGURE 5, which shall be labelled FF, a signal, also labellel FF, will appear high at the terminal FF4. That is, the signal FF which has two states will be taken from the terminal FF4 of the flip-flop circuit FF, and will be high when a digit is stored in the flip-flop FF, and low when no digit is so stored. The output from the circle having lines will thus be high when a flip-flop circuit contains a one digit.

There may be a need in the computer for a signal which is the negation of the signal FF. Such a signal shall be termed *n*FF and will be taken from the terminal FF5. The signal *n*FF will be a two-state signal which is high when there is no one digit stored in the flip-flop circuit FF, and low when there is a digit stored in the flip-flop circuit FF.

At a time when a flip-flop circuit contains a digit, i.e., the circle containing the lines is providing a high output, the flip-flop circuit will be said to be in a set state. At a time when no one digit is present in a flip-flop circuit, the flip-flop circuit will be said to be in a reset state. Due to the complexity of the described embodiment, in many cases the terminal FF3 is not shown, however, it is to be understood, that in each case, except when so stated, the change of state of the flip-flop devices may occur only during the time of a clock pulse CP.

Figure 6:
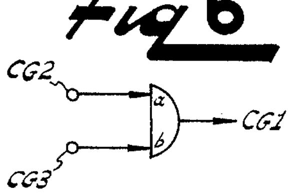
FIGURE 6 shows a symbolic representation of a gate circuit.

For numerical information to be transferred from one part of the computer to another, it is frequently necessary to condition the transfer of the numerical information in a logical fashion, by requiring the presence of two or more high signals. Such a conditional transfer is effected by an "and gate," i.e. coincidence gate. Throughout the description, the coincidence gates are represented by the symbol shown in FIGURE 6. The electrical circuit represented by the symbol shown in FIGURE 6, is shown schematically in FIGURE 7. The function of the gate circuit diagrammatically shown in FIGURE 6 is to provide a high output signal at the terminal CG1, at a time when there is a high signal at both the input terminals CG2 and CG3, but during other times provide a low signal at the terminal CG1.

Figure 7:
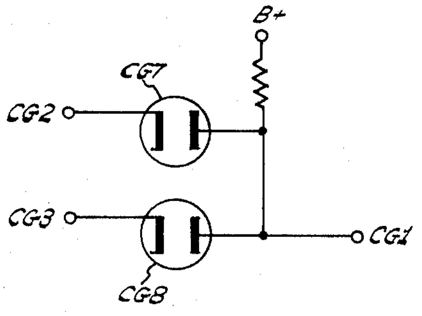
FIGURE 7 shows a circuit diagram of a gate circuit.

A representation of the circuitry required to perform the function of a coincidence gate is shown in the FIGURE 7. It will be evident to those skilled in the art, that the circuitry shown in FIGURE 7 is a typical diode coincidence gate, wherein the particular output effected at the terminal CG1 depends upon the coincidence of the two high signals applied at the terminals CG2 and CG3. Due to the nonlinear characteristic of the diodes CG7 and CG8, if either the terminal CG2, or the terminal CG3 is at a relatively low voltage, or receives a low signal, then the output lead CG1 will also be at a low voltage. However, in the event that both the inputs to terminals CG2 and CG3 receive high signals, then the diodes CG7 and CG8 will not be permitted to conduct, and the signal appearing at the terminal CG1 will be high.

Referring back now to the symbolic representation shown in FIGURE 6, the terminology throughout the specification is often expanded, for purpose of simplification of description, to indicate the qualification of a gate circuit in a step-by-step manner. At a time when a high signal is present at the terminal CG2, it may be said that the gate circuit shown in FIGURE 6 is qualified as to its part *a*, thereby indicating that a diode represented by the letter *a* is receiving a signal of a type necessary to cause the signal at the terminal CG1 to be high.

In the transfer of numerical information in the computer the presence or absence of a digit is indicated by two-state signals being either high or low. At an intersection of two signal sources there arises a need for a so-called "or" circuit. An "or" circuit is shown schematically in FIGURE 8 and symbolically in FIGURE 9. If a high signal is applied to either of the terminals OC1 or OC2 of FIGURE 8, one of the diodes OC4 or OC5 will be rendered conductive and a high signal will appear at the terminal OC3.

In the diagrammatic representation shown in FIGURE 9, the application of a high signal at either or both of the terminals OC1 or OC2, will cause a high signal to appear at the terminal OC3.

A register or a storage device is a part of a computer which is capable of storing numerical information within the computer until such time as the numerical information is required for use. As mentioned above, a simple flip-flop circuit is in effect a type of register, i.e. storage device; however, a single flip-flop may be utilized only for the storage of a single digit. Depending upon its state, it may indicate either that it contains a one bit, or a zero bit in a binary system. Since, however, a large capacity storage device is required by a computer, the described embodiment of this invention employs a magnetic drum storage system.

A magnetic drum storage system comprises a magnetic drum, i.e., a cylinder having a magnetic material, as iron oxide, applied to its cylindrical surface. The drum is then revolved under magnetic heads which are well known in the art, and which function to read magnetic impulses recorded upon the surface of the drum, or to erase the magnetic impulses recorded upon the drum, or to write magnetic impulses upon the drum. A number of such magnetic heads are placed in a line about the drum in a radial fashion, such that an incremental width of the drum will form a single magnetic channel for the storage of information. The single magnetic channel is referred to as a magnetic drum channel and, as the drum revolves, the information stored in a magnetic drum channel periodically becomes available in sequence, i.e., the various words located on the magnetic drum channel sequentially arrive at the read head. The impulses are then erased after they are read by the read head, preparatory to the recording of new information on the drum by a write head.

Figure 10:
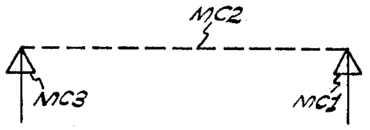
FIGURE 10 shows a symbolic representation of a magnetic drum channel.

In the description of the disclosed embodiment, a magnetic drum channel will be represented as shown in FIGURE 10. The triangle MC1 is utilized to indicate a magnetic reading head which acts to read information stored upon the incremental width of surface of the drum indicated by the dashed line MC2. A writing head is provided which is represented by the triangle MC3. It may, therefore, be seen that the information which appears as an electrical pulse at the writing head MC1 is recorded upon the magnetic drum channel and appears with the revolution of the drum, at the reading head MC3 a predetermined number of word times later, depending upon the time required for the drum to move from the writing head MC3 to the reading head MC1. An erase head (not shown) is also to be provided adjacent to the magnetic drum channel MC2 for erasing information stored therein, so that as the magnetic drum approaches, the writing head MC3, it has been erased and is clear of impulses.

It is to be understood that other type memory devices, for example, static magnetic, or mercury delay line storage devices, might be utilized in the practice of the system of this invention.

Figure 11:
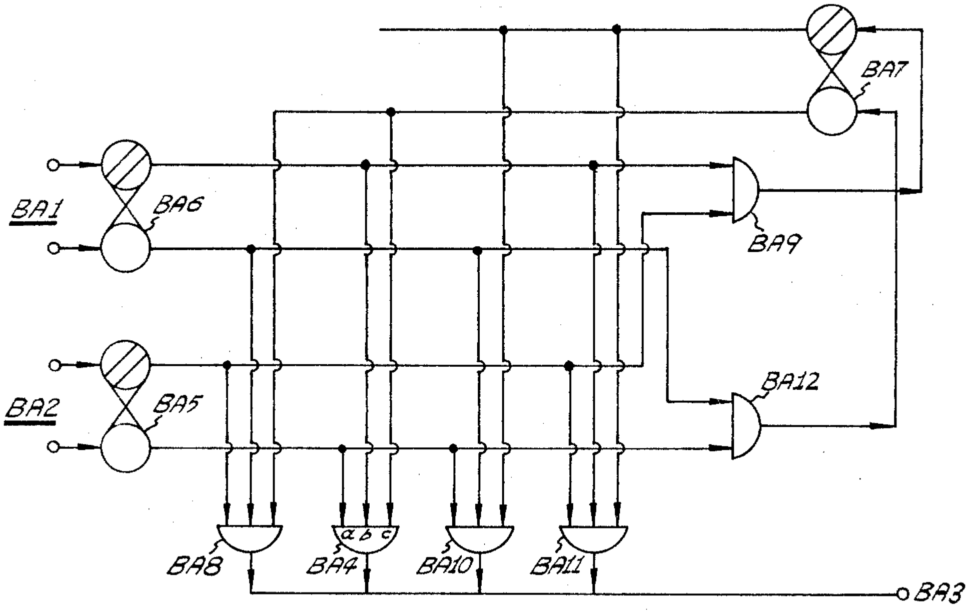
FIGURE 11 shows a symbolic block diagram of an adder circuit.

Within the system of the disclosed embodiment, there appears the requirement for a binary adder. A circuit which functions as a binary adder is shown in FIGURE 11, utilizing the symbology as previously developed. It is to be understood that binary addition is carried out somewhat similarly to decimal addition, however, for a detailed explanation of the manner in which binary numbers are added, reference is made to an article entitled "Arithmetic Processes for Digital Computers" by J. H. Felker which appeared in Electronics Magazine, March, 1953, beginning on page 150.

Two pulse-train signals each representing a binary number are applied individually at the terminals BA1 and BA2. The two terminals in each pair of terminals BA1 and BA2 individually receive a signal, and the negative of the signal. One binary number is represented by a pulse-train signal applied at each of the two pairs of terminals, through buffer inverter circuits (not shown). The objective is to provide at an output terminal BA3 a train of pulses which represent the sum of the binary numbers to be added. The addition is accomplished in a bit-by-bit or pulse-by-pulse manner. In the event a one bit is present in a digit position of either of the binary numbers, but not the other, then the output binary number will be a one digit, for that digit position. In the event there is a binary digit present both of the numbers to be added, in a particular digit position, then the output must be a zero bit with a carry digit into the next binary digit position. The description of the adder assumes a knowledge of the method of handling binary numbers to effect binary addition.

Consider the system of FIGURE 11 assuming first, that the train of pulses representing a binary number which is applied at the terminals BA1 contains a binary digit during a particular digit position, and that the binary number applied at the terminals BA2 does not contain a digit in the particular digit position. In this event, the gate circuit BA4 will become qualified due to the fact that it is qualified as to its part *a* by the fact that the flip-flop circuit BA5 is reset, i.e. holds no digit, as to its part *b* by a high signal from a flip-flop circuit BA6 indicating a digit, and a high signal from the negation output in the flip-flop BA7 indicating no carry digit. The gate circuit BA4 thus becomes qualified and passes a digit indicating signal to the output terminal BA3 during this digit position.

In the event that a one digit is present in the binary number received at the terminals BA2 but not in the binary number applied at the terminals BA1, then the gate circuit BA8 will be qualified in a manner similar to that in which the gate circuit BA4 was qualified, passing a high output digit indicating signal to the terminal BA3.

The presence of two digit indicating binary bits during a certain digit position is detected by the gate circuit BA9 which serves to set the carry digit flip-flop circuit BA7. The setting of the carry flip-flop circuit BA7 indicates a carry digit which is delayed one digit position due to the fact that the change of state of the flip-flop circuit BA7 requires the presence of a clock pulse CP. The output from the carry flip-flop circuit BA7 thus becomes a digit to be utilized in the addition at the time of the next digit position. The presence or absence of a carry digit is detected during the next digit position by the gate circuits BA4, BA8, BA10, and BA11. The occurrence of the carry digit and neither of the one indicating digits at the input terminals BA1 or BA2, will cause an output at the gate circuit BA10 indicating the presence of a carry digit. However, when this situation exists, the gate circuit BA12 will also become qualified and the carry digit storing flip-flop circuit BA7 will be reset. It may therefore be seen that the individual digits of a binary number, which are represented by individual pulses of a signal, will be combined to form a signal representative of a binary number which will appear at the terminal BA3. The signal representative of a binary appearing at the terminal BA3 will indicate the sum in binary, of the numbers applied at the terminals BA1 and BA2. It is to be understood, that the binary adder herein disclosed does not form a part of the invention, and that other forms of binary adders may be utilized in a manner well known to those skilled in the art.

Throughout the specification, the reference numerals are indexed by means of letters prior to the reference numeral. For convenience in cross reference, the letters which precede the reference numerals are each associated with a particular section of the computer system. It may, therefore, be seen that within the general structure of the entire system, a particular letter prefix on any given reference numeral is indicative of a particular function performing system within the entire computer.

TIMING CIRCUITS

In the operation of the computer, it is necessary to form certain electrical timing pulses which are utilized to regulate and synchronize the operations within the computer. The basic timing pulse of the computer is the clocking pulse CP which has been previously described to occur at regular intervals such as to provide the basic timing for the processes of the entire computer.

Referring now to FIGURE 12, there is shown a magnetic drum channel T1 which contains magnetic impulses recorded at regular intervals. The clocking pulses CP are formed from these magnetic impulses. The magnetic channel T1 is not provided with an erase head, and the impulses are not erased but are used over and over. Adapted to read the magnetic impulses from the magnetic drum channel T1 is a reading head T2. The output from the reading head T2 is coupled to an amplifier T3 wherein the clocking pulses CP are amplified and appear at a clock pulse terminal T4.

The computer operates using words which are composed of 29 clock pulses CP. The words are utilized within the computer to express numerical or other information. It is therefore necessary to generate electrical pulses within the computer which occur at the beginning and at the end of each word to indicate the duration of a word time. Various other timing pulses are required to occur at other intervals which will be later discussed.

Referring now to FIGURE 13, there is shown a timing circuit for generating the various timing pulses which are required to occur during predetermined intervals. In FIGURE 13 there is shown a magnetic drum channel T10 which has a predetermined recirculating impulse pattern arranged upon it. A reading head T11 is positioned in such a manner as to read magnetic impulses recorded upon the magnetic drum channel T10. The output from the reading head T11 is connected to an amplifier T12 wherein the pulses derived from the magnetic drum channel T10 are amplified. The output signal from the amplifier T12 is connected to a flip-flop register, composed of flip-flop circuits T14, T15, T16, and T17, which are adapted to receive clocking pulses CP to enable them to change their state, i.e. to be set or reset, only during the instant of a clock pulse CP. Due to the complexity of the drawings, these clock pulses CP are generally not shown. However, it is to be understood that changes of state of all flip-flop circuits within the computer are synchronized by the clocking pulses CP unless otherwise stated.

The impulses recorded upon the magnetic drum channel T10 are recorded in synchronism with the clock pulse CP, and the occurrence of an impulse upon the magnetic drum channel will cause an electrical pulse to pass through the reading head T11 and the amplifier T12 to cause the flip-flop T14 to be set, that is, the state of the flip-flop circuit T14 will be reversed to indicate the presence of a digit. If the flip-flop T14 is in a set state, and the flip-flop circuit T15 is in a reset state, then the occurrence of the next clock pulse CP will cause the flip-flop T15 to be set. This setting of flip-flop T15 is due to the coupling between the flip-flip circuits T14 and T15 by means of a gate circuit T13.

The flip-flop circuit T14 will remain in a set state until a time when there is a coincidence between a clock pulse CP and the lack of a pulse from the magnetic drum channel T10. At such a time the flip-flop circuit T14 will be return to its reset state, or be reset by the application of a clock pulse CP, directly to the flip-flop circuit T14.

A flip-flop T16 is directly coupled to the flip-flop circuit T15. The flip-flop circuit T16 will therefore be controlled by the state of the flip-flop circuit T15, and will be set or reset depending upon the state of the flip-flop circuit T15 at the time of occurrence of a clock pulse CP.

The flip-flop circuit T17 is so connected as to be controlled by the flip-flops T16, T15, and T14. The control of the flip-flop circuit T17 is effected by means of a gate circuit T18. The gate circuit T18 will be opened, i.e., qualified to pass a high signal, at a time when the flip-flop circuit T14 is in a set state; the flip-flop circuit T16 is in a set state; and, the flip-flop circuit T15 is in a reset state. The coincidence of these conditions will cause the flip-flop circuit T17 to be set. The flip-flop circuit T17 is reset by means of a gate circuit T33, to be later explained.

The state of the flip-flop circuits T14, T15, T16, and T17, are thus indicative of the state of the register which they form, and as the register assumes different states, signals indicative of these states will be utilized to generate the required timing pulses.

The formation of words consisting of 29 clock pulses CP, necessitates the generation of a pulse at the beginning of a word time and a pulse at the end of a word time. The pulses initiating words will be called timing pulse TP1, and the pulses ending words will be called timing pulse TP29.

Consider now the manner of generation of the timing pulse TP1 which indicates the first digit position of any given word. The timing pulse TP1 is generated by the coincidence of the set state of flip-flop circuit T16, the set state of the flip-flop circuit T17, and the reset state of the flip-flop circuit T15. This condition is detected by the gate circuit T19. The output from the gate circuit T19 is connected to a buffer inverter circuit T20. The timing pulse TP1 appears at the terminal T22, and a signal *n*TP1, which is high during the absence of the timing pulse TP1, appears at a terminal T23. This signal *n*TP1, which appears at the terminal T23, is the negation of the timing pulse TP1.

The formation of the timing pulse TP29, which is indicative of the end of a word, is formed by the coincidence of the set state of the flip-flop circuit T15, the set state of the flip-flop circuit T16, and the set state of the flip-flop circuit T17. This condition, when the flip-flop circuit T15, T16, and T17 are all set, is sensed by the gate circuit T24. The gate circuit T24 is connected to receive set state indicating signals from the flip-flop circuits T15, T16, and T17, and to pass on a high signal upon receiving these high signals. A high signal from the gate circuit T24 appears at the terminal T25 to form the timing pulses TP29 after passing through a buffer inverter circuit T26. The signal appearing at the inverter side of the buffer inverter T26 (terminal T28), is *n*TP29, which is an inverted form, i.e. negation, of the signal containing the timing pulses TP29 and is, therefore, relatively high in magnitude during the absence of the timing pulses TP29.

Certain components of the computer when considered in detail will be seen to require pulses other than those which occur at the beginning and end of each word, i.e., timing pulses TP1 and TP29. One such required pulse is timing pulse TP13 which occurs simultaneously with the 13th clock pulse CP of every word. Another required pulse is the timing pulse TP21, which occurs simultaneously with the 21st clock pulse CP of every word. Further requirements necessitate the provision of a signal which contains both timing pulses TP13 and TP21.

The explanation of the uses of these pulses must, by necessity, come in conjunction with other component building blocks of the computer, therefore, present concern shall be only with the mode of forming such timing pulses.

Consider now the generation of the signal TP13+TP21 which contains the timing pulse TP13 and the timing pulse TP21. Such a signal will be formed by the coincidence of the flip-flop circuit T15 being set, the flip-flop circuit T16 being set, and the flip-flop circuit T17 being reset. The coincidence of these conditions is detected by a gate circuit T29 which is connected to receive signals from the flip-flop circuits T15, T16, and T17. The time at which the conditions of the flip-flop circuits are such that T15 is set, T16 is set, and T17 is reset, is so arranged, as to occur during both the 13th and 21st clock pulses CP, as will be later described, thereby forming the desired signal at terminal T30.

To effect the generation of the timing pulse TP21 alone, the output from the gate circuit T29 is further qualified by a gate circuit T31. The signal which contains the timing pulse TP13 and the timing pulse TP21, and which appears at the terminal T30, is passed to the gate circuit T31 along with a signal from the flip-flop circuit T14. The gate circuit T31 is thus qualified by flip-flop circuit T14 being in the set state during the occurrence of a pulse, or a high signal at terminal T30. The flip-flop circuit T14 is in the set state during the timing pulse TP21, but not in the set state during the timing pulse TP13. The result is that the timing pulse TP21 appears at the terminal T32 while the timing pulse TP13 is unable to pass through the gate circuit T31.

Another timing pulse signal which must be generated for the operation of the computer becomes high at a time which coincides to the second clock pulse CP of every word. Such a timing pulse TP2 will be generated when the flip-flop register is placed in a condition wherein the flip-flop circuit T15 is reset, the flip-flop circuit T16 is reset, and the flip-flop circuit T17 is set. The coincidence of these states will be detected by the gate T33. The signal from the gate circuit T33 reaches a relatively high level, during the second clock pulse CP of every word, that is, the timing pulse TP2, appears at the terminal T34. The terminal T34 is in return connected to the flip-flop circuit T17 for purposes of resetting the flip-flop circuit T17.

Still another pulse which is required to be formed during every word cycle is timing pulse TP28 which occurs simultaneously with the 28th clock pulse CP during each word time. The timing pulse TP28 occurs at a time when the condition of the register formed by the flip-flop circuits T14, T15, T16, and T17, is such that the flip-flop circuit T17 is set, the flip-flop circuit T15 is set, and the flip-flop circuit T16 is reset. The above described conditions of the flip-flop register are detected by a gate circuit T35. These conditions exist during the occurrence of the 28th clock pulse CP in every word and form the timing pulse TP28 which passes the gate circuit T35 and appears at the terminal T36.

In certain parts of the computer it is necessary to provide certain special timing pulses which do not occur at a particular clock pulse CP of every word. For example, there is a need for a special timing pulse TE which occurs during alternate of the timing pulses TP1, i.e., at the beginning of alternate words.

In another circuit of the computer there is generated a signal C109 dependent upon the state of a flip-flop circuit C109 which is associated with another portion of the computer to be later described. The flip-flop circuit C109 is in a set state during even word times and is alternately set and reset each word time. During even words, the flip-flop circuit C109 will be set, and during odd words, the flip-flop circuit C109 will be reset. To generate the pulse TE, which occurs on alternate word times during the timing pulse TP1 and is used for double precision operation, the output from the inverter portion of the buffer inverter T20, appearing at the terminal T23, is combined with the negation form of the signal from the flip-flop circuit C109, i.e. *n*C109. The combination of these signals takes place in a buffer inverter circuit T37. The buffer inverter circuit T37 has an output at terminal T40 which is the negation of the signal TE, i.e. *n*TE, and an inverted output TE at a terminal T39.

Still another timing pulse of the special type is the pulse T0 which marks the beginning of each memory cycle of 108 words, or 3,132 clock pulses CP. The generation of the timing pulse T0 is effected by combining the timing pulse TP29 with a signal *n*C102, an output from a flip-flop circuit C102 to be later described. It is noted, however, that the flip-flop circuit C102 becomes reset to form the signal *n*C102 high, during one timing pulse TP29 per memory cycle. The combination of the signals *n*C104 and timing pulse TP29 is made in the gate circuit T49. The gated signal containing the timing pulse TO appears at the terminal T41.

To this point, the description of the timing circuit has dealt with the manner in which the various states of the register T13 effects control of the various timing pulse producing gate circuits. Consideration will now be made of the manner in which magnetc impulses are set up on the timing tract T10 in order to cause various states to be assumed by the flip-flop circuits T14, T15, T16, and T17 to thereby form the various timing pulses.

FIGURE 14 shows a table which will be used for illustrating the manner in which the flip-flop register of FIGURE 13 is set into various states to form the various timing pulse signals.

Traversing the table of FIGURE 14, in a horizontal direction, each square, i.e. box, is representative of one clock pulse CP time. Therefore, the 29 boxes shown are representative of one word time. A one digit in a box indicates the flip-flop circuit of the row in which the box is located, is set at the clock pulse CP time indicated. For purposes of illustration, assume that the state of the register is such as to correspond to the time of the 10th clock pulse CP of a particular word. At the tenth clock pulse CP time all of the flip-flop circuits T14, T15, T16, or T17 are reset. At the eleventh clock pulse CP time, a pulse is received by the flip-flop circuit T14 from the amplifier T12. The pulse received is derived from a magnetic impulse recorded upon the magnetic drum channel T10. The effect of the pulse occurring at the time of the eleventh clock pulse CP is to set the flip-flop circuit T14, leaving, however, the remainder of the flip-flop circuits in the register in an unset state. At a time corresponding to the twelfth clock pulse CP, another pulse is received by the flip-flop circuit T14 from the memory drum channel via the amplifier T12, thereby maintaining the flip-flop circuit T14 in a set condition. Due to the fact that during the previous interval, i.e. clock pulse CP time, the flip-flop circuit T14 was in a set state, the flip-flop circuit T15 will now be placed in a set state. That is, the set state of the flip-flop circuits precess through the register. During the next interval, coinciding to the thirteenth clock pulse CP, no pulse will be received from the magnetic drum channel T10 by the flip-flop circuit T14. The set states of flip-flop circuits 14 and 15 will, however, be precessed, i.e. shifted, into the flip-flop circuits T16 and T15, such that during the interval coinciding to the thirteenth clock pulse CP, the flip-flop circuits T15 and T16 will be in a set state. This state of the register coincides to the necessary existing conditions to generate a pulse at terminal T30 representing timing pulse TP13, and the pulse will thus be formed.

During the interval of the fourteenth clock pulse CP, the set state of the flip-flop circuit T16 will not be passed on to the flip-flop circuit T17 due to the action of the gate circuit T18; the state of the flip-flop circuit T15 will, however, be passed on to the flip-flop circuit T16. During the time interval corresponding to fourteenth clock pulse CP, the only flip-flop in a set state in the register will be the flip-flop circuit T16. During the time interval coinciding to the fifteenth clock pulse, the state of the flip-flop circuit 16 may not be passed onto the flip-flop circuit T17, again due to the action of the gate circuit T18, and all the flip-flop circuits T14, T15, T16, and T17 will be placed in a reset state.

These reset states of all the flip-flop circuits T14, T15, T16, and T17, will prevail until such time as another pulse is received from the magnetic drum channel T10. Another such pulse will be received at a time coinciding to the nineteenth clock pulse CP. At the time of the nineteenth clock pulse CP when another pulse is received by the flip-flop circuit T14 from the magnetic drum channel T10, the flip-flop circuit T14 will be set. At the time interval coinciding to the twentieth clock pulse CP, another pulse will be received by the flip-flop circuit T14 thereby causing the flip-flop circuit T14 to remain in a set state and causing the flip-flop circuit T15 also to be placed in a set state, by the precession of the state of the flip-flop circuit T14. At the time interval corresponding to the twenty-first clock pulse CP, still another pulse will be received by the flip-flop circuit T14 and the previous pulses will be shifted one flip-flop position in the aforesaid manner. The interval of time corresponding to the twenty-first clock pulse CP, therefore, sees the flip-flop circuits T14, T15, and T16 all in a set state, as shown in FIGURE 14. This set of conditions will cause pulse signals to be generated at terminals T30 and T32 during the time interval corresponding to the twenty-first clock pulse CP. During the time of the twenty-second clock pulse CP, the set state of the flip-flop circuit T15 will be shifted into the flip-flop circuit T16, however, the set states of the flip-flop circuits T14 and T16 will be prevented from shifting, i.e., precessing, by the gate circuits T13 and T18 respectively. There will, therefore, at the time of the twenty-third clock pulse CP be no flip-flop circuits set.

At the interval corresponding to the twenty-fifth clock pulse CP, the flip-flop circuit T14 will again be set by a pulse derived from the magnetic drum channel T10. During the interval of the twenty-sixth clock pulse CP, the state of the flip-flop circuit T14 is shifted such that the flip-flop circuit T15 becomes set and the flip-flop circuit T14 becomes reset. During the time interval corresponding to the twenty-seventh clock pulse CP, the flip-flop circuit T14 is again set by another pulse derived from the magnetic drum channel T10, and the set state previously held in the flip-flop circuit T15 is precessed, i.e. shifted, onto the flip-flop circuit T16. During the interval of the twenty-eighth clock pulse CP, the state of the flip-flop circuit T14 is passed on to the flip-flop circuit T15, and the flip-flop circuit T14 is maintained set by another pulse derived from the magnetic drum channel T10. The flip-flop circuit T17 is not reset, due to the fact that it is reset by signals passing via a line T42 connected to terminal T34. The flip-flop circuit T17, therefore, remains in a set state until the gate circuit T42 is qualified. At the time of the twenty-ninth clock pulse CP it may be seen that the flip-flop circuits T15, T16, and T17 are all in a set state. This condition will cause the TP29 timing pulse to be generated at the terminal T25.

During the time interval coinciding to the first clock pulse CP, the state of the flip-flop circuit T15 is shifted, setting the flip-flop circuit T16 such that the flip-flop circuits T16 and T17 of the register are placed in a set state. The condition of the register will now be such that a timing pulse TP1 will be generated at the terminal T22. During the interval of the second clock pulse CP, a pulse will be generated at terminal T34 and will also be transmitted via the line T42 to reset the flip-flop circuit T17.

The impulses necessary to cause the above mode of operation are magnetically recorded upon the magnetic drum channel T10. The impulses on the magnetic drum channel T10 will not be erased after passing under the read head T11, but will be used over and over to set the flip-flop register of FIGURE 13 into the states as described above.

Another of the special timing pulses is the timing pulse TF which occurs ever four word times. Certain magnetic drum channels, i.e. registers, in the computer recirculate with a four word cycle and other events also require the indication of periods of exactly four words duration. FIGURE 15 shows the necessary circuitry for developing the timing pulse TF. Upon the coincidence of the flip-flop C109 being in a reset state, the flip-flop circuit C112 being in a set state, and the occurrence of the timing pulse TP29, the TF pulse will be generated. The discussion of the flip-flop circuits C109 and C112 will be postponed until later in the specification; however, it shall be now noted that the flip-flop C109 becomes set during even word times, and the flip-flop C112 becomes set on alternate odd word times. The qualification of a gate circuit shown in FIGURE 15 will therefore form the timing pulse TF.

To this point the computer has been described in terms of a 29-bit word; however, during certain types of operation, i.e. double precision operation, the computer has facilities for doubling the length of words to represent particular numbers or other numerical information. Depending upon whether the machine is operating upon words composed of the usual word length of 29 digits, or is operating upon words of double length composed of 58 digits, it is necessary to allow for the variations in the sign-representing digit position. There is, therefore, a necessity for forming a special timing pulse TS which occurs during the interval when the sign of a number is to be given. This occurs either every twenty-ninth clock pulse CP times, or every fifty-eight clock pulse CP times. A flip-flop circuit I26, which shall be later described, determines whether computer is operating in a double word length fashion or in a single word length fashion. The state of the flip-flop I26 is detected by a gate circuit T50 shown in FIGURE 16, which also detects the presence of timing pulse TP1. The output of the qualifying gate T50 is coupled, with the special timing pulse TE, into a buffer inverter circuit T51. The two outputs from the buffer inverter circuit T51 represent the special timing pulse TS and its negation *n*TS.

*Summary.*—From the above detailed description it may be seen that the function of the timing circuits is to provide first a regularly occurring clock pulse CP which may be thought of as the heartbeat of the computer. The clock pulse CP acts to synchronize all transfers of information and movements of information within the computer. In addition to the clock pulse CP, several other pulses are generated during every word cycle of the computer. These pulses include a timing pulse TP1 which occurs at the first clock pulse of eath twenty-nine clock pulse word; a timing pulse TP2 which occurs simultaneously with the second clock pulse CP of each word; a timing pulse TP13 which occurs in coincidence with the 13th clock pulse CP of every word; a timing pulse TP21 which occurs with the twenty-first clock pulse CP of every word; a timing pulse TP28 which occurs with the 28th clock pulse CP of every word; and timing pulse TP29 which occurs simultaneously with the last or twenty-ninth clock pulse CP of each word. The function of these pulses is to control the various movements of information and to synchronize various operations within the computer.

In addition to the above pulses, the timing circuits generate certain special pulses such as T0, which occurs every cycle of the main memory unit, i.e. every 108 words. Another special pulse is TF which occurs every 4th word at the end of a word. Still another special pulse is TS, which occurs during the first clock pulse CP of every word, or during the first clock pulse CP, of every other word, depending upon whether the machine is operating with words consisting of 29 bits, or words consisting of 58 bits, i.e. double or single precision. Still a further special timing pulse is TE, which occurs simultaneously with the first clock pulse CP of alternate words is also formed.

INDEX CONTROL CIRCUIT

In the operation of the computer, to transfer numerical information to various of the function performing circuits, or to simply change the location of numerical information in the computer, it is necessary to provide an indexing system which shall determine the source from which the information shall be taken, the destination to which the information shall be sent, and the mode of the transfer. The mode of transfer indicates what is done to, or with the information as it is transferred. To effect the control of these operations command words are utilized.

FIGURE 17 shows a 29-bit command word. This 29-bit command word is broken up into information-representing groups of bits, and each of the smaller bit groups is utilized to effect one portion of the command.

In the present discussion related to the index control circuit, the first 13 digit positions, i.e. bits, of the 29-bit word shall be considered. The first digit position, bit number one, is utilized to indicate whether the operation shall utilize a 29-bit word or a 58-bit word, i.e. double or single precision operation. The next five digit positions, i.e., digit positions 2, 3, 4, 5 and 6, are utilized to indicate the destination of the information which is to be operated upon or transferred. The next five digit positions, digit positions 7, 8, 9, 10 and 11, are utilized to indicate the source of information to be operated upon or transferred. The digit positions 12 and 13 of the command word are utilized to indicate the mode in which the information is to be operated upon or transferred.

In using the binary number system, it is to be noted that each of the groups of digit positions may represent a number of conditions, equal to the number 2 expanded to the power of the number of digit positions in the group. The first digit position of the command word may therefore represent one of two conditions, indicating that the machine shall operate in either a single or a double word fashion. If there is a digit 1 in the first digit position of the command word, then the operation shall be double precision; however, if there is no digit, but a 0, in the first digit position, single precision operation is indicated.

The destnation digit positions 2 through 6, and the source digit positions 7 through 11, each may be utilized to represent any one of thirty-two possible combinations. The digit positions 12 and 13, i.e. mode indicating digit positions, may be utilized to represent any one of 4 modes of operation.

The remainder of the command word will be later explained; however, it may be noted that the digit positions 14 through 20 indicate the time at which the next command will be available; the digit position 21 is utilized to indicate a break in operation; the digit positions 22 through 28 are used to indicate the time of the transfer; and the digit position 29 is used to indicate whether the command shall be executed immediately or be deferred.

Figure 18:
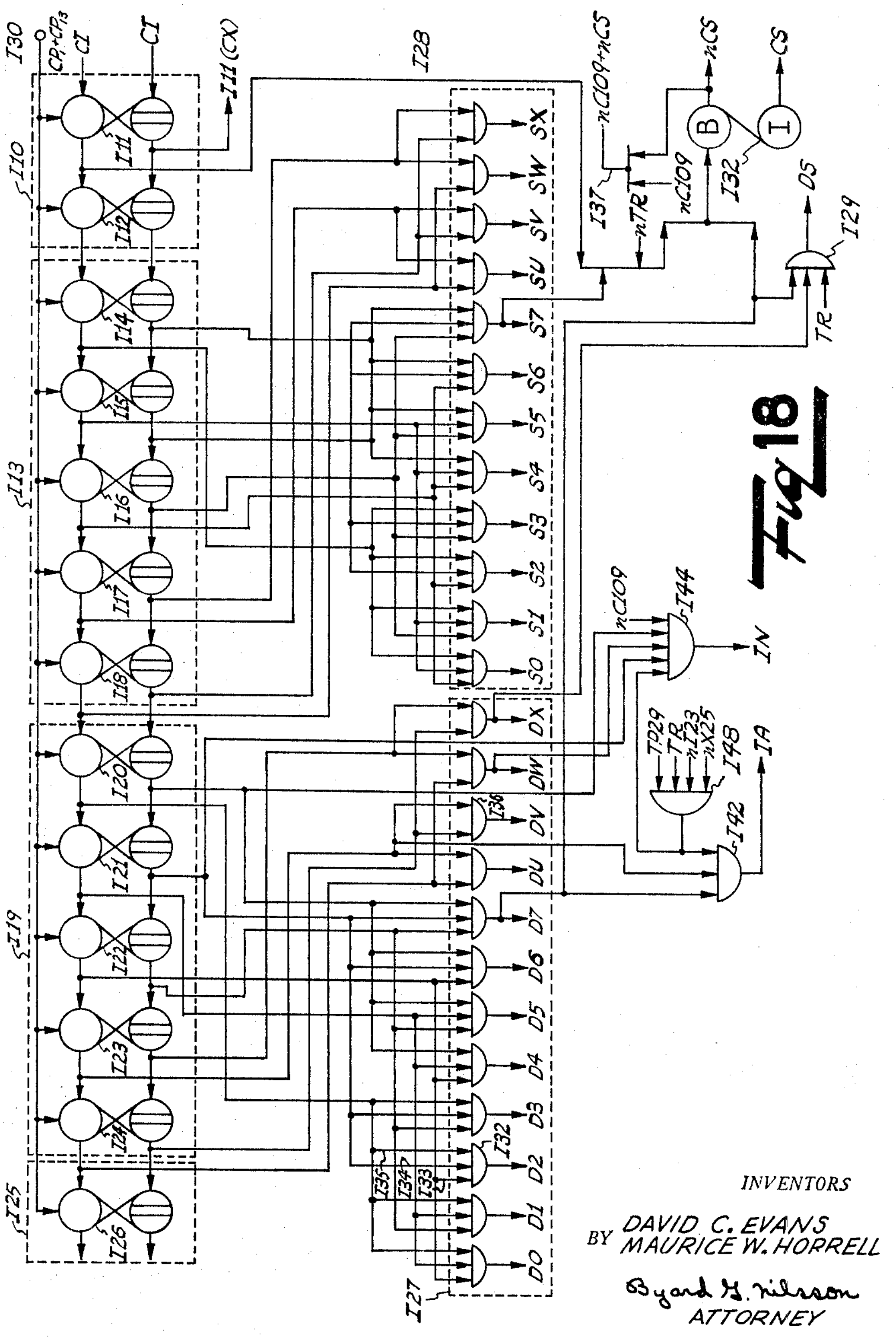
FIGURE 18 show a symbolic block diagrammatic representation of an index control circuit.

Referring now to FIGURE 18, there are shown four interconnected registers, I10, I13, I19 and I25, each composed of flip-flop circuits. The first register I10 is a mode register containing flip-flop circuits I11 and I12. The following register I13 is a source register and is composed of flip-flop circuits I14, I15, I16, I17 and I18. Next, register I19 is the destination register and is composed of flip-flop circuits I20, I21, I22, I23, I24. The register I25 is the type register, and consists of a single flip-flop circuit I26.

The digits in the first thirteen digit positions in the command word are fed into the series of interconnected registers I10, I13, I19, and I25 in such a manner that the first digit position of the word is set up in the flip-flop circuit I11 and subsequently shifted a flip-flop circuit at every clock pulse CP time, down through the flip-flop circuits until it reaches the flip-flop circuit I26. In this manner, as the first thirteen digits of the command word are fed to the flip-flop circuit I11 from the command input CI, after thirteen clock pulse intervals, the command digits will have been shifted such that the bit in digit position number one of the command word is stored in the flip-flop I26, the bit in digit position number two of the command word is stored in the flip-flop I24, the bit in digit position number three of the command word is stored in the flip-flop circuit I23, digit four of the command word is stored in the flip-flop I22, and similarly the entire first thirteen bits of the command word are stored in the 13 flip-flop circuits of the registers I10, I13, I19, and I25.

In other circuits throughout the illustrative embodiment, the application of the clock pulses CP to the various flip-flop circuits will not be shown, as was previously stated. However, in the indexing control system, it is to be noted, that the clock pulses CP are shown to be applied to the flip-flop circuits in the registers I10, I13, I19, and I25 via a terminal I30 during the first thirteen digit positions of the word. Beginning with the fourteenth clock pulse CP of any given word, the flip-flop circuits within the registers I10, I13, I19, and I25, no longer receive the clock pulses CP and in this manner the first thirteen digits of the command word are retained in the flip-flop circuits of the registers. To illustrate the limited progression of the digits of the command word into the registers I10, I13, I19, and I25, the connection of the source of the clock pulses CP1 through 13 is shown at terminal I30.

Also shown in FIGURE 18 are two decoding systems I27 and I28. A source decoding system I28 has connections to each of the flip-flop circuits of the source register I13, a destination decoding system I27 has connections to each of the flip-flop circuits within the destination register I19. The source decoding system has 12 outputs: S0, S1, S2, S3, S4, S5, S6, S7, SU, SV, SW, and SX. The gate circuits which make up the decoding system I28 are so arranged that corresponding to each of the various states of the register I13 one and only one set of two of the output terminals from the decoding system I28 will receive high signals. For each of the various states of the flip-flop circuits within the source register I13 the gate circuits of the source decoding system I28 will receive a set of electrical signals which will cause a high output to occur at one of the output terminals S0, S1, S2, S3, S4, S5, S6, or S7, and a high output also, to appear at one of the output terminals SU, SV, SW, or SX. It may therefore be seen, that depending upon which of the two source output terminals receive high signals, a certain storage position for information will be indicated as a source from which information will be taken. The method in which the signals from the source output terminals allow the removal of certain numerical information from a certain magnetic storage circuit will be later described.

The operation of the destination decoding system 127, is similar to the source decoding system 128. For each of the given conditions which may occur in the destination register 119, i.e., states of the flip-flop circuits 120, 121, 122, 123, and 124, there will be set up a set of electrical conditions in the destination decoding system 127 wherein one of the letter output terminals DU, DV, DW, or DX and one of the number output terminals D0, D1, D2, D3, D4, D5, D6, or D7 will each receive a high signal. Depending upon which combination of a letter output terminal and a number output terminal are energized with a high signal, a particular destination will be indicated for the information which the computer is presently handling. The control of the availability of various destinations by the signals from the destination decoding system 127 will be later described.

It may therefore be seen, that the ten digit positions of the command word as illustrated in FIGURE 17, including digit positions 2 to 11 determine the source and the destination for numerical information immediately in process, by setting up index source and destination signals on the output terminals of the decoding systems 127 and 128. The gate circuits within each of the decoding systems may therefore be seen to function to detect a certain set of states of the flip-flop circuits in the register, with which the decoding system is associated, which will indicate a particular source or destination.

The index of the various sources and destinations will be discussed later. However, consider for example, that it is desired to place information in a position indicated to be indexed by the presence of high signals D2 and DV. The qualification of a gate circuit 132 is necessary to create a high signal D2. The qualification of the gate circuit 132 is effected by the flip-flop circuits 122 and 120 being in a reset state, and the flip-flop circuit 121 being in a set state, such may be seen by considering the connections of the lines 133, 134, and 135.

To create a relatively high signal DV requires that the gate circuit 136 be qualified. The qualification of the gate circuit 136 is effected by the flip-flop circuit 123 being in a reset state, and the flip-flop circuit 124 being in a set state.

A consideration of the arrangement of the gate circuits within the decoding systems 127 and 128 of FIGURE 18 will indicate that the qualification of each of the gate circuits contained therein may be qualified in a manner similar to those illustratively described, depending on the state of the registers 113 and 119.

The information which is being transferred in the machine is, in many situations, acted upon by the computer. It may, for example, be added to other information or subtracted from other information. All the possibilities as to what may be done to the information will be considered in a later part of the specification, but at present, it must be noted that the bits 12 and 13 of the command word are utilized to instruct the computer as to the type (mode) of operation which is to be performed, i.e. add or subtract. The various operations indicated by the different states of the register 110, containing bits 12 and 13 of the command word, will be explained at a later point in the specification.

The manner in which the flip-flop circuit 126 forming the register 125 is utilized to control whether double or single word operation shall be used will also be later discussed.

In relation to the index control circuit, of FIGURE 18 there are shown number signals and letter signals preceded by either an S or a D to indicate the source and destination index control signals. The particular pair of source signals or destination signals which are high from the source or destination decoding system determines the particular position in the magnetic storage system from which information may be received or to which information will be transferred for storing.

Consider now more specifically, the destination decoding system 127 and the outputs therefrom. A possible combination of destination signals may comprise a high output signal D0 occurring simultaneously with a high output signal DU; this may be labelled the first output signal. A second combination of output signals may comprise a high output signal on the terminal D0 and a high output signal on the terminal DV. A third combination may include the signals D0 and DW high. It may therefore be seen that a manner of counting, by combining the numerous pairs of signals may be developed somewhat as follows: D0 DU, D0 DV, D0 DW, D0 DX, D1 DU, D1 DV, D1 DW, D1 DX, D2 DU, D2 DV, etc. A similar counting system may be developed with relation to the source decoding system, S0 SU, S0 SV, S0 SW, S0 SX, S1 SU, etc.

Reference will now be made to FIGURE 19 which shows an index chart of the various signal combinations from the destination and source decoding systems 127 and 128 and the particular source or destination which they indicate. Consider, by way of example, that there are high outputs D3 and DX from the destination decoding system of FIGURE 18. High outputs D3 and DX will indicate that the information presently under consideration shall be destined for magnetic storage circuit 15 of the storage system. The coding of the source commands is similar and, by way of example, if high outputs occur for signals S3 and SX from the source decoding system 128 of FIGURE 18, it may be seen by consulting FIGURE 19, that the source of the information presently to be processed will be magnetic storage circuit 15 of the memory system.

In addition to the particular magnetic storage circuits which may be specified as sources and destinations, by the combinations of source and destination signals, there are several other possible sources and destinations which may be specified for numerical information. Registers I and II which are fast access magnetic drum channels of only four word length, may act as sources or destinations for numerical information under process. The registers I and II will be fully discussed later in the specification; note however, that to indicate the register I as a source, for example, the source signals S5 and SU must be high.

Certain other registers may also be utilized for sources and destinations. The arithmetic portion of the computer contains three registers identified individually as an RQ register, an ID register and a PN register. These registers will be considered in detail later; however, it shall be noted from FIGURE 19 that the registers of the arithmetic circuits may be utilized as sources or destinations.

In the differential analyzing control circuits, which will be later considered in detail, there are provided magnetic drum channels DA20 and DA21. These magnetic drum channels may act as sources of destinations for numerical information in the computer, as indicated in the chart of FIGURE 19.

In addition to commanding purely source or destination operations, the index control circuits may be utilized to set up circuits to perform certain logical operations. The index control circuits being such that the source signals S6 and SX are high, for example, commands the performance of the logical operation which ascertains the presence of a digit in both the register I and the register II or the presence of a digit in the PN register occurring simultaneously with the absence of a digit in the register I. This logical operation may be written in abbreviated form (I register)·(II register)+(*n*I register)·(PN register). Other logical operations are also capable of performance as is indicated in FIGURE 19 when the source signals S7 SV, S7 SW, and S7 SX are high.

The accumulator circuits of the computer shall be described later; however, it shall be noted that the accumulator may be a source or a destination as will be indicated by the source and destination signals S7 SU and D7 DU.

Upon the occurrence of high signals D7 and DX from the destination decoding system I27, a special command is indicated and an expansion is made of the indexing system by utilizing the destination D7 DX to indicate that source signals shall be considered in conjunction with the destination signals. It may therefore be seen by considering FIGURE 19, that when the index control circuits indicate D7 DX high, a special instruction will be set up depending upon which of the source signals are high.

The destination signals D7 and DX from the destination decoding system I27, are directly connected to a gating circuit I29. The gate circuit I29 is further qualified by the signal TR indicating a transfer state of operation which will be later discussed; however, it is to be understood that during the period that the signal TD is high, a time of transfer of information is indicated. The qualification of the gate circuit I29 provides a high signal DS which indicates that a transfer shall be effected involving a special command as indicated by the destination signals D7 and DX. The utilization of the signal DS will later be shown to indicate that one of the expanded commands shown in FIGURE 17 is to be executed.

The expansion of the index of sources and destinations indicated by the signals D7 and DX being high during the transfer state, i.e., the signal DS being high is used to indicate a variety of commands. The commands so indicated are shown in FIGURE 19 and include the commands to: halt the machine, to start and stop the process of differential analysis, to indicate whether command words shall be taken from the magnetic storage channel 0 or the magnetic storage channel 1, to clear certain registers, to control the arithmetic processes of division and multiplication, to shift digits in certain registers, to normalize the content of certain registers and to perform certain test operations.

As previously mentioned, during certain periods of operation it is desirable to shift the position of a number in storage, i.e. precess a number, by transferring it through the accumulator circuit. The signal which, when true, indicates such a precession shall take place is CS, from the buffer inverter circuit I32.

The buffer inverter I32 is so arranged as to cause the signal *n*CS to be high at a time when the following signals are high: *n*I11 or S7 or *n*TR or D7. That is, the signal *n*CS is high when any of the conditions as set up are such that the buffer inverter I32 receives a high signal. The signal *n*CS being the negation of the signal CS, the signal CS may be seen to appear at the inverter output of the buffer inverter I32. The production of the signal CS is so arranged as to be high during all commands of the computer wherein a precession through the accumulator is required.

There is a need, to be later described, for a signal which is high with the occurrence of either *n*C109 or *n*CS. Such a signal *n*C109+*n*CS is detected in a line I37 which receives signals *n*C109 and *n*CE. The description of the use of this signal will occur in the discussion of the numerical circuits.

The accumulator circuit and the numerical circuit, which contains an accumulator circuit, require certain signals IA and IN which conditionally occur high during the time of TP29. The purpose of the signals IA and IN will be later explained with reference to the accumulator circuit, and the numerical circuit respectively.

The signal IA is formed by a gate circuit I42, and the signal IN is formed by a gate circuit I44. The gate circuits I42 and I44 both require as one qualifying factor a signal resulting from the qualification of a gate circuit I48. The gate circuit I48 is qualified by the coincidence of the timing pulse TP29, the transfer-state-indicating signal TR, the flip-flop circuit I23 being reset, and a flip-flop circuit X25 located in the sign control circuits being reset. The remaining qualifying factors for the gate circuits I42 and I44 are taken from the destination decoding system I27. Further discussion of the signals IN and IA will be made later.

*Summary*.—It may be seen from a consideration of the above detailed description, considered with reference to particular of the figures, that the indexing control circuits serve as a means of providing the addresses from which information is to be taken, the addresses to which information shall be sent, and the mode of transfer of such numerical information.

The first13-bits of a command word are set up in thirteen flip-flop circuits which are grouped into registers. Each of the registers is then provided with a decoding system to create certain signals which will be high for different combinations of states of the flip-flop circuits within the register. The high signals from each of the decoding registers indicate the sources, destinations, and modes of transfer for circulating numerical information.

In addition, auxiliary circuits are provided as a part of the Index Control Circuits, which are utilized for the purpose of generating certain special signals. Included among these is a signal indicating precession shall take place, and a signal indicating a special index command which is utilized to expand the number of possible instructions from particular of the decoding systems.

MAGNETIC STORAGE CIRCUITS

In the operation of the computer, many of the transfers from a source to a destination will involve the transfer of information to or from a position in a magnetic storage circuit. A description will now be made of a typical magnetic storage circuit which will be representative of the magnetic storage circuits 2 through 18. Various numbers of magnetic storage circuits are possible; however, eighteen of such magnetic storage circuits are used in the illustrative embodiment. Two of the magnetic storage circuits, 0 and 1, are used for the storage of command words and the remaining storage circuits are used for numerical information. Each of the magnetic storage circuits utilizes a magnetic drum channel having a storage capacity of 108 words each of 29 digit positions, i.e. bits.

Figures 20, 21:
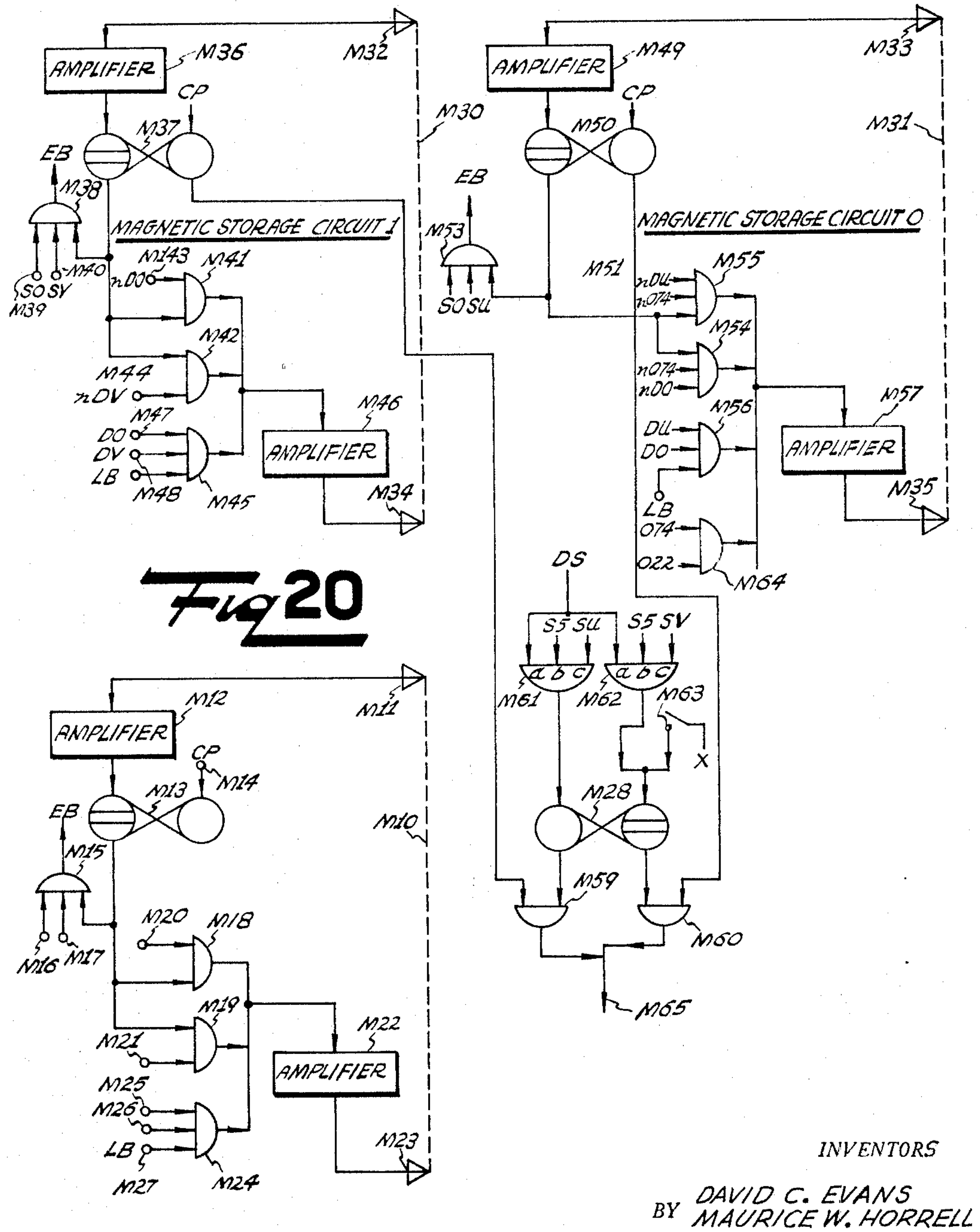
FIGURE 20 shows a symbolic block diagrammatic representation of a typical magnetic storage circuit.
FIGURE 21 shows a symbolic block diagrammatic representation of a pair of special magnetic storage circuits.

There is shown in FIGURE 20 a typical magnetic storage circuit. Included in FIGURE 20 is a showing of a magnetic drum channel M10, i.e., a recording track on a magnetic drum, which may be utilized for storing 3,132 bits of information, or 108 29-bit words. Positioned adjacent to the magnetic drum channel 10 is a magnetic reading head M11. The magnetic reading head M11 is connected to an amplifier M12 wherein impulses representing bits of information picked up from the magnetic drum channel M10, by the magnetic reading head M11, may be amplified and passed on to a flip-flop circuit M13. The flip-flop circuit M13 is set by receiving a pulse from the amplifier M12, and is reset by a clock pulse CP, applied at a terminal M14, at a time when no pulse is received from the amplifier M12. The set or reset state of the flip-flop circuit M13 during any clock pulse CP period, thus indicates whether or not a digit was received from the magnetic drum channel M10. The sensing of a digit from the reading head M11 will set the flip-flop circuit M13; and the absence of a digit from the reading head M11 will cause the flip-flop circuit M13 to be reset by a clock pulse CP. At a time when the flip-flop circuit M13 is in a set state, indicating the presence of a digit, such a digit may either be passed to the early bus EB, via a gate circuit M15, or returned to be again recorded on the magnetic drum channel M10. The gate circuit M15 is qualified to pass digits from the flip-flop circuit M13 to the early bus EB if high signals are applied at both terminals M16 and M17.

The terminals M16 and M17 are connected to receive a particular pair of the source index signals from the source decoding system 128 shown in FIGURE 18. Each of the magnetic storage circuits 2 through 18 will receive a different pair of source signals. The source signals for each of the different 18 magnetic storage circuits are shown in the chart of FIGURE 19 indicating particular magnetic storage circuits as numerical information sources. In the event that the terminals M16 and M17 both receive a high source signal, it will be indicated that the information which is presently being taken from the magnetic drum channel M10 is to be transferred to the early bus EB. It may therefore be seen that depending upon which of the signals from the source decoding system are high, a determination of the source of the numerical information to be transferred will be made. For example, assume that the typical magnetic storage circuit shown in FIGURE 18 is magnetic storage circuit 2. In this case, the terminal M16 would be connected to detect the presence of a high signal S0, and the terminal M17 would be connected to detect the presence of a high signal SW. At a time when the magnetic storage circuit 2 is designated as an information source the signals S0 and SW will both be high. The gate circuit M15 will upon receiving high signals SW and S0, be qualified and pass the numerical information from the flip-flop circuit M13 to the early bus EB. Each of the other 17 magnetic drum channels will similarly be adapted to deliver information on a particular source command as indicated in the chart of FIGURE 19. The numerical information recorded upon the magnetic drum channel M10 is erased after the magnetic drum passes the read head M11. After the numerical information is read into the flip-flop circuit M13, it may either be sacrificed to make room for new information, or be rerecorded upon the magnetic drum channel.

The setting of flip-flop circuit M13 passes a high digit-indicating signal to a pair of gate circuits M18 and M19. The gate circuits M18 and M19 provide the path for numerical information to return for rerecording in the magnetic drum channel M10 when it is desired to rerecord such numerical information. It is therefore necessary that one of the gate circuits M18 or M19 be qualified by a high signal at terminals M20 or M21 at a time when no new information is being placed in the magnetic storage circuit, i.e., when the magnetic storage circuit is not to be a destination for information. The gate circuits M18 or M19 must, therefore, be qualified by the negations of the particular destination signals which are assigned to the particular magnetic storage circuit under consideration. That is, either the gate circuit M18 or the gate circuit M19 must receive a qualifying signal, at terminal M20 or at terminal M21, which is high during all times except when the particular typical magnetic storage circuit is to receive new information. At a time when new information is received, neither the gate circuit M18 or the gate circuit M19 will be qualified, and the information formerly recorded in the magnetic drum channel M10 will be sacrificed to make space for the new information. The two gate circuits M18 and M19 are both needed because the two destination signals required to specify the magnetic storage circuit as a destination may occur individually as a part of other destination instructions. The presence of one such signal, will, however, leave either the gate circuit M18 or the gate circuit M19 open as a path of circulation.

Again assume, for purposes of illustration, that the magnetic storage circuit shown in FIGURE 20 is the magnetic storage channel 2. To render one of the gates M18 or M19 qualified to pass a signal, it would be necessary that there be present either a high signal *n*D0 on a terminal M20 or a high signal *n*DW, on a terminal M21.

The signals *n*D0 and *n*DW are from the index control circuits and alternately one of the signals will be high at all times when no information is being sent into magnetic storage channel 2. The presence of one of these signals will allow the information from the flip-flop circuit M13 to pass to an amplifier circuit M22 to be amplified and then passed to a recording head M23 to be rerecorded upon the magnetic storage line M10. It may, therefore, be seen that unless a particular magnetic storage circuit is to be used as a destination for numerical information presently being operated upon in the computer, the numerical information in the storage circuit will cycle and remain preserved.

Consider now, further to the above example, that neither of the signals *n*D0 or *n*DW are high at the gate circuits M20 and M18. In this case, the destination signals D0 and DW will then be high, and will be applied to terminals M25 and M26 of a gate circuit M24. The gate circuit M24, in the example, will be qualified by the presence of these signals D0 and DW both being high, and the magnetic storage circuit 2 will be indicated as a destination. At the time when the gate circuit M24 is in a qualified state, information may be passed through the gate circuit M24 from the terminal 27, which is connected in each of the magnetic storage circuits to receive information from the late bus LB. The new incoming information from the late bus LB may thus, on the occurrence of both of a particular pair of destination signals, pass to the amplifier M22 and be recorded on the magnetic drum channel M10.

In the operation of the typical magnetic drum channel as shown in FIGURE 20, information is taken by means of the magnetic reading head M11 from the magnetic drum channel M10. This information may then take one of two alternate paths or both of the available paths. In the event that the source decoding system of the indexing system calls for the location of this information as a source, the information from the magnetic drum channel M10 will then be passed through the gate M15 to the early bus EB and may or may not also pass the gate circuits M18 or M19 to be recorded in magnetic drum channel M10. In the event, however, that this information is not desired, or that this particular location is not specified as a source, then the information will pass onto the gate circuits M18 and M19, where it will be determined whether or not the numerical information shall be rerecorded in the magnetic drum channel M10 or be sacrificed to provide space for other information. Acting to determine whether or not this numerical information will be rerecorded or sacrificed, is the presence or absence of both of two destination signals, from the index control circuit, to indicate the magnetic storage circuits as the destination for information from the late bus LB. If new information is to be recorded, the gate circuit M24 will be qualified by signals from the destination decoding system 127 of FIGURE 18 and the late bus LB will be connected directly to the amplifier M22 through the terminal M27 and the gate circuit M24.

The qualification of the gate circuit M24, by signals appearing at the terminals M25 and M26, will of course, be in time coincidence with the unqualified state of the gate circuits M18 and M19. This is so because the signals which qualify the gate circuits M18 and M19 are the negation of the signals which serve to qualify the gate circuit M24. It may therefore be seen, that the information stored in each of the magnetic storage circuits circulates either to be rerecorded in a magnetic drum channel, or to be replaced by new numerical information from the late bus LB. In the event other information replaces the information previously stored in a part of the magnetic drum channel M10, the late bus LB will be connected to the magnetic drum channel M10 by means of the qualification of the gate circuit M24.

In addition to the 17 typical magnetic storage circuits in the computer which are numbered inclusively from 2 to 18 there are provided magnetic memory circuits 0 and 1 which are operated jointly to store and manipulate the command words utilized in controlling the operation of the computer.

Referring now to FIGURE 21, there are shown a pair of magnetic storage circuits 1 and 0. The individual magnetic storage circuits 1 and 0 may be seen to be very similar to the typical magnetic storage circuit as shown in FIGURE 20. The two magnetic storage circuits 0 and 1 are interconnected by meas of a flip-flop circuit M28. The set or reset state of the flip-flop circuit M28 controls from which of magnetic storage circuits 0 to 1 new commands will be taken. The manner of setting and resetting the flip-flop circuit M28 will be later described.

Referring now to FIGURE 21 in more detail, there is shown a magnetic drum channel M30 which is associated with the magnetic storage circuit 1 and a magnetic drum channel M31 which is associated with the magnetic storage circuit 0. The magnetic drum channels M30 and M31 have associated with them reading heads M32 and M33 respectively, and writing heads M34 and M35 respectively. The basic operation of the magnetic storage circuits 0 and 1 is similar to the operation of the typical magnetic storage circuits 2 to 18 as previously described in relation to FIGURE 20.

The stored numerical information on the magnetic drum channel M30 is read by means of a reading head M32, amplified by an amplifier M36, and then coupled to a flip-flop circuit M37. The numerical information passes from the flip-flop circuit M37 to a gate circuit M38 which is connected to the early bus EB. If the information is to pass on to the early bus EB the gate circuit M38 shall be qualified by the application of high source signals S0 and SV at terminals M39 and M40; however, if the information is not to be passed to the early bus EB via the gate circuit M38, then the gate circuit M38 is not qualified, i.e., no qualifying high signals S0 and SV will appear at the terminals M39 and M40.

In the event the numerical information from the flip-flop circuit M37 is to be rerecorded, either the gate circuits M41 or M42 will be qualified to pass such information by the occurrence of one of the signals *n*D0 or *n*DV being high, at terminals M43 and M44. The signals *n*D0 and *n*DV applied at the terminals M43 and M44 are the negation of the signals D0 and DV applied at terminals M47 and M48 to qualify the gate circuit M45. By utilizing the negation of the signals applied at the terminals M47 and M48 at the terminals M43 and M44, it may be seen that either the gate circuit M45 is qualified or the gate circuits M41 and M42 are qualified. However, the gate circuits M45, M42, and M41 are never all qualified, nor all unqualified.

The information recorded upon the magnetic drum channel M30 may be seen to be either rerecorded or new information may be recorded in its place. The operation of the magnetic storage circuit 0 is similar to the operation of the magnetic storage circuit 1.

The numerical information from the magnetic drum channel M31 is read by a head M33, and utilized after passing through an amplifier M49 to set a flip-flop circuit M50. The flip-flop circuit M50 is reset by the application of clock pulses CP, such that in the event there is no digit indicating high signal passed from the amplifier circuit M49, then the flip-flop circuit M50 will be reset to indicate no digit.

Numerical-information signals indicating the state of the flip-flop circuit M50 may be passed to the early bus EB via the gate circuit M53 when the signals S0 and SU are high, or this numerical information may be passed through either the gate circuit M54 or the gate circuit M55 to pass through an amplifier M57 and thence be rerecorded in the magnetic drum channel M31 by means of the writing head M35.

The magnetic storage circuit 0 receives command words from the input-output circuit by means of a gate circuit M64. The gate circuit M64 is connected to be qualified by a signal 074 from a flip-flop circuit in the input-output circuit. The signal 074 is high at a time when information is to be passed from the input-output circuit to the magnetic storage circuit 0. The gate circuit M64 is also connected to receive signals from a flip-flop circuit 022. The flip-flop circuit 022 is located in the input-output circuit and all information passing into the machine passes through the flip-flop circuit 022. It may therefore be seen, that when new information is passing from the input-output circuit via a flip-flop circuit 022, the gate circuit M64 will be qualified by a high signal 074.

New information from the late bus LB may be placed in the magnetic drum channel M31 by qualification of the gate circuit M56 by signal DU and D0 from the index control circuits being high. At a time when either the signals DU and O74 or the signals D0 and 074 are high, the signals *n*DU and *n*074 or *n*D0 and *n*074 will be low; therefore, the gate circuits M54 and M55 will be unqualified to pass the numerical information from the flip-flop circuit M50 when either the gate circuit M56 is passing information from the late bus LB or the gate circuit M64 is passing information from the input-output circuit.

Consider now the flip-flop circuit M28, which serves to qualify either a gate circuit M59 or a gate circuit M60, which in turn alternately allows the passage of information, via terminal M65, from one or the other of the magnetic storage circuits 0 or 1, into the index control circuits and the control circuits from which control may be effected. Note that the gate circuits M59 and M60 receive the information from the flip-flop circuits M37 and M50 in inverted form. Information which is available on one side of any flip-flop circuit will always also be available upon the other side in inverted form. In the utilization of the command information from the gate circuits M59 and M60, the information must therefore pass through an inversion stage as a buffer inverter.

In regard to the determination of which of the gate circuits M59 or M60 will be qualified as determined by whether the flip-flop circuit M28 is in a set state or in a reset state, as controlled by the gate circuits M61 and M62. The gate circuits M61 and M62 are qualified by signals derived from the index control circuits and are both qualified by the signal DS as to their *a* parts. The signal DS indicates a special command as shown and described with reference to the index control circuits, shown in FIGURE 16; therefore, the gate circuits M61 and M62 may only be qualified during a time of a special index command. The gate circuit M61 is qualified as to its parts *b* and *c* by the source signals S5 and SU, which, by reference to the chart of FIGURE 19, may be seen to indicate magnetic storage circuit 1 as a command source. The gate circuit M62 becomes qualified as to its parts *b* and *c* by source signals S5 and SV, which together indicate the fact that the command shall come from the magnetic storage circuit 1, as may be seen by again referring to the chart of FIGURE 19.

The flip-flop circuit M28 is also provided with an additional input which applies a high signal by means of a switch M63. The switch M63 is adapted to set the flip-flop circuit M28, upon the initial starting, in order to call for commands from the magnetic storage register O.

*Summary.*—It may be seen from a consideration of the above, that the main magnetic memory system is provided with a large number of magnetic storage circuits. Certain typical magnetic storage circuits 2 through 18 are utilized for information storage, and are provided with a switching system which enables information to be removed from the magnetic drum channels, rerecorded, or replaced by incoming information.

In addition to the typical magnetic storage circuits 2 through 18, there are provided two magnetic storage circuits 0 and 1, which are utilized primarily for holding the command words. The magnetic storage circuits 0 and 1 are provided with an additional switching system to determine which shall be utilized as a source of commands. The magnetic storage circuit 0 is also provided with a switching means to allow information to be transferred from the input-ouput circuit to the magnetic storage circuit 0.

SIGN CONTROL CIRCUIT

In the operation of the computer, numerical information which ordinarily must pass through the sign control circuit, may be passed from a source to a destination in a number of ways. The mode of transfer through the sign control circuits is controlled in accordance with instructions given by the mode bits 12 and 13 of the command word which are set in the flip-flop circuits I11 and I12 of the index control circuits of FIGURE 18. The information undergoing transfer may: simply pass without change, it may be transferred as one of a group of numbers to be additively combined, it may be transferred as an absolute value, it may be transferred to be subtractively combined with other numbers, it may be passed via the accumulator to accomplish a desired delay, or it may be passed via the accumulator to then be additively combined with other numbers. There is shown in FIGURE 22 a table indicating the various possible modes of transfer, and the accompanying signals from the previously described flip-flop circuits I11 and I12, in the index control circuits.

The 2-bit, mode-of-transfer portion of the command word, is expanded as shown by the chart of FIGURE 22, by using the outputs from the terminals S7 and D7. Such expansion enables six possibilities rather than the four possibilities which could otherwise be obtained from the 2-bits of information contained in the mode portion of the command word.

In the event that the flip-flop circuits I11 and I12 are both reset, causing the signals *n*I11 and *n*I12 to be high, the sign control circuit will simply pass the numerical information unaltered. The signals *n*I11 and I12 being high indicate that the numerical information undergoing transfer is to be additively combined with other numerical information. At a time when the signals I11 and *n*I12 are high and either source signal S7 or destination signal D7 is high, an absolute value mode of transfer will be indicated, and all numerical information will be transferred as positive. The substractive mode of transfer will be indicated when the signals I11 and I12 are high coupled with either source signal S7 or destination signal D7 also being high. The occurrence of these signals I11 and *n*I12 high, coupled with the occurrence of the signals *n*S7 and *n*D7 high, indicates a straight pass of numerical information, via the accumulator circuit. The signal *n*S7 is the negation of the source signal S7, and the signal *n*D7 is the negation of the destination signal D7.

In the operation of the computer, subtractions are accomplished by complementing the number to be subtracted and adding it to the number from which it is to be subtracted. This process of complementation and addition to effect a subtraction is well known, and is described in an article entitled "Arithmetic Processes for Digital Computers" by J. H. Felker which appeared in Electronics Magazine, March 1953, on page 150.

In view of the ability of the computer to add or subtract either positive or negative numbers, certain numbers preparatory to being combined must be varied in sign as well as complemented. The various functions to be performed upon different numbers by the sign control circuits will now be considered.

If a number-representing word is to be simply passed then whether the number be positive or negative, it will pass through the sign control circuits uneffected, maintaining its original sign.

The effect of the sign control circuits on a number to be added depends upon whether the number is positive or negative. Positive numbers to be added are passed through the sign control circuits unchanged; however, negative numbers which are to be added must be complemented because the addition of a negative number is essentially a subtractive process.

Numbers passed by the sign control circuits with an instruction of "absolute value" become positive numbers regardless of their original sign.

The effect of the sign control circuits upon numbers to be subtracted again depends upon whether the particular number be a positive or a negative value. The negative numbers which are to be subtracted are changed into positive numbers, because the subtraction of a negative number may be considered as an additive process. Positive numbers which are to be subtracted are changed in sign and then complemented to comply with the requirements of a subtractive process.

The numerical information, as previously stated, is handled in the computer by means of a 29-bit word. The least significant digit, i.e., the digit shown as bit 1 in FIGURE 17, indicates the sign of a number. If there is a 1 bit present in the least significant digit position, the number is negative; however, if a zero bit is present in this digit position, then the number is positive. It may, therefore, be seen that the bit in the numerical word which coincides in the command word to the type digit, is utilized as a sign digit to indicate the sign of the number.

The general movement of the numerical information in the computer is from a particular one of the information handling circuits to the early bus EB, from the early bus EB through the sign control circuits, which perform one of the operations set out above, then via the intermediate bus IB either to the late bus LB directly or through the accumulator circuit to the late bus LB. From the late bus LB the information returns to another particular information handling circuit.

Figure 23:
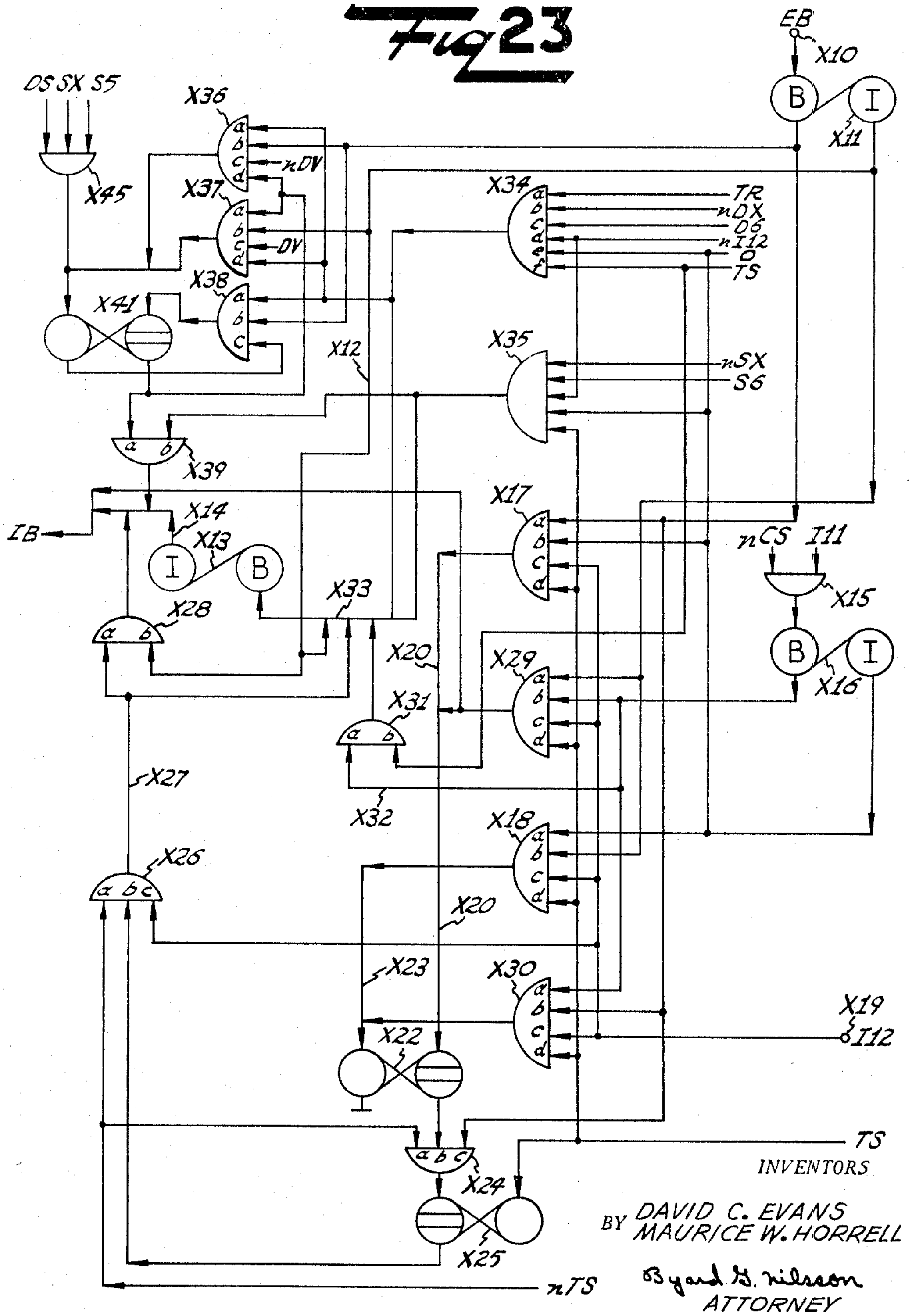
FIGURE 23 shows a symbolic block diagrammatic representation of a sign control circuit.

Refer now to FIGURE 23, relative to which the various modes of operation of the sign control circuits will now be discussed.

Consider first a situation where the sign control circuits are transferring the information in simply a straight pass manner. During the simple information pass, i.e., plain uneffected transfer, the information from the early bus EB appears at a terminal X10 from which it is connected to a buffer inverter X11. The two outputs from the buffer inverter X11, are, of course, a signal coinciding to the signal from the early bus EB, which appears at the terminal X10, and a signal inverted in form from the signal from the early bus EB. The inverted form of the numerical information from the early bus EB passes via a line X12 to a line X33 and then to a buffer inverter X13.

The line X33 is connected to receive numerical information from several sources; therefore, as the different modes of operation of the sign control circuits are considered, the discussion will mention only the means of signal entry to the line X33 that are currently in use.

The output from the inverter side of the buffer inverter X13 on line X14 may be seen to contain the information which appeared from the early bus EB at terminal X10. The numerical information has undergone two inversions, and is, therefore, returned to its original state. The line X14 is directly connected to the intermediate bus IB.

The performance of double inversion is not a necessary mode of operation; however, such an arrangement makes it possible to obtain a more economical design of circuitry in the sign control circuits generally.

The numerical information leaving the sign control circuits via the intermediate bus IB passes to the late bus LB, either directly or via the accumulator circuit. The circuitry for accomplishing the alternatives is shown and described in connection with the accumulator circuit.

Consider now the operation of the sign control circuits when passing a number to be additively combined. As previously stated, positive numbers which are to be added are passed through the sign control circuit unchanged, while negative numbers to be added are complemented. At a time when the number to be passed is negative, the flip-flop circuit X22 will be set; and at a time when the number is positive, the flip-flop circuit X22 will be reset. The manner of setting and resetting the flip-flop circuit X22 will now be considered.

Reference to FIGURE 22 will indicate that the existing conditions for the operation of the sign control circuits when passing a number to be additively combined are that the flip-flop circuit I12 be in a set state, and that the flip-flop circuit I11 be in a reset state. It is to be noted that during the period under consideration the numbers are not passing through the accumulator, a fact which will cause the signal *nCS*, to be high and partly qualify the gate circuit X15. The signal I11, however, is low and the gate circuit X15 will, therefore, not be qualified. The gate circuit X15 being unqualified will cause the buffer inverter circuit X16 to produce a high signal on the inverter side, which will qualify the gate circuits X17 and X18 as to their parts *b* and *a*, respectively.

Considering now the operation of the gate circuit X17, it may be seen that the part *a* of the gate circuit X17 will be qualified by the presence of digit indicating information from the early bus EB. The part *c* of the gate circuit X17 will be qualified through the terminal X19 which is adapted to receive a signal from the flip-flop circuit I12, which is, as shown in the chart of FIGURE 22, set during the add state. The part *d* of the gate circuit X17 will be qualified during the period when the timing pulse TS is high, which as has previously been stated, occurs at the beginning of every word time. Thus may be seen, the manner in which the gate circuit X17 becomes fully qualified. The part *a* of the gate circuit X17 is connected to the buffer output from the buffer inverter X11, which is directly connected to the early bus EB by the terminal X10. If the bit in the first digit position of a word coming from the early bus EB is a one digit, indicating a negative number, the gate X17 will be fully qualified and pass a high signal via a line X20 to set a flip-flop circuit X22. Flip-flop circuit X22 is a set state, indicates that the present number being handled is a negative number.

The manner in which control is effected by the state of the flip-flop circuit X22 will be later explained; however, consider now the manner of qualification of the gate circuit X18. During the add mode part *a* of the gate circuit X18 will be qualified by the signal from the buffer inverter X16 as previously explained. The part *c* of the gate circuit X18 will be qualified due to the action of the flip-flop circuit I12 which will be set as indicated by the chart of FIGURE 22 and will send a qualifying high signal via the terminal X19 to the part *c* of the gate circuit X18. The part *d* of the gate circuit X18 will be set at the beginning of a word by the signal TS. The part *b* of the gate circuit X18 is connected to the buffer inverter X11 to receive an inverted form of the two state signal from the early bus EB. It may, therefore, be seen that if there is no one digit in the first digit position of the word (indicating a positive number), there will be a high signal on the inverter side of the buffer inverter X11 which will be passed to the part *c* of the gate circuit X18 to fully qualify the gate circuit X18 and thus form a high signal to reset the flip-flop circuit X22 via the line X23.

It may therefore be seen that if the first bit of a word received from the early bus EB by the sign control circuit is a one digit, the flip-flop circuit X22 will be in a set state, indicating the presence of a negative number. However, in the event that the bit in the first digit position of the word received at the sign control circuits is a zero, then the flip-flop circuit X22 will be in a reset state indicating a positive number is being passed.

If the flip-flop circuit X22 is in a set state indicating a negative number, the gate circuit X24 will be qualified as to its part *b*. Part *a* of the gate circuit X24 will be qualified immediately after the first bit of a word due to the fact that its qualifying signal is *n*TS. The part *c* of the gate circuit X24 is connected directly to the buffer inverter X11, on the buffer side, so that it is adapted to receive numerical information from the early bus EB via the terminal X10. At the time of the first one digit of a negative number, the gate circuit X24 will be fully qualified and pass a signal to set the flip-flop circuit X25. Flip-flop circuit X25 will thus be set by the first one digit which occurs after a negative sign-indicating digit. The output from the flip-flop circuit X25 is connected to part *b* of a gate circuit X26. The part *c* of the gate circuit X26 is qualified by the flip-flop circuit I12 which is set during the add mode of operation of the sign control circuits. The part *a* of the gate circuit X26 is high after the first digit, being set high by the signal *n*TS which is high at all times except during the first digit of a word. The numerical digits of a word may thus be passed through the gate X26 during the add mode of transfer when the flip-flop circuit X25 becomes set. After passing through the gate circuit X26, the numerical information will pass to the line X27 then to the line X33, and thence through the buffer inverter circuit X13 to the intermediate bus IB.

A numerical example will now be set forth to illustrate the complementing function of the circuitry just described. Consider for example, only the five least significant figures of a binary number, omitting the sign-indicating digit which in this example is a one and was utilized to set the flip-flop circuit X22. Consider for example, the binary number 00110, representing the decimal number 6, the least significant digit being omitted as having served to indicate the sign. The complement of the binary number 00110 is 11010. An arithmetic process for deriving the complement of a binary number is described in the previously referenced Electronics Magazine article, and includes changing all the one bits to zero bits and changing all the zero bits to one bits, then adding one to the result. The operation described below will be seen to accomplish similar results. In the procedure described in detail below the complementation of binary numbers is accomplished in the following manner. The bits are considered in an order proceeding from the least significant to the most significant. If the least significant bit be a zero, it is passed as a zero to form the least significant bit of the complement. The same consideration is applied to the next to the least significant bits and so on until a one digit occurs. Upon the occurrence of a one bit, the one bit is passed in its particular digit position to the complement. After the occurrence of a one bit, the remaining more-significant bits are changed from ones to zeros and from zeros to ones.

Relating the numerical example to the circuit shown in FIGURE 23, it shall be again noted that the sign carrying bit has been excluded and was used to set the flip-flop circuit X22. The setting of the flip-flop circuit X22 by a negative-number-indicating bit will qualify the gate circuit X24 after the first digit position to allow the passage of the next one digit. However, it may be seen that as long as the least significant bits are zeros, the gate circuit X24 will not be qualified. Upon receiving the first one indicating digit, the gate circuit X24 will pass a high signal to set the flip-flop circuit X25, an operation which requires one digit position. After the flip-flop circuit X25 is set, qualifying the gate circuit X26, the digits which follow will be inverted from zeros to ones and from ones to zeros. The qualification of the gate circuit X26 passes a high signal to qualify the gate circuit X25 as to its part *a*, and to apply a high signal to the buffer inverter X13. The high signal applied to the buffer inverter X13 causes the output of the buffer inverter X13 to the line X14 and the intermediate bus IB to be low. With the gate circuit X28 qualified as to its part *a*, its part *b* may pass inverted signals from the early bus EB, which have passed through the buffer inverter circuit X11.

To recall the example of complementing 00110 to form 11010, at the time of the least significant digit position the flip-flop circuit X22 will have been set by the sign digit but the flip-flop circuit X25 will not have been set. The least significant digit of the number 00110 which is a zero, will cause the signal on the line X12 from the buffer inverter X11 to be high. This high signal on the line X12 will be converted to a low value by the buffer inverter X19 and appear low at the intermediate bus IB to indicate the zero of the least significant digit position of the complement 11010.

The next to the least significant digit position of the number 00110 contains a one digit. This digit will be represented by a high signal from the buffer inverter circuit X11 which will qualify the gate circuit X24 as to its part *c* and set the flip-flop circuit X25. The setting of the flip-flop circuit X25 will require a time equivalent to one digit position; therefore, the second least significant one digit will be passed in a manner similar to the least significant zero digit. After the flip-flop circuit X25 is set, the remaining bits of the number 00110, i.e. the three most significant bits of the complement 11010, reversal will occur due to the qualification of the gate circuit X28 as to its part *a* by the flip-flop circuit X25 being set. With the gate circuit X28 qualified as to its part *a* inverted numerical information may pass through the part *b* of the gate circuit X28 to the intermediate bus IB from the buffer inverter circuit X11. It may, therefore, be seen that the number 00110 will be complemented to form 11010, and that negative numbers which are to be added will be complemented by the sign control circuits.

In the event that the flip-flop circuit X22 is in a reset state indicating a positive number, the pulse train representing a binary number will pass to the intermediate bus IB just as it did in the case of a simple pass of a positive number, via the buffer inverters X11 and X13. A positive number to be additively combined will thus pass from the terminal X10 to the buffer inverter X11 being inverted, then to the line X12, and to the buffer inverter X13 to be inverted again, resulting in the true positive number by reason of the double inversion.

Consider now the operation of the sign control circuit during an absolute-value-mode of passage, wherein the negative-sign indicating digit is dropped. In the absolute value mode, the sign control circuit transfers information and deletes the sign indicating digits. That is to say, negative numerical information is transferred to form positive numerical information, by dropping the negative sign.

During the absolute-value mode of operation, the gate circuits X17, X29, X18, and X30 are all unqualified by to the fact that each of the gate circuits is qualified by the flip-flop circuit I12 being in a set state, and during absolute value mode of transfer, the flip-flop circuit I12 is in a reset state, as shown by the table of FIGURE 22. The fact that the gate circuits X17, X29, X18, and X30 may not be qualified will prevent the flip-flop circuit X22 from being set, so that no complementation will take place.

The gate circuit X31 is qualified as to its part *b* at a time when the timing pulse TS is high, which coincides to the time of the first digit of each word. The gate circuit X31 is qualified as to its part *a* by the flip-flop circuit I11 being in a set state, and the signal *n*CS being high, to in turn qualify the gate circuit X15 and cause the buffer side of the buffer inverter X16 to be high. The buffer side of the buffer inverter X16 being high results in the qualification of part *a* of the gate circuit X31 via the line X32. The qualification of the gate X31 allows the passage of a high signal onto the line X33 thereby holding the inverter output of the buffer inverter X13 at a low value and resulting in a zero digit during the sign-indicating digit position, to result in an absolute value transfer.

A discussion will now be directed to the operation of the sign control circuits when the mode of information passage of the circuits is to handle numerical information to be subtractively combined.

It will be recalled that when the mode of operation of the sign control circuit is to pass numbers to be subtractively combined, the sign control circuit will complement positive numbers, and pass negative numbers uncomplemented.

In a consideration of the subtractive mode of information passage, attention will be directed to the gate circuits X29 and X30 which will function to either set or reset the flip-flop circuit X22 depending on the sign of the number in passage. Reference to FIGURE 22 will indicate that during the subtractive mode of passage the flip-flop circuit I11 will be set. The signal *n*CS will be high and high values of the signals *n*CS and I11 will serve to qualify the gate circuit X15, which is connected to the buffer inverter circuit X16. The qualification of the gate circuit X15 will cause the buffer portion of the buffer inverter X16 to be high, thereby qualifying the part *b* of the gate circuit X29. It is to be noted from the table of FIGURE 22, that during the subtractive mode of operation, the flip-flop circuit I12 is also in a set state, and, therefore, the gate circuit X29 will be qualified as to its part *c*. The gate circuit X29 will be qualified as to its part *d* during the first bit of each word, as part *d* of the gate circuit X29 is connected to receive the timing pulse TS. The part *a* of the gate circuit X29 is connected to receive an inverted form of the signal from the early bus EB by means of the buffer inverter circuit X11. It may therefore be seen that during the period of the first bit of a given word the gate circuit X29 will be qualified to pass an inverted form of the first bit of a word, and will, therefore, set the flip-flop circuit X22 if the sign indicating bit is a zero, indicating a positive number.

Referring now to the gate circuit X30, part *a* of the gate circuit X30 will be qualified by the existence of the high signal *n*CS and the set state of the flip-flop circuit I11 by means of the buffer inverter circuit X16. The part *c* of the gate circuit X30 will be qualified by the set state of the flip-flop I12 which is connected to the terminal X19. The part *d* of the gate circuit X30 will be qualified during the first digit position of any given word by the timing pulse TS. The part *b* of the gate circuit X30 is connected to receive the true output from the buffer side of the buffer inverter circuit X11. It may therefore be seen that in the event the first digit of a numerical word is a one, indicating a negative number, than the gate circuit X30 will be fully qualified and pass a high signal to reset the flip-flop circuit X22. However, in the event the first bit of the word is a zero, then the gate circuit X30 will receive an inverted form of the zero, i.e. a low signal, and will not be qualified to pass a high signal. The gate signal X30 is thus connected in such a manner as to reset the flip-flop circuit X22 and the gate circuit X29 is connected in such a fashion as to set the flip-flop circuit X22. It may therefore be seen that in the event that the first digit of the numerical word is a zero, indicating a positive number, the flip-flop circuit X22 will be in a set state; however, in the event the first digit of the numerical word is a one, indicating a negative number, then the flip-flop circuit X22 will be in a reset state.

In the event that the flip-flop circuit X22 is set, the gate circuit X24 will have a part *b* qualified; however, in the event that the flip-flop circuit X22 is in a reset state, the gate circuit X24 will not be qualified in its part *b*. This, of course, may be further extended to indicate that if the first digit of a number received is a one, indicating a negative number then the flip-flop circuit X22 will be in a reset state; however, in the event that the first digit of the number is a zero, indicating a positive number then the flip-flop circuit X22 will be in a set state. The operation of determining the complementation during the substractive information passage may now be seen to be somewhat similar to the method of handling positive and negative numbers during the addition mode of numerical information pasasage.

The gate circuit X24 will be qualified as to part *a* at all times other than during the first digit position of each word, due to the fact that the part *a* of X24 is qualified by the negation timing pulse *n*TS being high. The gate circuit X24 is therefore open and ready at the time of the second digit and will remain so until a digit is received from the buffer inverter X11. If the second digit be a one, the flip-flop circuit X25 will be set as in the case of the negative number to be added, thereby qualifying the gate circuit X26; if the second digit is not a one, zeros will be passed to the intermediate bus IB just as the case involving the addition of a negative number.

At the time when the first one digit arrives a part *c* of the gate circuit X24, the gate circuit X24 will be qualified and the flip-flop circuit X25 will be set. The setting of the flip-flop circuit X25 qualifies the gate circuit X26 as to its part *b*. The part *a* of the gate circuit X26 is qualified at all times after the first bit of each word, being directly connected to receive the negation timing pulse *n*TS. The part *c* of the gate circuit X26 is qualified by the flip-flop circuit I12 which is applied at the terminal X19. The gate circuit X26 thus becomes fully qualified on the first one digit after the sign bit and transfers a high signal via line X27 to qualify the gate circuit X28 as to the part *a* and to apply a high signal to the buffer inverter X13 in such a manner as to cause the output of the buffer inverter X13 to the line X14 to be low. The part *b* of the gate circuit X28 is connected to the inverter side of the buffer inverter X11. The gate circuit X28 will, therefore, pass inverted or complemented numerical information to the intermediate bus IB after the first one bit is received. It shall be noted that as in the case of the previously described complementation, zeros result until a one digit occurs.

In the event that the flip-flop circuit X22 is in a reset state indicating a negative number is to be subtractively combined, then the gate circuit X24 may not be qualified. During the time when the gate circuit X24 is not qualified the signals which form the digits of the words will be passed uncomplemented to the intermediate bus IB via the line X14 through the buffer inverter circuit X13 with the exception of the first or sign digit, which will be cancelled out as previously described in relation to the additive mode of passage by means of the gate circuit X31.

The transfer of information via the accumulator on a straight transfer is accomplished in a manner similar to the transfer which does not occur via the accumulator. In both cases the information is placed upon the intermediate bus IB as was explained with respect to the straight transfer; however, in the case of the transfer by the accumulator, the information passes through the accumulator before returning to the late bus LB. The gate circuits for accomplishing the passage through the accumulator circuit are shown and described in the accumulator circuit section of the specification.

Insofar as addition via the accumulator is concerned, with respect to the sign control circuits the operation is carried out in a manner similar to the straight addition mode of transfer, whch is described above.

The gate circuits X34 and X35 and the gate circuits X36, X37, and X38 and the gate circuit X39 with the flip-flop circuit X41 are utilized in relation to the numerical circuits to effect multiplication and division. The flip-flop circuit X41 is used for the purpose of storing the sign digit of numbers undergoing multiplication or division. Discussion of these elements will therefore be delayed until a more appropriate time, when the multiplication and division circuits are under consideration.

*Summary*.—It may be seen by a consideration of the above detailed description, with the accompanying figure, that the sign control circuits function as a means of passing numerical information and controlling the sign digit and the complementation of numbers such as to assure that the number will be in a form proper to the operation to be performed upon the number in transfer. All circulating numerical information is transferred through the sign control circuits, and various modes of transfer are possible.

The numerical information may pass through the sign control circuits in a straight pass with no change, in which case the sign control circuits merely provide a means of passage for the numerical information.

The numerical information may be passed through the sign control circuits in such a manner that only the absolute value of the numerical information is passed. During an absolute value type transfer, positive numbers are transferred unchanged, while negative numbers drop their sign indicating bit.

Numerical information transferred through the sign control circuits may be complemented. The complementation of numerical information by the sign control circuits occurs when either a negative number is to be additively combined or whenever a positive number is to be subtractively combined.

The sign control circuits also contain a certain circuitry which is used for storing the correct sign of numbers during the process of multiplication and division; however, this portion of the sign control circuits will be discussed in detail at a more appropriate point in the specification.

ACCUMULATOR CIRCUIT

The accumulator circuit functions so as to provide a one-word accumulating register. The accumulator circuit contains a one-word magnetic drum channel having an adding circuit associated with its input such that information circulating in the register will pass through the adding circuit. Another input to the adder circuit is provided and if numerical information is sent into the accumulator circuits via the adder, this numerical information will be added to the previous contents of the accumulator circuit. Facilities are also provided for clearing and placing new information into the accumulator circuit.

In the operation of the computer, it is often desirable to cause words recorded upon one of the magnetic drum channels to be shifted by one word time in location. Such a shift has been termed a one-word precession. The accumulator, in addition to its accumulating function, may be utilized to precess digits by one word, i.e., to shift words by one word position. This one-word precession is accomplished by the one-word delay which is inherent in a one-word magnetic drum channel of the accumulator circuit.

Figure 24:
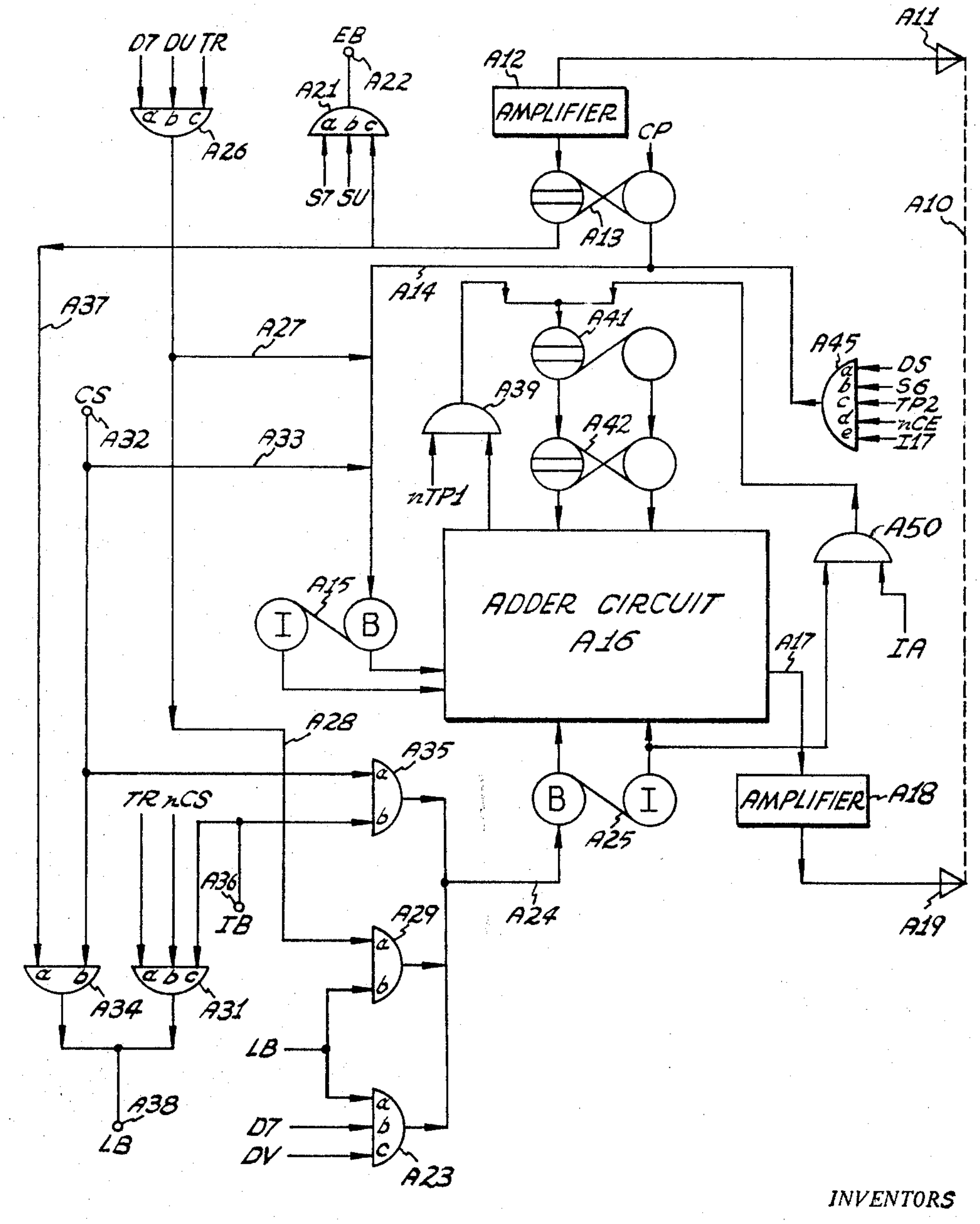
FIGURE 24 shows a symbolic block diagrammatic representation of an accumulator circuit.

Refer now to FIGURE 24. In the operation of the accumulator circuits, information flows from a magnetic drum channel A10 to a reading head A11, and thence to an amplifier A12. The output of the amplifier A12 is coupled to a flip-flop circuit A13. The state of the flip-flop circuit A13 at various intervals is determined by whether it has just received a digit and is set, or has not just received a digit, and is reset by a clock pulse CP. A signal indicating the state of the flip-flop circuit A13 is passed from the inverter side of the flip-flop circuit A13 via a line A14 to a buffer inverter circuit A15. The buffer inverter circuit A15 is then connected to act as one of the inputs to be added in an adder circuit A16. The adder circuit A16 has an output to a line A17, through which the result of addition is passed to an amplifier circuit A18 to be amplified, and coupled to a writing head A19, thence to be rerecorded upon the one-word, i.e. 29-bit, magnetic storage channel A10. The circulating numerical information which passes through the above described path may be added to zero during each cycle of operation in which event the numerical information will remain preserved, or other numerical information may be added to the contents of the accumulator circuit by the application to the other input to the adder circuit A16. The accumulated numerical information within the accumulator circuit may be removed for utilization elsewhere in the computer.

In the event that circulating numerical information is to be taken from the accumulator circuit, source signals S7 and SU from the index control circuit will be high at a gate circuit A21 thereby qualifying the gate circuit A21 both as to parts *a* and *b*. Numerical information will then be passed from the flip-flop circuit A13 to the gate circuit A21 part *c*, to pass through the gate circuit A21 to the early bus EB via terminal A22.

Consider now that it is desired to utilize the accumulator circuit as a destination for information which shall be received from the late bus LB, and be added to the numercial value which is presently circulating within the accumulator circuit. The command from the index control circuits to accomplish the application of a number from the late bus LB to the accumulator circuit requires that the signals D7 and DV be high. The high signals D7 and DV will qualify a gate circuit A23 as to parts *b* and *c*. The numerical information from the late bus LB is coupled to part *a* of the gate circuit A23 which now may be fully qualified, and the numerical information from the late bus LB may pass via the line A24 to a buffer inverter A25. The output of the buffer inverter circuit A25 forms the other input to the adder circuit A16, and numerical information from the flip-flop circuit A25 will be additively combined with the output of the buffer inverter A15 in the adder circuit A16.

The numerical information from the late bus LB will thus be passed to the adder circuit A16 via the buffer inverter circuit A25 to be added on a bit-by-bit basis with the information circulating in the accumulator, which passes through the buffer inverter circuit A15 enroute to the adder circuit A16. The output from the adder circuit A16, which consists of the additively combined numerical information from the buffer inverter circuit A15, and the numerical information from the buffer inverter circuit A25, will appear at the output line A17 to be passed to the amplifier A18 and then recorded in the magnetic drum channel A10 by means of the writing head A19.

Consider now the operation of the accumulator circuits at a time when it is desired to replace the numerical information being circulated in the accumulator circuit with other numerical information. The numerical information in storage in the accumulator circulates through the amplifier A12 and the flip-flop circuit A13, to the line A14, and then to the buffer inverter circuit A15. At a time when numerical information currently in the accumulator circuit is to be replaced by other information from the late bus LB, the index control circuits must produce high destination signals D7 and DU. The formation of the high signals D7 and DU from the destination decoding system of the index control circuits will qualify the gate circuit A26 as to parts *a* and *b*. In the operation of the computer, the period during which information undergoes a transfer or movement is indicated by the presence of a high value for the signal TR. The formation of the transfer signal TR will be later discussed in detail. During the transfer state when the transfer signal TR is high, the gate circuit A26 will be qualified as to its part *c*. With qualification, the gate circuit A26 passes a high signal which is applied to the buffer inverter circuit A15 through a line A27. The application of a high signal from the gate circuit A26, via the line A27, to the buffer inverter circuit A15 prevents the buffer inverter circuit from changing state by holding the buffer inverter circuit A15 high at its input, and thereby preventing the flow of numerical information from the flip-flop circuit A13 through the buffer inverter circuit A15. The input to the adder circuit A16 from the buffer inverter circuit A15 will now be zero bits due to the unvarying high signal applied at the buffer inverter A15 via line A27.

The high output signal from the gate circuit A26 is also applied to qualify part *a* of a gate circuit A29 via a line A28. The part *b* of the gate circuit A29 is connected to the late bus LB. Therefore, during the period when the gate circuit A26 is qualified, numerical information appearing on the late bus LB is able to pass through the gate circuit A29 onto the line A24, to the buffer inverter circuit A25, and thence into the adder circuit A16. The numerical information from the late bus LB will then flow out of the adder circuit A16, via the line A17, through the amplifier A18 and become recorded upon the magnetic storage channel A10 by the operation of the writing head A19. It may therefore be seen that during the time when the command from the index control circuit is such as to provide the signals D7 and DU high, the information which is stored in the magnetic storage channel A10 will be replaced by other numerical information which currently appears upon the late bus LB.

A consideration will now be made of the ability of the accumulator circuit shown in FIGURE 24 to precess information by one word time, that is, to shift the respective position of stored numerical information in a storage location by one-word position. Due to the fact that the accumulator circuits contain a drum channel A10, which constitutes a 29-pulse period delay between recording time and reading time, it may be seen that the accumulator circuits may be utilized to function as a delay device to delay numerical information by one word in time. It shall be recalled from the discussion of the index control circuits that the command for a one-word precession, from the indexing control circuit requires that the signal CS from the buffer inverter I32 be in a high state. The presence of the signal CS high will cause the numerical information simply to pass through the accumulator circuit and thereby be delayed by one word time.

First consider the operation of the accumulator circuits at a time when no precession is to take place. During the period of no precession, the signal CS will be low, and therefore the negation signal *n*CS will be high. The signal *n*CS will qualify a gate circuit A31 as to its part *b* at a time when the signal *n*CS is high. The gate circuit A31 will be qualified as to its part *a* by the transfer-state-indicating signal TR being high. The part *c* of the gate circuit A31 is connected to the intermediate bus IB at a terminal A36. It may therefore be seen that when precession or passage through the accumulator is not being accomplished, the gate circuit A31 will pass numerical information from the intermediate bus IB through the gate circuit A31 to the late bus LB without delay.

During the time, however, when the precess command is in existence and the signal CS is high, the intermediate bus IB will not pass information through the gate circuit A31, due to the fact that the part *b* of the gate circuit A31 is not qualified because the signal CS is high; and therefore, the signal *n*CS will be low rendering gate circuit A31 inhibited as to part *b*.

Consider now that the precess command is in effect, and that the signal CS is high. The high state of signal CS has several effects. The signal CS is applied at a terminal A32 from which it is transferred through the line A33 to the buffer inverter circuit A15. The application of the high signal CS to the buffer inverter circuit A15 has the effect of cancelling the numerical information circulating in the accumulator circuit by preventing the flow of information through the buffer inverter circuit A15, to the adder circuit A16. The prevention of flow of numerical information through the buffer inverter A15 is effected by holding the buffer inverter A15 high at its input thereby causing a zero output. The high signal CS at the terminal A32 also serves to qualify the gate circuit A34 as to part *b*. The part *a* of the gate circuit A34 is connected to the flip-flop circuit A13 such that it receives information taken from the magnetic storage channel A10. The qualification of the gate circuit A34 allows the passage of information from the flip-flop A13 through the gate circuit A34 to the late bus LB.

The signal CS being in a high state also qualifies the gate circuit A35 as to part *a*. Part *b* of the gate circuit A35 is connected directly to the intermediate bus IB at terminal A36. It may therefore be seen that information on the intermediate bus IB which appears at the terminal A36 will, during the precess command when the signal CS is high, pass through the gate circuit A35, through the line A24 to the buffer inverter circuit A25, and thence to the adder circuit A16. The numerical information from the intermediate bus IB will then be in effect added to zero then appear on the output line A17 of the adder circuit A16 and be amplified by the amplifier circuit A18, and passed on to the recording head A19 to be recorded upon the magnetic drum channel A10. At a time 29-bit periods later, coinciding to the occurrence of 29 clock pulses CP from the timing circuits, the numerical information will appear at the flip-flop circuit A13 after having been read and amplified by the reading head A11 and the amplifier A12. From the flip-flop circuit A13 the numerical information will be passed via the line A37 to the gate circuit A34, which as previously explained, is qualified during the precession period, thus allowing the information to pass to the terminal A38, which is connected to the late bus LB.

It may therefore be seen that during the precess command, when the signal CS is high, information may be taken from the intermediate bus IB at the terminal A36 passed through a 29-clock pulse delay, i.e. one-word delay, and then returned to the late bus LB, thereby effecting a one-word precession or shift. When there is no precess command, the numerical information from the sign control circuit will be passed directly from the intermediate bus IB to the late bus LB.

It is to be noted that in the operation of the accumulator circuit, it may be desirable to have means which will enable the application of a high signal, by manual operation to the line A14, thereby in effect cancelling information which is circulating within the accumulator circuits to render the contents of the accumulator zero. It may also be desirable to have connections by means of the input-output system to apply coded information directly to the line A24, in such a manner that new information may be fed from an external source directly into the buffer inverter circuit A25, thence to the adder circuit A16, through the amplifier A18 to be recorded upon the magnetic storage channel A10 by means of the writing head A19. Circuitry for the provision of these operations is not shown; however, it is to be understood that the provision of such circuits would be a simple task for one skilled in the art.

In considering the operation of the adder circuit A16, it shall be recalled that the least significant digit position, i.e. bit in any particular word, is utilized to determine whether or not the numerical information contained in that particular word is positive or negative. In the event that the least significant digit position, i.e. sign-indicating digit position, contains a zero bit, then the information is positive. In the use of the sign-indicating least significant bit, in the case of addition and subtraction of numbers, there must be no carry from the least significant digit position into the next digit position as would normally be done in a binary-adding circuit. In the event that two negative numbers are being combined, there will be a one bit in the least significant digit position of both the numbers, and the normal action of a binary adder would be to record a zero bit in the least significant digit position and carry a one bit onto the next digit position. However, when the least significant digit position is utilized as a sign indicating means, as is the case herein, there must be no carry propogated into the next digit position from the sign-indicating digit position. To prevent the carry into the next position from the sign bits upon the occurrence of two negative numbers, a gate circuit A39 is provided which receives the carry digits. The gate circuit A39 is qualified by the signal *n*TP1, therefore, the carry digits may be passed to the carry flip-flop circuit A42 (here shown external to the adder circuit A16) during all digit positions except during the sign indicating digit position when the signal *n*TP1 is low.

Consider now the addition of the two numbers negative 13 and negative 18 in binary form. For purposes of this illustration, assume that the capacity of the word is only six digits including the sign-indicating digit. The negative numbers −13 and −18 are complemented as described with respect to the sign control circuits, and become respectively 100111 and 011101 in binary form. Refer now to FIGURE 25. In the FIGURE 25 there are shown the assumed digit positions 1 through 6 of the arbitrarily chosen six digit word. Immediately below the digit position line are the decimal equivalents of the binary digit positions. Listed below the decimal equivalent row is the binary complement 011101 to be used in the illustrative example, which is equivalent to decimal negative 18. Below the complement 011101 is the binary complement 100111 of the decimal number, negative 13. It will now be noted that upon summing the numbers in accordance with the mode of operation of the adder circuit A16 of the accumulator circuit, in the first digit position, the sign-indicating ones in both the first and the second number will be added to result in a zero, however, the resulting carry digit will be blocked as previously described. Summing the remainder of the number, in the second digit position the one bit will result in a one bit in the sum, in the third digit position the two one-bit will result in a zero, and a one bit will be carried to the fourth digit position which will again result in a zero when combined with the one bit in position four, thereby effecting another carry operation into the next digit position, or the fifth digit position, again resulting in a zero wth a carry into the sixth digit position resulting in a zero in the sixth digit position and passing on a one bit to the next digit position. It is to be understood, however, that the next digit position is the first digit position, and an end-around-carry is effected to supply the negative sign-indicating digit. The end-around-carry of the sign digit is effective to be recorded in the first digit position, due to the fact that the accumulator circuit comprises a recirculating type register. The resulting sum is thus a complemented equivalent of decimal −31. The previously referenced article describing manipulation of binary numbers may be consulted for a further discussion relative to the operation of binary complemented numbers.

The operation of the adder circuit A16 to effect an end-around-carry as above described is to place a signal indicative of a one digit on the buffer inverter A41 of the adder circuit A16, at the time when the capacity of the register is exceeded. The electrical signal so placed in the buffer inverter A41 will be then applied to the flip-flop circuit A42 and thus the flip-flop circuit A42 stores the one indicating digit such that it may be placed in the sign indicating digit position to indicate a complemented or negative number in the next cycle of operation.

During certain phases of operation it may be desirable to add a one bit to the adder circuit A16 at a time when ($n$CE)·(TP2) is true, i.e., at a time when the signal *n*CE is high during timing pulse TP2. The effect of such an addition is to cause the accumulator to count by ones to a predetermined number during shifting operations. To effect such an addition, a gate circuit A45 is provided. The gate circuit A45 is qualified in part during the special command when the signal DS is high. The remaining qualification of the gate circuit occurs during a shifting operation when the signals S6 and I17 are high. When qualified, the gate circuit will act to detect the presence of a high signal *n*CE occurring at the time of the timing pulse TP2, and upon such an occurrence a digit will be added to the number circulating in the accumulator circuits. In this manner digits may be added to the contents of the accumulator circuits until such time as a predetermined number of digits have been so added.

Adapted to provide a high signal to set the flip-flop circuit A42 via the buffer inverter circuit A41 is a gate circuit A50. The action of the gate circuit A50 is to provide for a special situation when the computer functions to handle a zero numerical value. In the discussion of the index control circuits, a signal IA was generated for a then unexplained purpose. At a time when the computer acts to subtractively combine numerical information, the sign control circuits will give the numerical information a negative-sign-indicating digit and then complement the numerical information by passing zero bits from the least significant to the most significant until a one digit is received. With this mode of operation, in the event that a zero is the number being subtractively combined, a zero value having a negative-sign-indicating digit will be passed to the accumulator circuits to be combined with other numerical information. The addition of the zero value having a negative sign will change the sign of the contents of the accumulator creating an error. Provision is therefore made in each of the accumulator circuits to correct for this special situation when a zero is to be subtractively combined. The function of the gate circuit A50 is to provide a digit which will be added to the undesired one digit in the sign-indicating digit position to again change the sign, thereby correcting the error. The carry-digit resulting from such an addition is not propagated, as is always the case of the sign indicating digit position. The gate circuit A50 provides the digit which is added at the sign-indicating digit position to return the content of this digit position to its correct value. The gate circuit A50 is qualified if there is no digit input as will be indicated by a high signal from the inverter side of the buffer inverter A25. The gate circuit A50 is further qualified by a signal IA, the formation of which was described in the discussion of the index control circuits. The signal IA contains the factors TP29·TR·D7·*n*I23·X22·*n*X25. The timing pulse TP29 is utilized as the time of digit insertion because the flip-flop A42 will incur a one-bit delay to cause a digit to be inserted at the sign-indicating first digit position. The term TR conditions the signal IA high during transfer state. The terms D7 and *n*I23 indicate that the destination is the accumulator circuits. The term X22 is from the sign control circuits and indicates a negative sign is present in the numerical information under transfer. The term *n*X25 indicates that no digit other than the sign digit has been received by the sign control circuits indicating a zero value. The signal IA as formed may therefore be seen to indicate as described above that it is necessary to add a digit in the sign-indicating digit position to correct the error formed in the sign control circuits when operating to subtract a zero value. Note that when the numerical information being subtractively combined is not a zero, there will be a resulting end-around-carry in the accumulator circuit which will correct the sign-indicating bit, as was shown in the above numerical example.

*Summary.*—A consideration of the above detailed explanation of the accumulator circuits reveals that basically the accumulator circuits comprise storage means for storing one word of numerical information having entry and exit means, and having facilities for adding numerical information to the content of the storage means.

Provisions are made which enable the utilization of the accumulator circuits as a one-word delay or precession system. By transferring information to be precessed by one-word, through the one-word storage means of the accumulator circuits a one-word delay is effected.

In addition the accumulator circuits may be operated in such a manner, that numerical information is placed in the accumulator circuits and has digits added to it, until a predetermined number of additions have been effected.

NUMERICAL CIRCUITS

Figure 26:
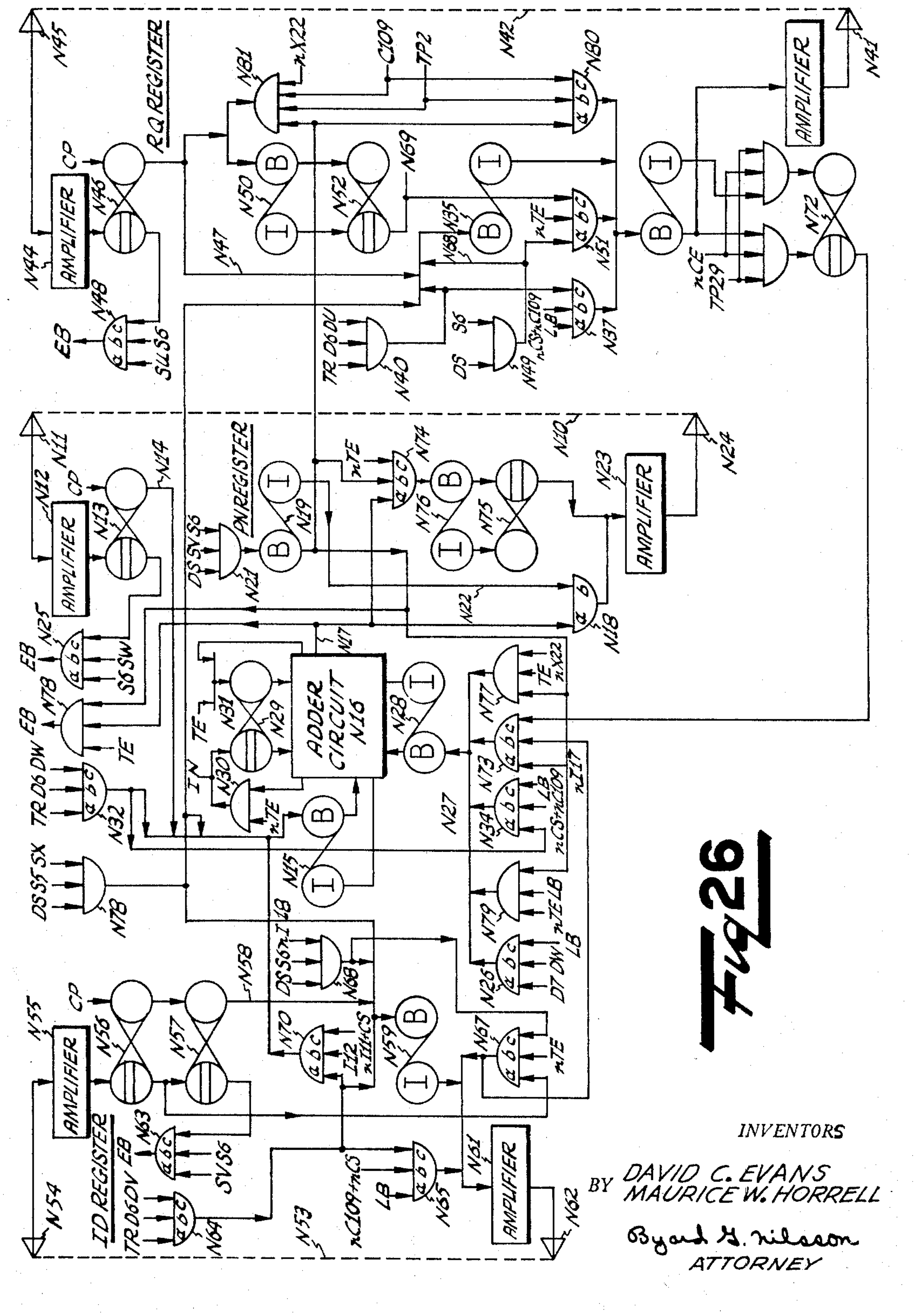
FIGURE 26 shows a symbolic block diagrammatic representation of a control circuit.

Reference will now be made to FIGURE 26 which shows a diagrammatic representation of the numerical circuits. The numerical circuits are utilized for multiplying, dividing, accumulating, shifting and normalizing numerical information.

The numerical circuits are made up of three register circuits, each of which contains a magnetic drum channel. An ID register stores the multiplicand during the multication process and the denominator during the division process. A PN register, has an adder associated with a magnetic drum channel, and operates similarly to the accumulator circuit. The PN register is utilized to store the product during the multiplication process and the numerator during the division process. An RQ register is utilized to store the multiplier during the process of multiplication and a quotient during the process of division. The description will first be directed toward the use of the PN register, which functions in a manner similar to the accumulator circuit.

The PN register is effectively a two-word accumulator circuit. The numerical information is stored on a magnetic drum channel N10 which effects a 58-digit position delay between writing and reading. A reading head N11 is positioned in such a manner as to read numerical information stored upon the 58-bit magnetic drum channel N10. From the reading head N11 the numerical information is passed to an amplifier circuit N12, amplified and then coupled to a flip-flop circuit N13. The numerical information is taken from the flip-flop circuit N13 via a line N14 and applied to a buffer inverter circuit N15, from which the numerical information is passed to an adder circuit N16. There are several sources of signals coupled to the buffer inverter circuit N15, each of which will be individually considered. Sources of signals that are not specifically mentioned in a particular discussion will be understood to be inoperative relative to that particular discussion. The numerical information applied to the adder circuit N16 from the buffer inverter circuit N15 reappears additively combined with an other input to the adder circuit N16 in the output line N17, and is then coupled to a gate circuit N18. The gate circuit N18 is qualified as to its part *b* at a time when a buffer inverter circuit N19 does not receive a high signal from a gate circuit N21. A discussion of the manner of qualification of the gate circuit N21 will be made at a more appropriate time in the specification. However, during the recirculation of information in the PN register, the gate circuit N21 is not qualified; therefore, a high signal is present at the inverter side of the buffer inverter N19, and is transmitted via a line N22 to qualify the gate circuit N18 as to its part *b*. The numerical information from the adder circuit N16, appearing on the line N17 and being applied to the part *a* of the gate circuit N8, will pass through the gate circuit N18 and be applied to an amplifier circuit N23. The output of the amplifier circuit N23 is connected to a writing head N24 which re-records the numerical information on the 58-bit magnetic drum channel N10.

In the use of the PN register as a two-word accumulator circuit, the sign of numbers being handled, as is normal in the computer, will be stored in the first digit position of the words in the magnetic drum channel N10. The mode of sign handling is similar to that described with respect to the accumulator circuits.

In the event that it is desired to transfer information out of the PN register, considering the register as an accumulator, the index control circuits must be so set as to provide high output signals SW and S6. The occurrence of high signals SW and S6 will qualify a gate circuit N25 as to parts *a* and *b*. Part *c* of the gate circuit N25 is connected to the output of the flip-flop circuit N13, such that the numerical information passing through the flip-flop circuit N13 will be transferred to the qualified gate circuit N25 and thence directly to the early bus EB.

At a time when it is desired to add new numerical information to the numerical information presently in the PN register, the indexing control circuit will be set up in such a manner as to produce high values for destination signal D7 and destination signal DW, to thereby qualify the gate circuit N26 as to parts *a* and *b*. The part *c* of the gate circuit N26 is connected directly to the late bus LB; therefore, numerical information applied from the late bus LB to the part *c* of the gate circuit N26 may pass through the gate circuit N26 to the line N27. From line N27, the information passes to a buffer inverter circuit N28 and thence to the adder circuit N16 to be additively combined with information received by the adder circuit N16 from the buffer inverter circuit N15. The result of this addition is then placed on the magnetic drum channel N10. The numerous inputs to the line X27 will, as usual, be individually considered, and again, those inputs not mentioned relative to a particular discussion will be inoperative during the period of operation under discussion.

In the addition of numerical information applied from the buffer inverter circuit N28 and numerical information applied from the buffer inverter circuit N15, by the binary adder circuit N16, a flip-flop circuit N29 is utilized to store the carry digits, and is shown external to the adder circuit N16.

In the operation of the PN register as an adding accumulator, there is a suppression of the carry digit during the first digit position additions such that the sign digit does not propagate a carry digit into the next digit position. The suppression of the carry of the sign digit is effected by an input TE at a terminal N31, and a gate circuit N30 having inputs consisting of the carry digit and the signal *n*TE which will hold the carry flop-flop circuit N31 in a reset state during the sign-indicating digit position. A similar mode of operation was described with respect to the accumulator circuit, with the exception that the PN register acting as an accumulator handles double-word-length words, i.e. words having a length of 58 bits. The effect of the double-word-length operation on sign control system is to require that the signal which prevents carry of the sign bit must occur high only at the beginning of each double length word; such a signal has previously been described to be the signal TE.

Similar to the mode of operation of the single word accumulator circuit, the PN register may be operated in such a manner that new numerical information will replace previously stored numerical information located in the PN register. Upon the occurrence of high destination signals D6 and DW from the index control circuit, a gate circuit N32 will be qualified as to its parts *b* and *c*. During the period of transfer operation, which has been previously described, the signal TR will be high so that the gate circuit N32 will become fully qualified and pass a high signal to the line N33. The line N33 upon receiving a continually high signal from the gate circuit N32 will cause the numerical information received from the flip-flop circuit N13 via the line N14 to be suppressed by preventing the buffer inverter N15 from changing states thereby preventing the passage of numerical information to the adder circuit N16.

The qualification of the gate circuit N32 also passes a signal to a gate circuit N34, which qualifies the gate N34 as to its part *a*. The qualification of the gate circuit N34 further requires the presence of a signal *n*CS+*n*C109 high. The formation of this signal was described in connection with the index oontrol circuits. The occurrence of a high signal representing *n*CS+*n*C109 will qualify the gate circuit N34 as to its part *b*. The occurrence of the term *n*CS+*n*C109 coincides to either an odd word time, or a time when no precession through the accumulator is occurring. The effect is therefore to allow new numerical information to be placed in the PN register only during odd words or when there is no precession through the accumulator. The gate circuit N34 thus becomes fully qualified for high signals received at the part *c* which is connected to the late bus LB. It may therefore be seen that signals from the late bus LB will pass through the gate circuit N34 onto the line N27, to the buffer inverter N28, and thence to the adder circuit N16 and information previously circulating in the PN register will be replaced by new information from the late bus LB. A similar mode of operation was described with respect to the one-word accumulator circuit. The requirement for the term *n*CS+*n*C109 assures that the numerical information placed in the PN register is placed in the odd word portion or placed in the PN register when no precession is taking place. This requirement is necessary in setting the registers preparatory to numerical computation. Due to the requirement, only odd words may pass the gate circuit N34; however, it is possible to pick up a word from an even word position in the memory system and by precessing it through the accumulator make the word appear in an odd word position in the PN register. Numerical information is thus prevented from reading into the even word position in the PN register, when an operation involving a precession via AR is in process. The above described process will later be seen to be necessary during multiplication, division, and shifting.

Consider now the manner in which information is transferred into and out of the RQ register. At a time when the index control circuits are so set as to produce a high destination signal D6 and a high destination signal DU, the gate circuit N40 will be qualified as to its parts *b* and *c*. During the period of transfer when the signal TR is high, the gate circuit N40 will be qualified as to its part *a*. At a time when the gate circuit N40 is fully qualified a high signal will be passed to a buffer inverter circuit N35. Due to the fact that numerical information circulating within the RQ register passes through the buffer inverter circuit N35, the fact that the buffer inverter circuit N35 receives a constantly high signal from the gate circuit N40 will cause the buffer inverter circuit N35 to be held in one state, thereby disabling the buffer inverter circuit N35 from circulating numerical information, other than zeros.

At a time when the gate circuit N40 is in a qualified state, it may be seen that the numerical information circulating within the RQ register will be in effect erased by the signal applied to the buffer inverter circuit N35. The output from the gate circuit N40 is also applied to a gate circuit N37, qualifying the gate circuit N37 as to its part *c*. The part *b* of the gate circuit N37 is qualified by the signal *n*CS+*n*C109 being high. The discussion relative to the PN register of the signal *n*CS+*n*C109 will also apply here. The part *a* of the gate circuit N37 is connected to the late bus LB such that numerical information appearing upon the late bus LB will now be passed through the gate circuit N37 to the buffer inverter circuit N38 and thence to an amplifier circuit N39, where the numerical information will be amplified before being applied to a writing head N41 from which the information is recorded upon a 58-bit magnetic drum channel N42.

The path of numerical information once in the RQ register is simply a recirculating loop, from the magnetic storage channel N42 to an amplifier circuit N44 by means of the reading head N45. After being amplified, the information is passed to set or allow the resetting, in the usual manner by clock pulses CP, of a flip-flop circuit N46. The state of the flip-flop circuit N46 is passed on by means of a line N47 to the buffer inverter circuit N35. The output from the inverter portion of the buffer inverter circuit N35 is coupled to an amplifier circuit N39 via the buffer inverter circuit N38, to be then rerecorded upon the magnetic storage channel N42 by means of the recording head N41. It is to be noted that a double inversion takes place in the numerical information, by reason of the action of the flip-flop circuit N46 and the buffer inverter circuit N35.

In the event it is desired to transfer information out of the RQ register, the index control circuits will be set up so as to form source signals SU and S6 high. The signals SU and S6 being high will qualify the gate circuit N48 as to its parts *a* and *b*. With the gate circuit N48 qualified as to its parts *a* and *b*, numerical information circulating in the RQ register, after passing through the flip-flop circuit N46 will appear at the part *c* of the gate circuit N48. The fact that the gate circuit N48 is qualified as to its parts *a* and *b* allows the information appearing at the part *c* of the gate circuit N48 to pass through the gate circuit N48 and appear at the early bus EB. In this manner numerical information circulating within the RQ register may be removed to the early bus EB on command.

During the performance of certain arithmetic operations, as will be later explained, it becomes necessary to shift the bits circulating in the RQ register one digit position to the left every 2-word times as the numerical information completes one circulation in the register. The shift in digit positions of the digits is effected by increasing the length of the path of the cycling numerical information by one digit position. A flip-flop circuit is switched into and out of the cycling path depending on whether position shifting, i.e. precession, is or is not desired. The need for digit shifting is present during the operations of multiplication, division, shift, and normalization. During multiplication, division, shift, and normalizaton, a gate circuit N49 associated with the RQ register is qualified by the special index signal DS being high, and by the source signal S6 being high. The qualification of the gate circuit N49 has the effect of blocking the buffer inverter circuit N35 to effectively erase information circulating within the RQ register by holding the input to the buffer inverter N35 high and the output low to indicate zero values. The gate circuit N49 being qualified, also qualifies a gate circuit N51 as to part *a*. The gate circuit N51 is qualified as to its part *b* at all times other than the first digit position of each word by the application of the negation signal *n*TE. During the periods when the numerical circuit is functioning to divide, multiply, shift, or normalize, the gate circuit N51 will be opened to allow information from flip-flop circuit N52 to pass through the gate circuit N51 to the amplifier circuit N39 and the magnetic recording head N41. The opening of the gate circuit N51 thereby allows the information cycling in the RQ register to pass through the flip-flop circuit N52, the gate circuit N51, and has the effect of making the recirculation loop of the RQ register one clock pulse interval longer than during operation where circulation does not pass through the flip-flop circuit N52. The effect of making the recirculation loop longer in time by one clock pulse is to shift the bits in the RQ register one digit position left in such a manner as to have the effect of multiplying the numerical information stored within the register by two each time a cycle of circulation is completed.

Note that the fact that the gate circuit N51 must be qualified by the signal *n*TE will cause any bits which precess into the sign indicating digit position not to be recorded on the magnetic drum channel N42.

To review, the two alternate paths for numerical information cycling in the RQ register are as follows: The non-precessing path includes the reading head N45, the amplifier N44, the flip-flop circuit N46, the line N47, the buffer inverter circuit N35, the buffer inverter circuit N38, the amplifier N39, and the writing head N41. The path taken by the numerical information during a one-bit precession includes, the reading head N45, the amplifier N44, the flip-flop circuit N46, the buffer inverter circuit N50, the flip-flop circuit N52, the gate circuit N51, the buffer inverter circuit N38, the amplifier N39, and the writing head N41. The latter path may be seen to contain a one-bit-period delay over the former path.

Consider now the ID register as shown diagrammatically in FIGURE 26. In the normal course of information circulation in the ID register, the numerical information from a magnetic drum channel N53 which comprises a 57-bit time delay is detected by a reading head N54, then applied to an amplifier circuit N55, wherein the numerical information representing two-state signals is amplified and applied to a flip-flop circuit N56. The flip-flop circuit N56 indicates numerical information by either being in a set state or reset state in the usual manner. The flip-flop circuit N56 is coupled to a flip-flop circuit N57. The state of the flip-flop circuit N56 is thus passed directly to control the state of the flip-flop circuit N57, and thence by means of a line N58 to a buffer inverter circuit N59. The numerical information passing through the buffer inverter circuit N59 is connected from the inverter portion of the buffer inverter circuit N59 to an amplifier circuit N61. The information passed to an amplifier circuit N61 is then applied to a writing head N62 wherein it is rerecorded upon the magnetic drum channel N53.

In the event it is desired to remove numerical information from its circulating path in the ID register, the index control circuits will be set up to form a high source signal SV and a high source signal S6. The high source signals SV and S6 will qualify a gate circuit N63 as to its parts *a* and *b*. With the gate circuit N63 qualified as to its parts *a* and *b*, the numerical information which passes through the flip-flop circuit N57 will pass through the gate circuit N63 to the early bus EB.

The manner of inserting information into the ID register is somewhat similar to the manner in which numerical information is inserted into any of the other previously described registers or accumulators. During the period when information is being inserted into the ID register, the index control circuits will develop high destination signals DV and D6, thereby qualifying a gate circuit N64 as to parts *b* and *c*. The gate circuit N64 is qualified as to its part *a* by the signal TR, indicating the transfer state of the computer. With the qualification of the gate circuit N64, numerical information to be transferred into the ID register will be permitted to pass through a gate circuit N65 from the late bus LB, during the transfer state at a time when the signal *n*C109+*n*CS is high. A high output from the gate circuit N64 will qualify the gate circuit N65 as to its part *c*, the high signal $$nC109+nCS$$

will qualify the gate circuit N65 as to its part *b*, and the gate circuit N65 has its part *a* directly connected to the late bus LB.

Information passing from the late bus LB through the gate circuit N65 is applied to the amplifier circuit N61 which, in turn, is connected to the writing head N62 wherein such information is recorded upon the magnetic drum channel N53. The qualification of the gate circuit N64 also qualifies the gate circuit N70 as to part *a*. The gate circuit N70 is used upon qualification to clear the PN register. The qualification of the gate circuit N70 will cause a high signal to be applied to the buffer inverter circuit N15 to reduce the recirculating numerical information in the PN register to zero. The gate circuit N70 is qualified at a time when information is being placed in the ID register preparatory to performing a multiplication because the PN register must be clear to receive the product. The gate circuit N70 is qualified as to parts *b* and *c* by the signals I12 and (*n*I11+CS).

During the period when numerical information is being transferred into the ID register, it is to be noted that the qualification of the gate circuit N64 also applies a high signal to the buffer inverter circuit N59, which prevents the buffer inverter circuit N59 from changing its state, i.e., holds the buffer inverter N59 in one state, thereby having the effect of cancelling numerical information presently circulating within the ID register.

During some periods of operation, it may be desirable to erase or cancel the numerical information stored in all the registers of the numerical circuits, i.e. the ID register, the PN register, and the RQ register. The cancellation of all such stored information is effected when the index control circuit produces a high value for the signals DS, S5, and SX. The production of high signals DS, S5, and SX will qualify a gate circuit N78 shown in FIGURE 26 adjacent to the upper portion of the PN register, and having its output connected to the buffer inverter circuit N59 of the ID register, the buffer inverter N15 of the PN register, and the buffer inverter N35 of the RQ register. The application of an unvarying high signal to the buffer inverter circuits N59, N15, and N35, will hold these buffer inverter circuits in a zero output state, thereby preventing the flow of numerical information through them as would be the case during normal recirculation. The information within all of the registers is thereby cancelled or erased.

As previously stated, the numerical circuits may be utilized for shifting binary bits with respect to the digit positions of a word, i.e. bit precessing. Shifting of the binary bits within the digit positions of a word has the effect of either multiplying the binary number by two, or multiplying the binary by one-half, depending upon the direction of shift. Shifting may be performed in either the ID register or the RQ register of the numerical circuits. During a shifting operation the PN register is uneffected.

Consider first the operation of the ID register to effect a shift of a binary number such that each two-word times the number will be shifted one digit position to the right. This shift is effected by shortening the path for the numerical information cycling within the ID register, in such a manner that the cycle of the information is accomplished in one less clock pulse time. The length of the magnetic drum channel N53 is such as to effect a delay of 57 clock pulse times between the instant of writing and the instant of reading. During the operation of the ID register, when bit shifting is not being effected, the cycling information passes from the read head N54 through the amplifier circuit N55, the flip-flop circuit N56, the flip-flop circuit N57, and the buffer inverter circuit N59 and thence to the amplifier N61. The passing of the information through the two flip-flop circuits N56 and N57 lengthens the cycling information path to 58 clock pulse CP periods. In the event one of the flip-flop circuits N57 is removed from the cycling path, the length of the cycling path is reduced to constitute a 57-clock pulse CP relay, and after each period of circulation by the information, each binary digit will be advanced one position in the double length 58-bit word or shifted to the right.

The command signals from the index control circuit necessary to effect bit shifting in the ID register are special index signal DS, source signal S7 and the signal *n*I18 indicating that the flip-flop circuit I18 is in a reset state. The arrival of these signals totally qualifies the gate circuit N66. With qualification, the gate circuit N66 passes a high signal to the buffer inverter circuit N59 preventing the buffer inverter circuit N59 from changing in state, thereby halting the flow of numerical information through the buffer inverter circuit N59. The qualification of the gate circuit N66 also causes a high signal to be applied to the gate circuit N67. The high signal passed from the gate circuit N66 to the gate circuit N67 qualifies the gate circuit N67 as to its part *c*. The part *b* of the gate circuit N67 is qualified by the signal *n*TE, which occurs high at all times other than during the first pulse of word times. The pulse signal *n*TE is utilized because the ID register operates in double-word-length fashion and it is necessary to block the shifting of digits into the sign-indicating digit position only during alternate words when *n*TE is not high. The part *a* of the gate circuit N67 is connected to receive a signal from the flip-flop circuit N56. With the gate circuit N67 qualified as to its parts *b* and *c*, a signal from the flip-flop circuit N56 will pass through part *a* of the gate circuit N67, and then be passed to the amplifier circuit N61, and the writing head N62 to be recorded upon the magnetic drum channel N53. By the omission of the flip-flop circuit N57, the length of the circulating channel is decreased by one clock pulse interval, and, therefore, the bits will be advanced one digit position to the right during each cycle of recirculation, effectively a division by 2.

Consider now the operation of the RQ register to effect a shift in the bit positions of the bits circulating within the RQ register. This shift to the left effectively multiplies the numerical information in the RQ register by a factor of two.

The command from the indexing control circuit to cause a digit shift in the RQ register, as previously stated, requires that the special index signal DS be high, and the source signal S6 be high. The high signals DS and S6 qualify the gate circuit N49 as to parts *a* and *b*, thereby causing a high output from the gate circuit N49 which is connected to the buffer inverter circuit N35 via line N68. The signal received by the buffer inverter circuit N35 via the line N68 causes the buffer inverter circuit N35 to be inoperative and so prevents the buffer inverter circuit N35 from changing its output from zero.

The output from the gate circuit N49 is also connected to the gate circuit N51 which qualifies the gate circuit N51 as to its part *a*. The gate circuit N51 also requires for qualification a high signal *n*TE at its part *b* as previously mentioned. The part *c* of the gate circuit N51 is connected to receive a signal from the flip-flop circuit N52. Upon the qualification of the gate circuit N51, numerical information appearing at the flip-flop circuit N52 may pass through the gate circuit N51 to recording circuits including the amplifier circuit N39 and the recording head N41. The length of the circulating information path is thus effectively increased by one clock pulse interval, by altering the path such that the information now passes through the flip-flop circuit N52, whereas previously the information was taken from the flip-flop circuit N46. The delay between the writing head N41 and the reading head N45 in the magnetic drum channel N42 is 58 clock pulse CP times. By addition of the flip-flop circuit N52, the delay throughout the cycle is effectively increased to 59 clock pulse CP intervals. The increased length of the path will effect a one-digit shift of the digits to the right in the RQ register during a shift instruction, and effect a multiplication of the numerical information stored in the RQ register by a factor of two.

It is also to be noted that during the execution of the shift command, a digit is added to the contents of the accumulator at the second digit position of each odd word. The added digit has previously been discussed relative to the accumulator circuit, and is shown by the chart of FIGURE 19 to occur whenever source signals S6 and either source signal SW or SX are high in coincidence with the special index signal DS being high. The addition of the TP2 pulse to the accumulator may therefore be utilized, in effect, to count the number of shift positions effected by the RQ or ID registers, and to stop the shifting after a predetermined number of shifts have been accomplished.

As has previously been stated, another function of the numerical circuits is to normalize numbers in binary form. A number is said to be in normal form whenever it has a one digit in its most significant digit position. By way of example, a number word is normal if a one digit appears in the most significant digit position, i.e., the digit position of timing pulse TP29. In the event that double length word operation is to be used, i.e. 58-bit words, then a number is normalized when a one digit is located in the digit position 58.

The fact that the RQ register may be used to shift numbers as described to repeatedly multiply them by two, indicates that the RQ register may be used to normalize a number, i.e., place a number in normal condition by continually shifting bits in digit positions until a one digit is located in the most significant digit position.

To effect normalization, a command is given which causes the RQ register to shift digits. After a certain period of shifting, a digit will appear in the flip-flop circuit N52. The first one digit which appears in the flip-flop circuit N52 will indicate that the normalization process is complete, and will cause a high output at the terminal N69. A high signal at the output terminal N69 is coupled to the control circuits (later described in detail) to cause the control circuit to terminate the transfer state. The transfer state has been previously referred to in the specification, and it is to be recalled that the transfer state is a condition which permits the transfer of information. The mode of controlling the state of transfer will be later described. When the state of transfer has been terminated, the shifting will stop in the RQ register and the number in the RQ register will be in a normal form.

A consideration will now be made of the manner in which the numerical circuits accomplish multiplication. A six-bit word will be assumed for exemplary purposes. Reference will be made to the chart of FIGURE 27 which illustrates the arithmetic process of multiplication carried out in the numerical circuits. The chart of FIGURE 27 shows the contents of the ID register and the RQ register during successive steps of the multiplication process. The contents of the PN register is also shown as partial product is developed therein.

In general, the process during multiplication in the numerical circuits involves placing the multiplier in the RQ register, and, during single word operation which will first be considered, placing it in the odd-word portion of the RQ register. The multiplicand is placed in the odd-word portion of the ID register. It is to be noted that the multiplication carried on in this computer is done under the assumption that the binary point is at the extreme left of the register. The most significant digit in binary fraction is equivalent to the decimal fraction one-half, the second most significant binary digit will be equivalent to decimal one-fourth, etc. In the example chosen, which is shown in the tables of FIGURE 27, the multiplier .110000, is equivalent to the fraction three-quarters, i.e. .75. The multiplicand .011000, is equivalent to the fraction three-eights, i.e. .375 Preparatory to the first step of the operation of multiplication, the multiplicand .011000, is placed in the odd word portion of the ID register and the multiplier, .110000, is placed in the odd word portion of the RQ register. Prior to the first step in the multiplication, the multiplicand in the ID register is shifted one position to the right, and the multiplier is shifted one position to the left. The contents of the most significant digit position of the multiplier either resets or sets a single digit storage, i.e. flip-flop circuit N72, such that the first or most significant digit of the multiplier may be singly used to multiply the contents of the ID register. In the event that the bit of the multiplier in store in the flip-flop circuit N72 is a one, the result of the multiplication is a first partial product developed in the first step. This will be equivalent to the number in the ID register during the first step, i.e. 001100. This number 001100 will be the first partial product entered in the PN register in an odd word position, as is shown in the chart of FIGURE 27.

As the partial product of the first step is being developed in the PN register, the number in the RQ register is again shifted one further position to the left, and the number in the ID register is again shifted one further position to the right to assume positions as they are shown in the chart of FIGURE 27 during step 2. The bit now to be utilized for the multiplication of the contents of the ID register is again stored in the flip-flop circuit N72 to act as a multiplying factor; the multiplication of FIGURE 27. The second step in the multiplication shall involve adding the contents of the ID register, i.e. 000110, to the contents of the PN register to form 010010. The shifting process again goes on during the second step, however, during this shifting operation a zero is moved into the flip-flop circuit N72, to be used as a factor in the multiplication of the present contents of the ID register. The fact that the number in the flip-flop circuit N72, which is under consideration from the multiplier, is now a zero, will cause zeros to be added to the contents of the PN register, due to the fact that no numerical value results from a multiplication with zero as a factor. A consideration of the contents of the RQ register during the third step will indicate that no amount of further shifts will bring a one digit into the flip-flop circuit N72 to act as a multiplying factor; the multiplication is complete.

The summation of the results of the individual multiplications of the contents of the ID register by the contents of the flip-flop circuit N72 takes place in an accumulative fashion, with the PN register operating as an accumulator as previously described. As each of the results of the individual multiplications is received by the PN register, it is added to the contents of the PN register in the odd-word portion. The sum of the results of individual multiplications in the example is 010010, having a decimal equivalent of 9/32 which is the correct result of a multiplication of decimal 3/8 and decimal 3/4.

Reference will now be made to FIGURE 26 to describe the operation of the circuitry of the numerical circuits to perform a multiplication in accordance with the above process. The multiplication involved requires that the factors, i.e., multiplier and multiplicand, be stored in the magnetic storage channels N42 and N53 respectively. The channel N42, associated with the RQ register containing the multiplier, and the channel N53, associated with the ID register containing the multiplicand. During the multiplying command, the ID register and the RQ register are set to shift the binary numbers which they contain in digit positions as has previously been described. Reference to the chart of FIGURE 19 will indicate that the command for multiplication will set the index control circuit to form the necessary shifting signals. It may, therefore, be seen that after each double length word, a shift of one bit position will have taken place in each the ID register and RQ register.

During the time when no precession through the accumulator is in process, the gate circuit N71 associated with the RQ register, becomes qualified as to its parts *a* and *b* such that the digits passing through the gate circuit N51 during the cycling operation of storage will be passed through the buffer inverter circuit N38, and the gate circuit N71 to set a flip-flop circuit N72 at the twenty-ninth clock pulse CP time. The flip-flop circuit N72 thus, during each cycle of the numerical information, is either set or reset to indicate the most significant digit of the contents of the RQ register. The setting of the flip-flop circuit N72 will qualify the gate circuit N73, adjacent to the PN register, as to its part *c*. The part *b* of the gate circuit N73 during multiplication will receive the digits of the contents of the ID register in a bit-by-bit fashion and the results of the individual multiplications will be detected at the output from the gate circuit N73. The qualification of the gate circuit N73 as to part *a* is effected by the signal *n*I17 being high. The signal *n*I17 is from the index control circuit and will be high during the multiplication command. The digits of the result of the individual multiplications detected by the gate N73 are passed through the buffer inverter circuit N28, to the adder circuit N16 to be additively combined with present contents of the PN register.

Consider now the steps of the multiplication process step by step. Just prior to the first step, the most significant digit in the RQ register will be passed into the flip-flop circuit N72, via the gate circuit N71. During this period, one digit position shift will also take place in the binary number stored in the ID register, because the necessary shifting signals are provided during the entire multiplication process.

During the first step of the multiplication, the gate circuit N67 associated with the ID register becomes qualified after the time of the sign-indicating digit position marked by TE, as to all parts except the part *a*, the qualification of part *a* depends upon the presence or absence of a one-digit in the individual digit positions of the multiplicand. In the event there is a one digit in any given digit position, the gate circuit N67 will pass a high signal, indicating the presence of such a one digit, onto the part *b* of the gate circuit N73, thereby fully qualifying the gate circuit N73 and causing a one-indicating signal to be passed by the buffer inverter N28 which is associated with the adder circuit N15. The numerical output from the buffer inverter circuit N28, i.e. 001100, will be accumulated by the PN register on a digit-by-digit basis t( form the first partial product.

Prior to the second multiplication step, another one digit has been moved up and stored in the flip-flop circuit N72, due to the digit shifting of the RQ register. At the most significant digit position, when the timing signal TP29 is high, the second most significant digit of the original multiplier which has now been shifted into the most significant digit position, will be gated via the gate circuit N71 to set the flip-flop circuit N72. The set state of the flip-flop circuit N72 will again qualify the gate circuit N73 as to its part *c* to again perform an individual multiplication when the shifted digits of the multiplicand will now again be multiplied by one on a digit-by-digit basis, and again when there is coincidence at the gate circuit N73 between a one digit which is stored in the flip-flop circuit N72, and the individual digits from the twice-shifted multiplicand, there will be a one digit formed, which will be passed on through the gate circuit N73 to the buffer inverter N28 and the number 000110 will be accumulated by the adder circuit N16 operating in conjunction with the PN register.

Prior to the third step in the multiplication, the shifting in both registers is again accomplished as previously described; however, in this case the next bit from the RQ register to act as a factor in the individual multiplication is a zero bit; therefore, the flip-flop circuit N72 will be reset by the action of the buffer inverter N38 and a gate circuit N80. The resetting of the flip-flop circuit N72 will leave the gate circuit N73 unqualified as to its part *c*, so that no one digits will be passed through the gate circuit N73 and the value formed during the third step will consist of zeros. The continuation of the shifting process will bring up no further one digits to set the flip-flop N72, therefore the contents of the PN register is the correct product.

The above example involved only single word operation; however, double-length words may be used. It shall be noted that the PN register is fully available during single word operation, and therefore the product is not confined to a single word storage. In the event that double-length words are used, the multiplication will have been started and performed just as indicated above, but would continue beyond the 29-bit word time producing a double precision multiplication. The process would be started with a double length multiplicand and, as the multiplicand. It is to be again noted, however, that during the use of single word multiplication, with the ID register holding the multiplicand and the RQ register holding the multiplier, the PN register is still available to accept words of double length. A large round-off therefore will not be necessitated in a multiplication by lack of capacity in the product accumulating PN register.

The multiplication process described above has been carried on without regard to the manner in which the signs of the multiplicand, the multiplier or the product are handled.

Generally, the manner of handling the signs of numbers during the processes of multiplication and division is to utilize a single flip-flop circuit, which upon receiving each sign-indicating digit, will be placed in one state or another. In the event that this sign-storing flip-flop receives two negative-indicating digits thereby indicating the multiplication or division of two negative numbers, the flip-flop circuit will twice be changed in state and will indicate a positive product or quotient. Should the sign-storing flip-flop receive no negative-number-indicating one digits, it will remain in a state, indicating that the product or quotient shall be positive. Receiving one negative-number-indicating digit will cause the sign-storing flip-flop to indicate a negative product or quotient.

Referring back now to FIGURE 23, which shows the product and quotient sign-storing circuits, reference will first be made to a gate circuit X45. The gate circuit X45 becomes qualified during the special command which is utilized to clear the contents of the numerical circuit registers, i.e. the PN register, the RQ register, and the ID register. At a time when the instruction to clear the numerical registers is given, the special index signal DS will be high and the source signals SX and S5 will be high. The fact that the above-mentioned signals are high will qualify the gate circuit X45 thereby resetting the sign-storing flip-flop circuit X41 preparatory to the performance of an arithmetic operation. The flip-flop circuit X41 is the sign-storing flip-flop which was referred to above, and which constitutes a single bit storage for holding the sign bit of a quotient or product being formed in the numerical circuit. The gate circuit X45 is therefore provided in order to reset the flip-flop circuit X41 and clear any negative-indicating bit which may be stored in the flip-flop circuit X41.

At a time preparatory to performing an arithmetic process, when information is being sent to the numerical circuit registers, the RQ register, the PN register, or the ID register, the gate circuit X34 will be in a qualified state during the sign-indicating digit position when the signal TS is high. The gate circuit X34 will be qualified as to part *a* by the transfer signal TR being high and indicating numerical information is being transferred. The parts *b* and *c* of the gate circuit X34 are both qualified only during the times when the registers of the numerical circuits are acting as a destination for numerical information. Reference to FIGURE 19 will show that whenever the signal D6 is high the registers of the numerical circuit are receiving numerical information, except when the signal DX is high. The qualification of the part *b* of the gate circuit X34 by the negation of the signal DX or *n*DX will serve to limit the signal D6 in its qualification of the gate circuit X34 to periods when the numerical-circuit registers are receiving numerical information. The parts *d* and *e* of the gate circuit X34 are qualified during the time when the sign control circuits are simply passing numerical information, as will be indicated by the signal *n*I12 being high and I11 being low. The part *f* of the gate circuit X34 will be qualified during the sign-indicating digit position when the signal TS is high.

The gate circuit X35 is qualified by the same factors which qualify the gate circuit X34, with the exception that the gate circuit X35 requires the signals *n*SX and S6 to be high in place of the signals *n*DX and D6 required by the gate circuit X34. The gate circuit X35 is qualified during all periods when the registers of the numerical circuits are acting as sources of numerical information.

After the flip-flop circuit X41 has been reset by the qualification of the gate circuit X45, effected by the signals DS, SX, and S5, being high and indicating also a clearing of the registers of the numerical circuits, the next step is to transfer numerical information into the ID register. During the multiplication process the multiplicand will be transferred into the ID register. It is necessary that the ID register be the first register filled in the preparation of the numerical circuit to perform an arithmetic process. During the period when numerical information is being transferred into the ID register, the gate circuit X37 or the gate circuit X38 may be qualified during the sign-indicating digit position of the word. The gate circuit X37 will be qualified as to its part *a* only if the flip-flop circuit X41 is in a set state. The part *b* of the gate circuit X37 is adapted to receive the negation of a sign-indicating digit from the word being entered, from the buffer inverter circuit X11. The part *c* of the gate circuit X37 will be qualified when the signal DV is high, indicating information is flowing into the ID register. The part *d* of the gate circuit X37 is qualified by the gate circuit X34 being qualified, indicating a time when information is being transferred into one of the registers in the numerical circuit and during the sign-indicating digit position. The qualification of the gate circuit X37 will therefore indicate that a positive numerical value is being transferred into the ID register, and the flip-flop circuit X41 will be reset. It may therefore be seen, that the clearing of the flip-flop circuit X41 by means of the gate circuit X45 can be avoided.

The gate circuit X38 is utilized to set the flip-flop circuit X41 when the numerical value being transferred into the ID register is negative. The gate circuit X38 is qualified as to its part *a* by the gate circuit X34 being qualified indicating the sign-indicating digit position of a word time when numerical information is being transferred into the ID register. The part *c* of the gate circuit X38 is qualified by the flip-flop circuit X41 being in a reset state. With the gate circuit X38 qualified as to its parts *a* and *c*, during a sign-indicating digit position, a negative sign-indicating digit from the buffer inverter circuit X11 applied to the part *b* of the gate circuit X38 will fully qualify the gate circuit X38 and thereby set the flip-flop circuit X41.

Preparatory to performing an arithmetic operation in the numerical circuit, the transfer of a numerical value into the ID register will set the flip-flop circuit X41 to indicate the sign of the numerical information placed in the ID register.

In the event that the other numerical value being used in the arithmetic operation is negative, then it will be desired to reset the flip-flop circuit X41, however, should such a value be positive, then the flip-flop circuit X41 should be left in its set state. In the event that the numerical value to be entered in either the PN register, or the RQ register, preparatory to performing an arithmetic operation is negative, the gate circuit X36 will be qualified to reset the flip-flop circuit X41. The gate circuit X36 is qualified as to its part *a* by the qualification of the gate circuit X34, indicating the sign-indicating digit position of a word time when numerical information is being transferred to one of the registers in the numerical circuit. The part *c* of the gate circuit X36 is qualified during all times but when the ID register is a destination. Qualification of the part *c* of the gate circuit X36 is by the signal *n*DV. The gate circuit X36 is qualified as to its part *d* by the flip-flop circuit X41 being in a set state. The gate circuit X36, is therefore prepared for the arrival of a negative-indicating digit from the early bus EB by the flip-flop circuit X11 at part *b*. With qualification, the gate circuit X36 will cause the flip-flop circuit X41 to be reset.

It may therefore be seen that upon the occurrence of two negative numbers to be combined in either the arithmetic process of multiplication or division, the flip-flop circuit X41 will first be set, and then be reset, to indicate a positive value for the result of the numerical information. The occurrence of one of such numerical values being negative will cause the flip-flop circuit X41 to be set indicating that the result shall be negative. Should both of the numerical values be positive, the flip-flop circuit X41 will be maintained in a reset state, indicating a positive result.

As previously explained, the gate circuit X35 will be qualified during periods when any of the registers in the numerical circuits are called upon as information sources. The qualification of the gate circuit X35 will serve to qualify a gate circuit X39 as to part *b*. Part *a* of the gate circuit X41 is connected to be qualified by the flip-flop circuit X41, when the flip-flop circuit X41 is in a set state. The set state of the flip-flop circuit X41, indicating a negative digit, will cause a negative indicating digit to be applied to the intermediate bus IB through the gate circuit X39 during a period when one of the registers in the numerical circuit is called upon as an information source.

A consideration will now be made of the manner in which the numerical circuits function to perform the process of division. Before considering the detailed circuitry shown in FIGURE 26, consider first the exemplary divisional process illustrated by FIGURE 28 which shows the manner in which the computer divides. This process is the well-known non-return division process. The normal non-return division process involves shifting the denominator in such a manner as to divide it by a factor of two during each step of the process. The process of division used herein is different in that the remainder is shifted instead of the denominator. The remainder is shifted in such a manner as to be multiplied by a factor of two. The shifting of the remainder rather than the denominator has the advantage that greater accuracy can be obtained because no digits are lost by shifting.

The process by which the computer performs division will be illustrated by dividing the binary equivalent of the fraction $^{15}/_{32}$ by the binary equivalent of the fraction $^{5}/_{16}$ to result in a quotient of $1\frac{1}{2}$. It is to be observed that the computer is limited to the division of numbers which will result in a number which is less than two in absolute value. Stated another way, a basic limitation of the machine is that it cannot perform a divisional process having quotients greater than or equal to the number two in absolute value.

The binary equivalent of the fraction $^{15}/_{32}$ is .01111 and the binary equivalent of the fraction $^{5}/_{16}$ is .01010. The binary equivalent of $1\frac{1}{2}$ is 1.10000. The example is shown in both binary and decimal form in FIGURE 28.

In a very general way, division is accomplished within the computer by performing a number of similar operational steps. The first operational step comprises subtracting the denominator from the numerator, and, if the numerator is greater than the denominator, a one digit is placed in the most significant digit position of the quotient. If a negative remainder results from this subtraction, then a zero digit will be placed in the most significant digit position of the quotient. The remainder from this subtraction is then shifted to the left and if positive it has the denominator subtracted from it, if negative it has the denominator added to it. The next step thus consists of either a subtraction or an addition and the results of either process are repeatedly either subtractively or additively combined with the denominator to form the digits of the quotient.

Consider now the numerical example shown in FIGURE 28. Because the first step in the division process is to subtract the numerator from the denominator, the denominator must be complemented. The complement of the denominator .01010, which is .10110, is added to the numerator .01111 to effect a subtraction in step one. The remainder of the subtraction is the binary number 1.00101. The fact that there is a one digit on the left hand side of the binary point of the remainder indicates that the numerator was greater than the denominator in the example. The fact that the numerator was greater than the denominator indicates that the result of the division, i.e. the quotient, will be equal to or greater than one; therefore, a one digit is written on the left hand side of the binary point of the partial quotient resulting from step 1. During step 2 of the division process, the denominator is again subtracted because the remainder of the last subtraction was a positive value; however, this subtraction is from the remainder of the subtraction of step 1 which has been altered, in that the remainder .00101, is shifted to the left one digit position to form .01010. The shifting of the digits in the remainder from the subtractive process of step 1, effectively multiplies the remainder by 2.

The subtraction performed during step 2 results in another remainder having a digit to the left of the binary point with zeros in the rest of the result. Again the fact that a one digit is present left of the binary point indicates that the next digit of the quotient, which is the most significant digit on the right of the binary point, is a one digit.

The remainder resulting from the subtraction of the second step has its digits shifted to the left and during step 3 has the denominator subtracted from it, to result in a negative number .10110. The fact that the number .10110 which remains from the subtraction of the third step is negative is indicated by the lack of a one digit on the right of the binary point. This further indicates that the second digit to the right of the binary point in the quotient is to be a zero and that the next step shall be an addition.

The remainder of the subtraction performed in step 3 is shifted one digit position to the left and in step 4 is added to the denominator; that is, no complementation is performed upon the denominator prior to adding to the remainder. The fact that the remainder of the subtraction of step 3 was a negative number indicated that the operation to be performed in step 4 should be an addition. The sum of the addition performed in step 4, .10110, is again indicated to be a negative number by the lack of a one digit lift of the binary point. The result being a negative number again indicates another zero bit shall be placed in the quotient, this time in the third position to the right of the binary point.

The sum of the addition of step 4 is precessed one digit position and again added to the denominator during step 5, resulting in still another negative sum .10110 indicating still another zero bit is to be placed in the fourth position to the right of the binary point in the quotient. The process of steps 4 and 5 could be repeated; however, a study of the additions shown in steps 4 and 5 will indicate that nothing but zeros will be derived in other digit positions in the quotient. The quotient 1.1000, which is derived after step 5, may be seen to be the correct quotient resulting from the division of .01111 by .01010.

The conduct of the various registers in the numerical circuits of FIGURE 26 will now be considered in detail to show how the above described arithmetic process is performed. The division command is such as to set the signals S6 and SV from the index control circuit at a high value. Note that the division command must be double precision operation and the sign control circuit must be instructed to pass numerical information in a mode as to be additively combined. The add mode of operation for the sign control circuits is indicated by the 12th and 13th digits of the command word resetting the flip-flop circuit I11 and setting the flip-flop circuit I12 to cause the signals *n*I11 and *n*I12 to be high. During the add mode of operation the sign control circuit will serve either to complement or not complement the denominator in passage, depending upon what operation shall be performed which will govern whether the next step shall be an addition or a subtraction.

During division, the ID register will always contain the denominator and because the denominator is used in each step, either in complemented form or uncomplemented form, the ID register is coupled to pass the denominator to the sign control circuits via the early bus EB. The numerator is placed in the PN register and has the denominator subtracted from it during the first step, to form a result which is precessed and subsequently either subtractively or additively combined with the denominator. The bits forming the quotient are developed in the RQ register. The most significant bits are formed first and placed in the least significant digit positions, to then be precessed into the most significant digit positions, such that the first bit formed is the most significant bit.

During the division command, the gate circuit N21 associated with the PN register will be qualified as to its parts *a, b,* and *c* by the special index signal DS being high, and the source signals SV and S6 being high. Upon qualification, the gate circuit N21 passes a high signal to the buffer inverter circuit N19. The buffer inverter circuit N19 then passes a low signal by means of line N22 to the gate circuit N18, that is to say, the inverter portion of the buffer inverter becomes low, and the gate circuit N18 thus becomes inhibited, or disqualified as to its part *b*. The inhibition of the gate circuit N18 prevents the flow of numerical information in the PN register through the usual cycling path. At the same time the gate circuit N18 is inhibited, the buffer inverter circuit N19 has a high output on its buffer side, which qualifies the gate circuit N74 as to its part *b*. The qualification of the gate N74 is further effected by the signal *n*TE, which is high during all times but the first digit of the word, which qualifies the gate circuit N74 as to its part *c*. When the gate circuit N74 is qualified as to its parts *b* and *c* numerical information may pass from the adder circuit N16 via line N17 to the gate circuit N74, the buffer inverter N76, and a flip-flop N75 to be recorded on the magnetic drum channel N10. The path for information through the flip-flop circuit N75, in the recirculation loop of the PN register, causes the path of recirculation in the PN register to become one digit longer, thereby causing a shift in the digits circulating in the PN register of one digit every 58-bit word time. The shift within the PN register is such as to effectively multiply the number in the PN register by two each 58-bit word time.

The operation of the ID register of the numerical circuits during the division command will now be considered. The signals SV and S6, as previously stated, will be high and will qualify the gate circuit N63 as to its parts *a* and *b*. The fact that the source signals SV and S6 are high during the division command qualifies the gate circuit N63 in the same manner as when the ID register is indicated as an information source. The denominator in the ID register is thus preserved in the ID register but is repeatedly sent to the sign control circuit via the gate circuit N63 and the early bus EB.

During the performance of division, the operation of the ID register is thus to store the denominator within its circulatory track, and to pass this numerical information continually to the early bus; however, it is to be noted that no shifting or precessing takes place within the ID register during the divisional process.

Consider now the RQ register during division. The RQ register accomplishes precession or digit shifting, at a time when the gate circuit N49 is qualified as previously explained. The division process command will qualify the gate circuit N49 by the signals DS and S6 being high, and, as the quotient bits are developed during the divisional process, they will be shifted from the less significant digit positions where they are inserted in the RQ register to the most significant digit positions.

The divisional process is carried on, such that the numbers utilized are in an absolute value form, and the signs are handled by the sign control circuit in a manner which was previously described relative to the multiplication process.

In general, during each step of the divisional process, the denominator is either added to, or subtracted from the numerical value in the PN register which holds the numerator during the first step, and then the result of the last addition or subtraction. It may therefore be seen that, within the limitations of the computer, the quotients will be formed bit by bit by subtractive steps until the occurrence of an overdraft, at which time no restoration will be necessary, but subtraction will simply be replaced by addition.

As stated, the manner of performing subtractions during the division process is by complementation of the denominator when it is taken from the ID register and passed through the sign control circuits. The first step of the division process is always a subtraction; however, the sign of the denominator has been removed to the sign control circuits for storage and, therefore, even if the sign is a negative-indicating digit, it is not available to instruct the sign control circuits to complement the denominator. The manner of derivation of a negative-sign-indicating digit to cause complementation of the denominator for the performance of the subtractive first step in the division process will now be described. As previously stated, the gate circuit N21 associated with the PN register will be qualified during the division process. The qualification of the gate circuit N21 will cause the output of the buffer side of the buffer inverter circuit N19 to be high and partly qualify the gate circuit N77. The further qualification of the gate circuit will be accomplished when the signals TE and *n*X22 are high. The signal TE indicates the sign-indicating digit position and *n*X22 indicates the present state of the sign control circuit is not such that numerical information will be complemented as the flip-flop circuit X22 will be reset during the read command operational state. The high signal from the gate circuit N77 indicating the state of the flip-flop circuit X22 during the sign-indicating digit position will pass through the buffer inverter circuit N28, to the adder circuit N16. The adder circuit N16 may also receive one digits of the inputs from either the buffer inverter N15 or the carry flip-flop circuit N29 during the sign-indicating digit position when the signal TE is high, however, the gates are so arranged that during the first digit position no digits may pass through the buffer inverter circuit N15 or the flip-flop circuit N29. The adder circuit N16 takes the digit received from the buffer inverter circuit N28 and the result appears on the line N17. The line N17 is connected to the gate circuit N78. The gate circuit N78 will be further qualified by the division command setting the buffer side of the buffer inverter N19 high and the signal TE being high during the sign-indicating digit position the result of the addition will thus be passed to the early bus EB position. A high signal passed to the early bus EB during the sign-indicating digit position will instruct the sign control circuit to complement the numerical information to follow, which will be taken from the denominator-holding ID register. A low signal passed to the early bus EB during the sign-indicating digit position will instruct the sign control circuit to simply pass the denominator uneffected.

Reference will now be had to the truth table of FIGURE 29 which shows the possible input combinations to the adder circuit N16 during the sign-indicating digit position, and the sum of the inputs. The first row of the truth table shows the conditions at the start of the division process. There will be no one digit stored in the carry flip-flop circuit N29, and no digit will be passing through the buffer inverter N15. A one digit will, however, be present in the form of the negation of the output from the flip-flop circuit X22. The sum of the inputs to the adder N16 will, therefore, be a one digit since only the signal *n*X22 is high. This one digit will pass from the output line N17 of the adder circuit N16 to the gate circuit N78 and thence to the early bus EB. From the early bus EB, the one digit will, of course, pass to the sign control circuits and set the flip-flop circuit X22 to complement the denominator as it passes through the sign control circuits preparatory to use in the first step of the division process. The action in the sign control circuits during the step of first cycling the denominator is thus to complement the denominator as though it were a negative number, then pass the result via a gate circuit N79, of the PN register from the late bus LB to the adder circuits A16 to be combined with the numerator. The gate circuit N79 is qualified by the signal *n*TE during the division process, such that all the bits but the sign digit are passed.

After the first step in the division process, the determination of whether each of the following steps are to constitute a subtraction or an addition depends on the presence or absence, respectively, of a one digit in the output of the adder circuit N16 during the sign-indicating digit position. The presence of a one digit at such a time will be detected by the gate circuit N78 and passed to set the flip-flop circuit X22. A one digit in the sign-indicating digit position is barred from recirculation in the PN register by the gate circuit N74. The gate circuit N74 is in the path of the numerical information circulating in the PN register during division because digit shifting is occurring. The gate circuit N74 is qualified, as to part *b* during division by the high signal from the buffer inverter circuit N19, and as to part *c* by the signal *n*TE which is high during all but the sign-indicating digit position. The numerical information from the adder circuit N16 applied to the line N17 may therefore pass the gate circuit N74 to the buffer inverter circuit N76, the flip-flop circuit N75, amplifier N23 and be recorded on the magnetic drum channel N10 by means of the head N24 only during periods other than the period of the sign-indicating digit position. The output from the adder circuit N16 during the sign-indicating digit position as previously stated is the sum of the contents of the carry flip-flop circuit N29, the negation of the contents of the flip-flop circuit X22 and the value passing through the buffer inverter circuit N15. This addition considers the sign-indicating digit of the last step, indicated by the signal *n*X22, the digit in the sign-indicating digit position of the result of the last operation, indicated by the signal received from the buffer inverter circuit N15, and the carry into the sign-indicating digit position from the current operation, indicated by the signal N29. The binary sum of these signals results in a bit which indicates whether the next step shall involve a subtraction or an addition. The various possible combinations are shown in the truth table of FIGURE 29.

A consideration will now be made of the manner in which the quotient is developed in the RQ register in a bit-by-bit manner. In general, the operation of the RQ register during the division process is such that a one digit is inserted in the second digit position during each cycle of operation. The digit inserted in the second digit position is then precessed during the next cycle into the third digit position at which location the digit is either canceled or remains, depending upon whether or not the last performed step of the divisional process indicated a digit should be placed in the quotient. It is to be noted that during the last step of the divisional process, a one digit will similarly be placed in the second digit position which will never be canceled. The purpose of such an arrangement is to provide for rounding off of the quotient.

Referring now to FIGURE 26, the gate circuit N80 is provided for inserting the one digit at the second digit position of every cycle of operation. The gate circuit N80 is qualified as to its part *a* by the signal from the buffer inverter circuit N19, which is high during the division process. The gate circuit N80 is qualified as to its part *b* by the timing pulse TP2, and as to its part *c* by the signal C109 being high. The signal C109 will be high during periods of even words. It may therefore be seen that during alternate words a digit will be inserted in the contents of the RQ register at the second digit position in a doube length word. The digit so inserted will now, by means of gate circuit N81, either be allowed to remain, or be canceled, depending upon whether or not a digit should be developed in the quotient. The gate circuit N81 carries the same qualifying factors as the gate circuit N80, but with the added requirement for qualification of *n*X22 being high. The signal *n*X22, when high, indicates that the flip-flop circuit X22 is not set, and the state of the flip-flop circuit X22 is indicative of whether or not complementation is being performed upon members passing through the sign control circuits. The presence of the signal *n*X22 indicates no complementation by the sign control circuits, so that the remainder must have been negative. Thus indicating that a zero should be inserted in the quotient. The gate circuit N81 may therefore be seen to be qualified during the second digit position of even word times of divisional process, when no digit is to be inserted in the quotient. The qualification of the gate circuit N81 will send a high signal to the buffer inverter circuit N50 which is coupled to the flip-flop circuit N52, resetting the flip-flop circuit N52. It shall be recalled that during precession of the digits in the RQ register which prevails during the divisional process, the circulating information will pass from the flip-flop circuit N46 through the buffer inverter circuit N50 to the flip-flop circuit N52. The digit recorder during the last cycle of the numerical information in the RQ register in the second digit position will, unless canceled out, set the flip-flop circuit N52; however, the qualification of the gate circuit N81, by means of the buffer inverter circuit N50, will reset the flip-flop N52 thereby canceling the digit inserted in the second digit position during the former cycle. Due to the one bit delay which occurs as a result of the flip-flop circuit N52, the zero or one which is to be inserted in the quotient will be entered on the magnetic drum channel N42 during the third digit position. The output of the flip-flop circuit N52 is applied to the gate circuit N51, which is qualified during all periods when digit shifting is occurring in the RQ register, thence to the amplifier N39 and the head N41 to be recorded in the magnetic drum channel N42.

By considering the above described detailed operations of each of the registers of the numerical circuits, it may be seen that the modes of operation imposed upon each of the registers are the following. The ID register contains the denominator and has facilities for coupling the denominator by means of the gate circuit N63 to the early bus EB during all periods of operation. The denominator will be transferred to the early bus EB and, in passing through the sign control circuits, will either be complemented or merely passed uneffected, and then applied to the adder circuit N16 of the PN register by means of the gate circuit N79.

The PN register at the beginning of the divisional process will contain the numerator. During every cycle in the divisional process, the contents of the PN register will be combined either additively or subtractively with the denominator. The first combination will be subtractive, and other combinations will be determined by whether or not a carry digit is propagated into the first digit position from the last combination. The digits within the PN register are also shifted one digit position during each cycle of operation.

The digits of the quotient will be developed in the RQ register. The mode of operation of the RQ register during the divisional process is to receive a one digit in the second digit position during each cycle of operation by means of gate circuit N80. Precession is carried on in the RQ register, and the digit inserted in the second digit position will appear in the third digit position after one cycle unless canceled. The determination of whether or not digits shall be canceled in the quotient occurs by means of the gate circuit N81, the qualification of which cancels the digit from the second digit position which is currently processing into the third digit position. The digits of the quotient are shifted from the lesser significant digit positions into the more significant digit positions, such that the first bit developed becomes the most significant bit of the denominator. The last bit developed in the denominator is provided by the digit inserted in the second digit position, and, as there is no opportunity to cancel this digit, a round off is accomplished.

During the operation of the PN register as an accumulator apart from the process of division, it is necessary to provide a signal to compensate for the situation when a zero is to be subtracted. A similar situation was encountered and explained with reference to the accumulator circuit. In the accumulator circuit a signal IA, the development of which was explained in the index control circuit, was applied as a compensating signal. The PN register utilizes a signal IN, the development of which was also explained relative to the index control circuit which is applied to the flip-flop circuit N29 for similar purposes.

*Summary.*—A consideration of the above detailed descriptive matter will indicate the manner in which the numerical circuits may serve to perform any of a variety of functions. The numerical circuits contain an accumulator circuit referred to as a PN register, which may be utilized to perform operation similar to those performed by the accumulator circuits of the computer. The PN register may serve to derive the accumulated value of several numerical values, or it may be utilized to effect a single addition or subtraction.

The numerical circuits also contain an ID register and an RQ register each of which may be utilized either for the storage of numerical information, or for the precession of digits within a numerical word. It is often desired to shift the digits of a numerical word either to the right, thereby multiplying the number indicated by the numerical information by a factor of two, or to the left, thereby multiplying the number represented by the numerical information by a factor of one-half. The ID register and the RQ register may be utilized to effect such digit shifting, i.e. precession.

Ofttimes in the handling of numerical information it becomes desirable to normalize a number, i.e., shift the digits to the left until a one digit is located in the most significant digit position. Normalization may be effected by the numerical circuits.

The numerical circuits are utilized to carry on the processes of multiplication and division by utilizing all of the registers, the PN register, the ID register, and the RQ register. Two of the factors in the multiplication or division are held in a particular pair of the registers, and the result of the numerical operation is developed in the third numerical register.

CONTROL CIRCUITS

Prior to the detailed description of the control circuits, a brief description will first be given of the operation related to a block diagram shown in FIGURE 30. The block diagram of FIGURE 30 indicates the flow of information in the control circuit.

Figures 30, 34:
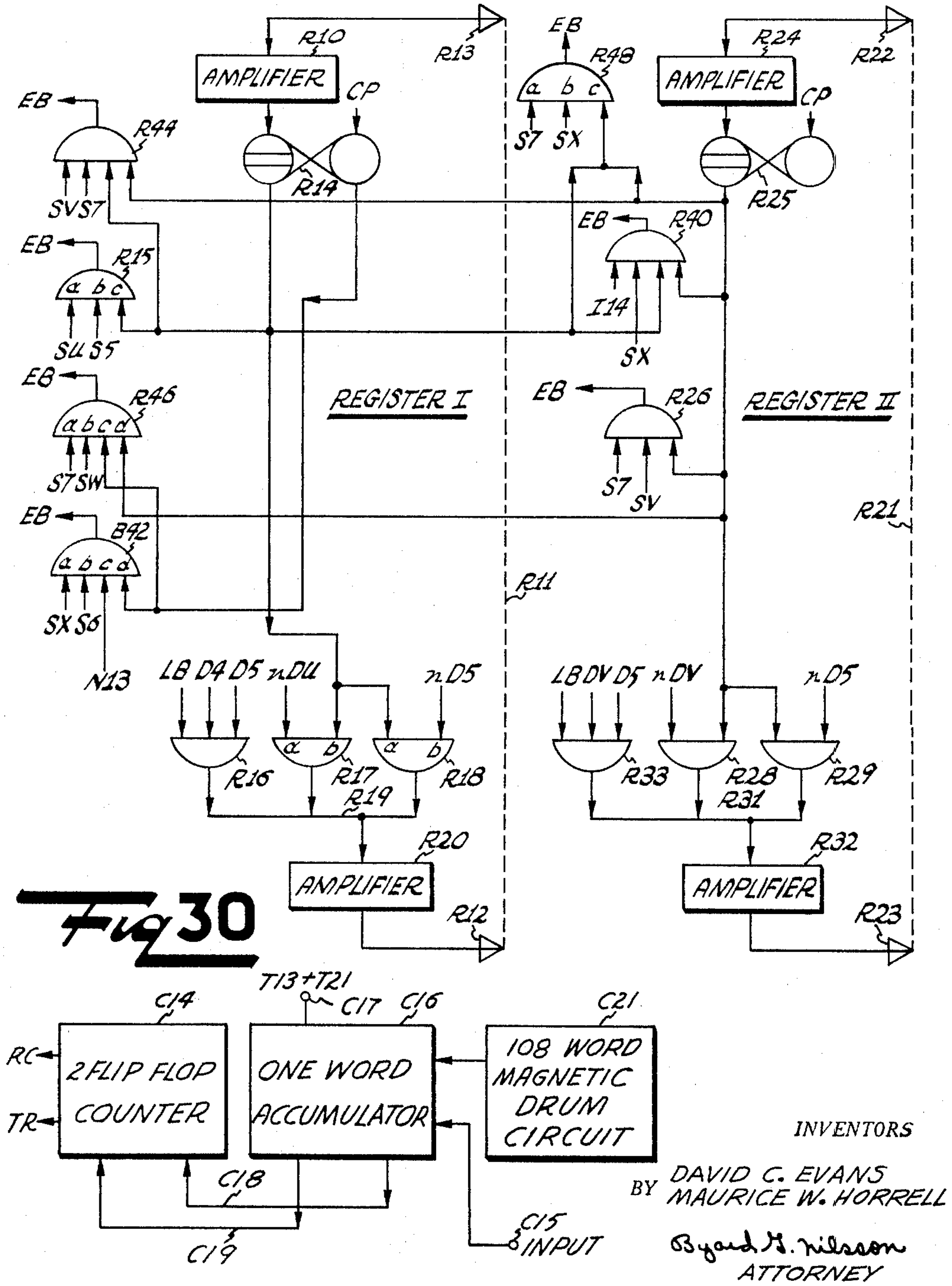
FIGURE 30 shows a block diagrammatic representation of the manner in which a control circuit operates.
FIGURE 34 shows a symbolic block diagrammatic representation of two registers.

Before considering the block diagram as shown in FIGURE 30, reference will be had back to FIGURE 17 which shows the digits of the command word. As previously discussed, the first digit of the command word indicates whether the command shall cause an operation to take place in a single or double length word manner. The digit positions 2, 3, 4, 5 and 6 of the command word comprise the destination address, and indicate the destination of the information being transferred. The digit positions 7, 8, 9, 10, and 11 indicate the source address, of the information to be operated upon. The digit positions 12 and 13 of the command word, indicate the mode of passage through the sign control circuits, as previously discussed. To cause the machine to operate in a continuous manner, it is necessary that each command indicate a source for a next command. Due to the fact that the computer operates in a serial fashion, the indication of a particular time interval with respect to a command source, may be used to indicate a particular command. The digit positions 14, 15, 16, 17, 18, 19, and 20 of the command word are utilized to indicate such a time, and inform the machine as to the location of the next command word. The 21st digit position of the command word is utilized for a break-indicating digit and the presence of a digit in that position indicates a programmed break to stop the computing operation. The digit positions 22, 23, 24, 25, 26, 27, and 28 of the command word are utilized to indicate the time interval during which the actual transfer of the information will take place. The 29th digit position of the command word is utilized to inform the computer whether the execution of the present command shall be immediate or deferred.

In general, the control circuit operates to use the information stored in the digit positions 14 through 29 to control the operations of the computer in accordance with the instructions contained in these digit positions of the command word.

In the operation of the control circuit, there are four different states of operation. The four different states of operation are indicated by four different possible combinations of states of two flip-flop circuits within a two flip-flop counter C14 shown in FIGURE 30. The two flip-flop circuits within the two flip-flop counter C14 are a flip-flop circuit C10 and a flip-flop circuit C12 (shown in FIGURE 32).

Reference will now be had to a chart shown in FIGURE 31, indicating the settings of the flip-flop circuits C12 and C10, in accordance with particular states of operation. The various operational states are indicated in the left hand column of the chart of FIGURE 31. As always, the set state of the flip-flop circuits C10 and C12 are signified by one digits, and the reset states are signified by zeros.

Ot one point in the operation of the computer, there occurs a state of waiting for a next command to become available. During this state of wait-command, the computer is idling, waiting until the next command becomes available to be taken into the circuits from which the command will control the next operation of the computer. During the wait-command state, the flip-flop circuits C10 and C12 are both in a reset state, as indicated by the zeros shown in the chart of the FIGURE 31.

At a time when a particular command, indicated by the previous command, becomes available the flip-flop circuit C12 will be set and the flip-flop circuit C10 will remain reset. The state of operation which occurs during the interval when the flip-flop circuit C12 is set, and the flip-flop circuit C10 is reset, is read-command, and, during this state of operation a new command is read from a position in storage into the controlling circuits from which it will operate. The state of read-command when the signal RC is high, exists for exactly one word time, allowing a command word to be taken into the operating position in a bit-by-bit manner. After the command word is taken into operational positions, the machine then goes into a state called wait-transfer. During the wait-transfer state, both the flip-flop circuits C10 and C12 are in a set state, and the machine is waiting for the instant when information will begin to be transferred from a particular source to a particular destination. Of course, this interval of wait-transfer may vary in time. When the instant occurs for the information to be transferred, that is, when the information to be transferred is presently available, then the two flip-flop counter C14 is so set that the flip-flop circuit C10 becomes set, and the flip-flop circuit C12 becomes reset. The transfer state during which the signal TR is high usually exists for either one word time, or two word times, during which a word of single or double length is transferred from a particular source to a particular destination, possibly being operated upon in a particular manner during the transfer. At the termination of the transfer state, the two flip-flop counter C14 is returned to the wait command state with the flip-flop circuits C10 and C12 both being in a reset state.

In the operation of the system represented by the block diagram of FIGURE 30, the command word is taken into a one-word accumulator C16 from a position in storage via an input terminal C15. The command word is then set up in the one-word accumulator C16. The one-word accumulator C16 will receive timing pulses TP13 and TP21 at a terminal C17. Upon receiving the timing pulses TP13 and TP21 the one-word accumulator C16 will, in effect, count within certain digit positions by the addition of the digits represented by the timing pulses TP13 and TP21. The counting carried on in the one-word accumulator C16 is terminated at a time when a digit is propagated into the 29th digit position thus indicating that the word stored in the accumulator has reached a predetermined number. At this time the operational state pending the counting period will come into being. Control of the length of the counting period is effected by varying the number from which the counting process begins, because in effect the number to which the counting process goes is always the same.

At the time when a counting interval is terminated, an output signal by a signal from the one-word accumulator C16 will be applied either to the line C18 or to the line C19, depending upon which state the computer is going into. The signal passing through either the line C18 or the line C19 will effect a change of state by altering the states of one of the flip-flop circuits in the two flip-flop counter C14.

In the operation of the one-word accumulator to count, certain compensations must be made. In binary coded counting, the natural method of counting is to count to the number 128; however, in the present computer, the total number of words in a memory cycle is 108. It is necessary, therefore, to provide the one-word accumulator C16 with a correction factor which will be derived from a 108 word magnetic drum circuit C21. The 108 word magnetic drum circuit C21 also supplies the one-word accumlator C16 with numerical information to correct the command digits received with respect to the present word under consideration to cause the carry digit to occur at the desired time.

To consider the manner of counting in the accumulator C26, which determines when to form a signal to effect a change in the two-word flip-flop counting circuit C14, reference will be had back to FIGURE 17 which shows the command word. Consider first the command word bits 14 through 20 which are set up in the one-word accumulator. The timing pulses TU13 pass through a one-bit delay contained in the one-word accumulator C16 and are added in the digit position 14 to cause counting in the digit positions 14 through 20. At a time when capacity of the digit positions 14 through 20 is exceeded by the counting process, there will be a digit formed in the next higher digit position; i.e., the digit position 21 of the command word. At the instant of the formation of the digit in the 21st digit position of the command word, a signal will be transferred via line C18 from the accumulator C16 to the two flip-flop counting circuit C14. The signal to the two flip-flop circuit C14 will have the effect of changing the computer from the wait-command state to the read-command state. The read-command state will exist for precisely one word time after which the machine automatically goes into a wait-transfer state. During the wait-transfer state a counting process, similar to that just described, occurs within the digit positions 22 through 28 of the command word. Upon the occurrence of a carry digit from the 28th digit position of the command word into the 29th digit position, effected by the repeated addition of timing pulses TP21, a pulse will be fed over the line C19 from the one-word accumulator C16 to the two flip-flop counter C14 to change the state of the computer to the transfer state. The transfer state generally lasts for either one-word time, or two-word times, during which period the information is transferred from a particular source to a particular destination.

In the event a one digit is present in the digit position 29 of the command word, then the transfer will be immediate and there will be no deferred transfer counting period, thus, an immediate transfer mode of operation is possible by programming one digit in the 29th digit position of a common word, such that the one-word accumulator C16 does not count until there is a carry-over into the 29th digit position.

The break-indicating digit position 21 is utilized to halt the operation of the machine; however, the presence of a digit in the digit position 21 requires additionally that a break-in switch have been manually operated to effect a halt of the machine.

The operation of the machine during deferred-command type operation will normally follow a predetermined sequence from one of the operational states to another, that is, wait-command state will progress into read-command state, read-command state will progress into wait-transfer state, wait-transfer state will progress into transfer state, transfer state will progress into wait-command state. Of course when the command is of an immediately executed type, then the wait-transfer state will be omitted.

Figure 32:
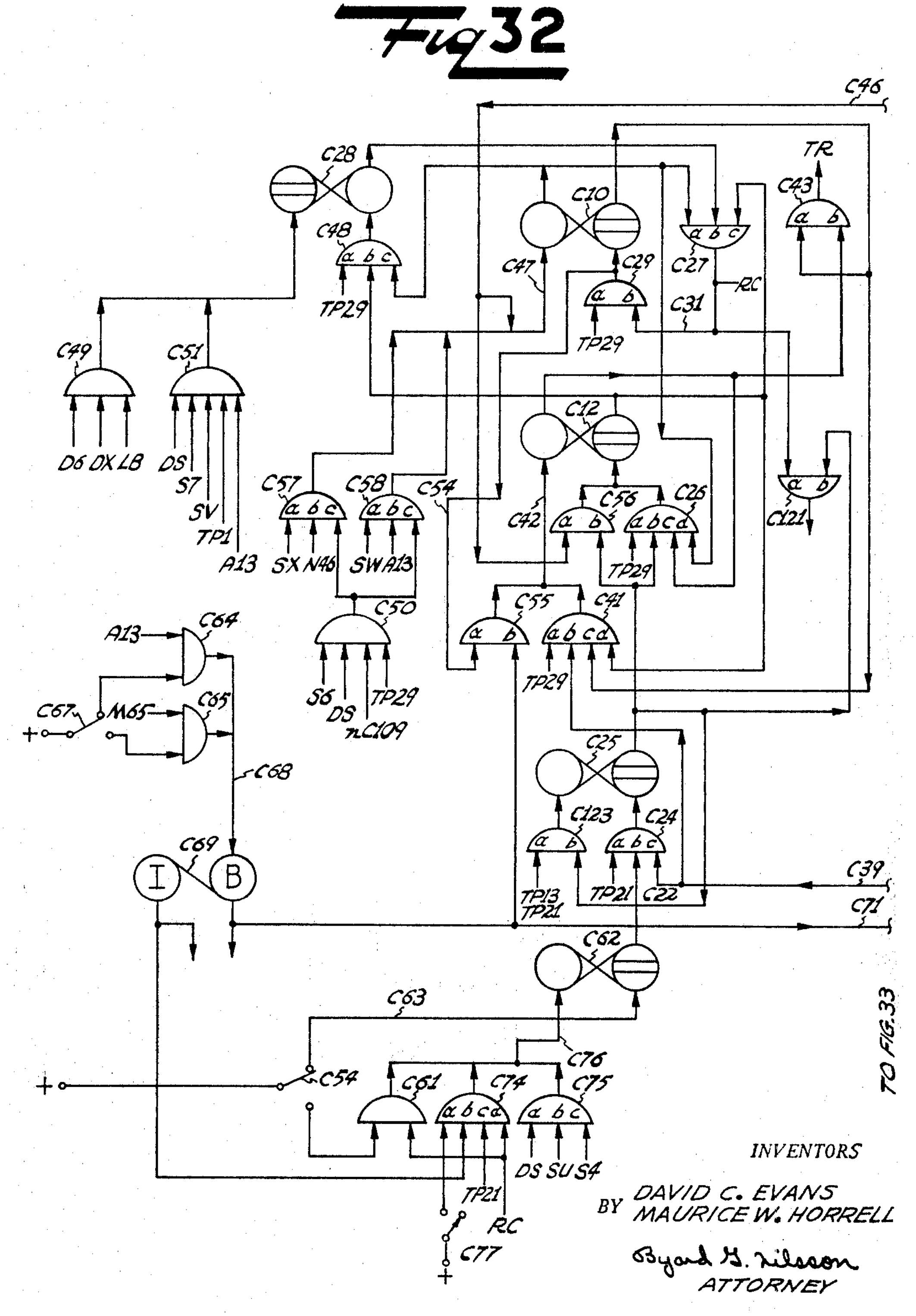
FIGURE 32 shows a symbolic block diagrammatic representation of a portion of the control circuits.
Figure 33:
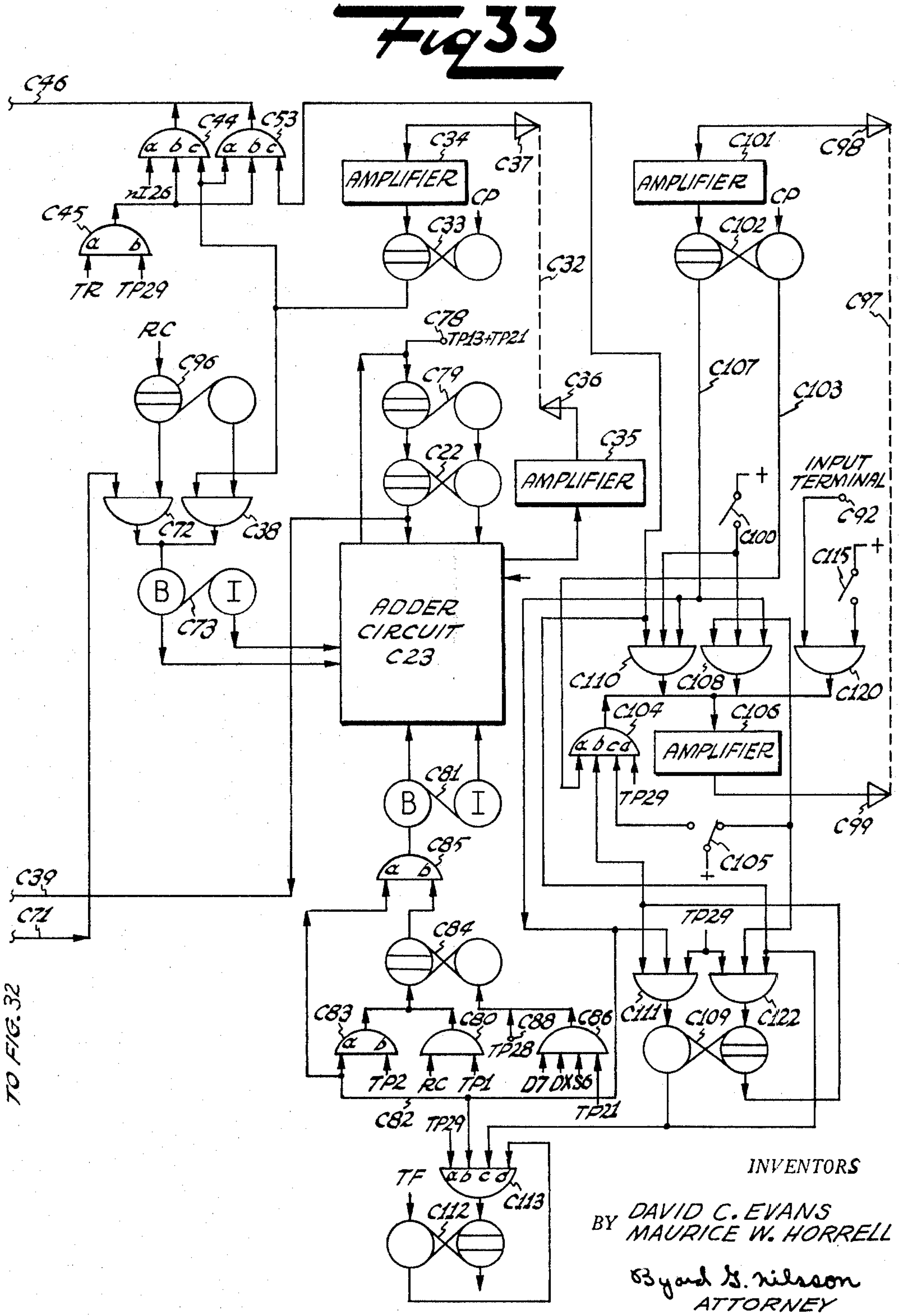
FIGURE 33 shows a symbolic block diagrammatic representation of a portion of the control circuits.

In the detailed description of the control circuits, reference will be had to FIGURE 32 and FIGURE 33. Assume first that the machine is in an operational state of wait-command. During the state of wait-command, both the flip-flop circuits C10 and C12 shown in FIGURE 32 are in a reset state as shown by the chart of FIGURE 31. During the state of wait command, the computer is idling pending the availability of the next command. During the word prior to the word when the next command specified by the last command becomes available, a carry digit will appear during the 21st digit position in a carry flip-flop circuit C22 (associated with and shown external to a binary adder circuit C23). The adder circuit C23 forms a portion of the one-word accumulator previously referred to as the one-word accumulator C16. The presence of a digit, setting the flip-flop circuit C22 during the time of the 21st clock pulse of a word, i.e., a digit position 21 of a word, indicates that the next word shall be interval during which the next command should be read.

The setting of the flip-flop circuit C22 during the 21st digit position will be sensed by a gate circuit C24 via a line C39, shown in FIGURE 32. During the interval of the 21st clock pulse, the gate circuit C24 will be qualified as to its part *a* by the timing pulse TP21. The part *b* of the gate circuit C24 will be qualified because a flip-flop circuit C62 will be set during the operation of the computer as will be later explained. The appearance of the carry digit in the 21st digit position setting the carry flip-flop circuit C22, will qualify the gate circuit C24 as to part *c* via line C39, to pass a high signal to set the flip-flop circuit C25. The flip-flop circuit C25 thus stores a one digit by being in its set state until a time when the beginning of the next word occurs. That is, the flip-flop circuit C25 becomes set during the word prior to the word when the next command shall actually be read. At the time of the next timing pulse TP29, after the setting of the flip-flop circuit C25, the set state of the flip-flop circuit C25 will serve to set the flip-flop circuit C12 via a gate circuit C26. The gate circuit C26 will be qualified as to its part *a* by the occurrence of the timing pulse TP29. The set state of the flip-flop circuit C25 will qualify the gate circuit C26 as to its part *b*. The part *c* of the gate circuit C26 is qualified by the fact that during the previous state, i.e., wait-command, the flip-flop circuit C12 was in a reset state. The part *d* of the gate circuit C26 will be set due to the fact that the flip-flop circuit C10 is in a reset state during the wait-command state. With the qualification of the gate circuit C26, the flip-flop circuit C12 will be set, thereby effecting a state of read-command during which the flip-flop circuit C10 is in a reset state, and the flip-flop circuit C12 is in a set state.

The read command state of the machine is detected by a gate circuit C27 shown in FIGURE 32. The gate circuit C27 is qualified as to its part *a* by the flip-flop circuit C10 being in a reset state, is qualified as to its part *b* by the flip-flop circuit C28 being in a reset state (which must at present be assumed, but which will later be discussed) and is qualified as to its part *c* by the flip-flop circuit C12 being in a set state. The full qualification of the gate circuit C27 will form the read command signal RC at a high value.

The flip-flop circuit C28 is utilized, in the control circuit, for controlling the computer to conditionally go into the state of read-command, and will be discussed at a later point in the specification.

The qualification of the gate circuit C27 allows the passage of a high signal RC, during the read-command operational state, to the gate circuit C29 via a line C31. The gate circuit C29 is so arranged as to become qualified during the occurrence of the timing pulse TP29 as to its part *a* thereby allowing the passage of the high RC signal from the gate C27, through the gate circuit C29, to set the flip-flop circuit C10. The setting of the flip-flop circuit C10 at the time of the timing pulse TP29 will terminate the read-command state after exactly one word time, during which a command word was read, thereby causing the operational state of the computer to become wait-transfer.

The state of wait-transfer occurs when both the flip-flop circuit C10 and the flip-flop circuit C12 are in a set state. During the operational state of wait-transfer, digits are added to the one-word accumulator as shown in FIGURE 33, comprising a magnetic drum channel C32, which provides a 29-bit delay between writing and reading, a binary adder circuit C23, the flip-flop circuit C33, reading and writing amplifiers, respectively C34 and C35, and writing and reading heads respectively C36 and C37.

During the wait-transfer state, the number circulating within the one word accumulator circuit including the magnetic storage channel C32, is continually approaching the point where a carry digit will be formed in the flip-flop circuit C22 during the 29th digit position of the word prior to the word during which transfer shall occur. At a time when a carry digit is propagated into the 29th digit position, indicated by the setting of the flip-flop circuit C22, a high signal will be transferred via the line C39 of FIGURE 33 to a gate circuit C41 of FIGURE 32. The high signal transferred via the line C39, indicating a carry over into digit position 29, will qualify the gate circuit C41 as to its part *b*. The gate circuit C41 will be qualified as to its part *a* by the timing pulse TP29 coinciding in time to the digit position 29. The part *c* of the flip-flop circuit C41 is qualified by the flip-flop circuit C10 being in a set state. (The set state being the state of the flip-flop circuit C10 during the wait-transfer operational state.) The part *d* of the gate circuit C41 is qualified by the set state of the flip-flop circuit C12, this state occurring during the wait-transfer state. It may therefore be seen, that in this manner the gate circuit C41 will become fully qualified, thereby passing a high signal via the line C42 to the flip-flop circuit C12, to reset the flip-flop circuit C12 and cause the machine to go into a transfer operational state. During the transfer state, indicated when the flip-flop circuit C10 is set, and the flip-flop circuit C12 is reset, the machine is making a transfer of information, and this state will ordinarily exist for precisely one-word time or precisely two-word times.

The transfer state of the machine is detected by the gate circuit C43 as shown in FIGURE 32. The gate circuit C43 is qualified as to its part *a* by the flip-flop circuit C10 being in a set state, and as to its part *b* by the flip-flop circuit C12 being in a reset state, such that the conditions for the transfer state will cause a high value for the signal TR. A consideration will first be made of a transfer state which lasts for one word time.

The carry digit which occurred in the carry flip-flop circuit C22 of FIGURE 33 in the 29th digit position which was utilized to bring about the transfer state, passes back into the binary adder circuit C23, passes through the amplifier C35, and is recorded by means of the writing head C36 on the magnetic drum channel C32. The digit then passes through the magnetic drum channel and appears at a time 29 clock pulse times later at the reading head C37 to pass through the amplifier C34 and set the flip-flop circuit C33. The setting of the flip-flop circuit C33 qualifies a gate circuit C44 as to its part *c*. The gate circuit C44 is qualified as to its part *b* by a signal from a gate circuit C45. The gate circuit C45 is qualified as to its part *a* during the transfer state, and as to its part *b* during the interval of the timing pulse TP29. The gate circuit C45 is thus fully qualified during the 29th digit position of the transfer state, and passes a high signal which qualifies the gate circuit C44 as to its part *b*. The reset state of the flip-flop circuit I26 qualifies the gate circuit C44 as to its part *a* thereby fully qualifying the gate circuit C44 and passing a high signal to line C46.

A discussion of the set state of the flip-flop circuit I26 was made relative to the index control circuit; however, at a time when I26 is reset, single word operation is indicated.

The high signal on the line C46 is transferred by the line C46 shown on FIGURE 33 and by a line C47 shown on FIGURE 32 to reset the flip-flop circuit C10, thereby terminating the transfer state after precisely one word time.

The termination of the transfer state, i.e., resetting the flip-flop circuit C10 to cause both the flip-flop circuits C10 and C12 to be in a reset state, brings about a state of wait-command which returns the machine to the operational state assumed in the beginning of the explanation of how the changes in state are effected.

In the operation of the computer, it is sometimes desirable to be able to read a command to be executed conditionally upon the occurrence of some event, thereby giving the machine the flexibility to control itself. Such conditional control of the operational state of read-command is effected by means of the flip-flop circuit C28 shown in FIGURE 32. The flip-flop circuit C28 must be in a reset state in order for the computer to pass into the read-command operational state, as mentioned above, by reason of the fact that the flip-flop circuit C28 must be in a reset state to qualify the gate circuit C27 as to its part *b*, and the qualification in full of the gate circuit C27 is required to enable the machine to pass into the read-command state and form the signal RC high. It may therefore be seen that in the event the flip-flop circuit C28 is in a set state, the operational state of read-command cannot exist and a new command may not be read. The flip-flop circuit C28 may be reset by means of a gate circuit C48, and set by means of gate circuit C49 or gate circuit C51. The gate circuit C48 is qualified as follows: part *a* by the timing pulse TP29, part *b* by the flip-flop circuit C12 being in a set state, and part *c* by the flip-flop circuit C10 being in a reset state. It may therefore be seen that the gate circuit will be qualified during the 29th digit position of what would normally be the read-command state, thereby resetting the flip-flop circuit C28. Therefore, at a time when the computer would ordinarily form the signal RC high and taken on a new command, if the flip-flop circuit C28 were set, the gate circuit C27 will not allow the state of read-command to come into being. However, during the 29th bit interval of the next word, the flip-flop circuit C28 will be reset thereby conditioning the flip-flop circuit C28 for a read-command state of operation during the next cycle of operational states, unless the flip-flop circuit C28 is again placed in a set state.

Consider now the manner of qualification of the gate circuits C49 and C51 to set the flip-flop circuit C28, thereby preventing the machine from forming the RC signal high and reading a new command. The qualification of either of the gate circuits C49 or C51 requires particular commands from the index control circuits. Consider first the qualification of the gate circuit C49. The "test" command, as shown in the chart of FIGURE 19, may be seen to cause destination signals D6 and DX from the index control circuits to be high to qualify the gate circuit C47 as to its parts *a* and *b*. The part *c* of the gate circuit C49 is connected to the late bus LB, therefore, the full qualification of the gate circuit C49 will, during "test" command, be determined by whether or not a digit signal is placed on the late bus LB. With qualification, the gate circuit C49 and the flip-flop circuit C28 will be set thereby delaying the read-command operational state.

The qualification of the gate circuit C51 is effected to test the contents of the accumulator circuit at the time of the sign-indicating digit positions, i.e., timing pulse TP1. This test thus determines the sign of the numerical content of the accumulator circuit. The gate circuit C51 requires for qualification the special signal DS from the index control circuit, the source signals S7 and SV, and the timing pulse TP1 to fully qualify the gate circuit C51 to allow passage of a high signal A13 indicating the output flip-flop circuit A13 of the accumulator circuit contains a digit. Referring to the list of special commands shown in FIGURE 19, it may be seen that the special command S7 SV is utilized to test the contents of the accumulator circuit at the time of the timing pulse TP1. The command may therefore be seen to be utilized to determine when the contents of the accumulator becomes negative. If either of the gate circuits C49 or C51 are qualified, then the control circuit will delay the reading of a new command until such time as the conditions qualifying either of the gate circuits C49 or C51 are removed.

As has been previously mentioned, the machine may be operated in double-precision mode, that is, a mode wherein to increase the precision of an operation the number of digits in a word which are available to carry a particular number is doubled. In the event that the machine is operating in a double-precision mode, utilizing double-length words, the control circuit must operate differently to extend the length of the transfer period such as to accommodate the double-length words with an increased period of transfer. The other states of operation during this mode of operation, wait-command, read-command and wait-transfer will remain the same duration as previously.

During single-length word operation, as previously described, the transfer state was effected by means of the gate circuit C45 and C44 (both of which are shown in FIGURE 33) transferring a high signal to the gate circuit C56 of FIGURE 32, to be passed to set the flip-flop circuit C12. In the case of double-length word operation, the signal *n*I26 will not be high, therefore, the gate circuit C44 will inhibited as to its part *a* and the termination of the transfer state cannot be effected in the manner previously described.

During double-length-word type operation, the one digit recorded in the 29th digit position in the magnetic drum channel C32, which was utilized to terminate the transfer state just as during single-word-length type operation, is circulated through the adder C23 and the magnetic drum channel C32 again to appear 29 digit positions later at the flip-flop circuit C33 to be coupled to part *a* of a gate circuit C53. The gate circuit C53 is qualified as to its part *b* by the qualification of the gate circuit C45 as previously explained. The gate circuit C53 is qualified as to its part *c* by the reset state of a flip-flop circuit C109 shown in FIGURE 32. The flip-flop C109 is in a reset state during an alternate 29-bit word times, that is, odd-word times and is in a set state during periods indicating even-word intervals. The part *c* of the gate circuit C53 will, therefore, only be qualified every other word time when the flip-flop circuit C109 is in a reset state. It may therefore be seen that the double length word will be accommodated during the transfer state which will terminate when a signal passes the gate circuit C53 to the line C46 then via the line C47 to the flip-flop circuit C10. It is to be noted that the transfer of a double-length word shall occur during an interval beginning with an even word and extending to cover an odd word. The manner of setting and resetting the flip-flop circuit C109 will be later explained.

To this point, the discussion of the control circuits has been directed essentially to the mode of operation involving commands of the deferred type which are executed at some time interval occurring a predetermined time after they are received. It is to be recalled, however, that the operation of the machine is sufficiently flexible as to be capable of executing commands immediately upon the control circuits receiving the command.

Referring back to FIGURE 17, showing the command word, it may be seen that the presence of a digit in the 29th digit position of the command word indicates immediate, rather than deferred type transfer. In the explanation of the accomplishment of an immediately executed command, the control circuits will go directly from the read-command state of operation into the transfer operational state, omitting the state of wait-transfer. During the read-command state, as previously stated, the flip-flop circuit C10 will be in a reset state, and the flip-flop circuit C12 will be in a reset state. When the computer is in the read-command operational state and the last digit of the command word being read is high, transfer state will immediately come into being. The timing pulse TP29 being high will cause the gate circuit C29 of FIGURE 32 to be qualified as to its part *a*, and because the machine is in a state of read-command, the gate circuit C29 will be qualified as to part *b* by the high signal RC. The qualification of the gate circuit C29 will pass a high signal to set the flip-flop circuit C10. The high output during the 29th digit position from the gate circuit C29 is also coupled via a line C54 to a gate circuit C55 where it qualifies the gate circuit C55 as to its part *a*. The gate circuit C55 receives a qualifying signal for its part *b* during the 29th digit position from a buffer inverter C69, which is connected to receive the input command. A digit in the command word at the 29th digit position indicating immediate transfer, will therefore qualify the gate circuit C55 and reset the flip-flop circuit C12. With the flip-flop circuit C12 in a reset state, and the flip-flop circuit C10 in a set state, it may be seen that the one digit in the 29th digit position indicating immediate transfer will cause the computer to go directly into the transfer state from the read-command state, bypassing the wait-transfer state. The remainder of the operation cycle is somewhat similar to the deferred execution type of command operation. The one digit in the 29th digit position of the command word is passed via the line C71 to the gate circuit C72 of FIGURE 33. Because the operational state is read-command there is a high output from the buffer inverter C96 to qualify the gate circuit C72 to allow the one digit in the 29th digit position of the command word to pass through the buffer inverter C73 and to the adder circuit C23. This one digit passes through the adder circuit C23 to the amplifier circuit C35, the recording head C36 and is recorded on the magnetic drum channel C32. At a time 29 clock pulses CP later the digit is detected by the reading head C37, amplified by the amplifier C34, and used to set the flip-flop circuit C33. The set state of the flip-flop circuit C33 will qualify the gate circuit C44 as to its part *c*, just as during the termination of the transfer state which occurred after a command indicating deferred execution. This operation may be varied in accordance with the previously described section on double precision operation, i.e., double word length operation.

Another form of transition between the operational states is provided to handle the situation when the first word time following the termination of the transfer state is the word time in which the next command should be read. The occurrence of this situation allows the machine to omit the state of wait-command and go directly from the operational state of transfer into the operational state of read-command.

It shall be recalled, that during the transfer state, the flip-flop circuit C10 is set and the flip-flop circuit C12 is reset. During the read-command state the two flip-flop circuits C10 and C12 are reversed in state from those of the transfer state. Therefore, to go from the transfer state directly into the read-command state requires that both the flip-flop circuits C10 and C12 be altered in state. The flip-flop circuit C10 will have its state altered to be reset in any event, whether the state of wait-command is omitted or not. The alteration of the state of the flip-flop circuit C12 is by means of a gate circuit C56. The gate circuit C56 is qualified as to its part *b* by the set state of the flip-flop circuit C25, which has been previously explained to occur at a time when the computer is ready to go into the state of read-command. The part *a* of the gate circuit C56 will be qualified at the time when one of the gate circuits C44 or C53 of FIGURE 32 becomes qualified during the 29th digit position indicating the termination of the transfer state. The qualification of the gate circuit C56 will set the flip-flop circuit C12 which when coupled with the reset state of the flip-flop circuit C10 indicates the read-command state.

During the normalize command which has previously been described with reference to the numerical circuits, the computer acts to shift the bits of information within the digit positions of a word. As previously stated, the shifting takes place until such time as a one bit occupies the most significant digit position in the RQ register of the numerical circuit. The control circuit must be flexible during the normalizing command and provide a period of operational state of transfer which will last as long as the normalizing process, and be terminated when the normalizing process is complete. As previously described, the completion of the normalizing operation will cause a flip-flop circuit N46, associated with the numerical circuit and shown in FIGURE 26, to be set. The setting of the flip-flop circuit N46 will qualify a gate circuit C57, shown in FIGURE 32, as to its part *b*. The part *a* of the gate circuit C57 is qualified during the normalized command which causes the source signal SX to be high. Part *c* of the gate circuit C57 is qualified when a gate circuit C50 is qualified which occurs during even word times, which coincide to the reset state of the flip-flop circuit C109, during the timing pulse TP29, and conditioned upon the signals S6 and DS also being high. The gate circuit C57 is qualified during the 29th digit position of the normalize command when there is a digit in the flip-flop circuit N46, indicating a one digit is being read from the RQ register. The qualification of the gate circuit C57 causes a signal to be passed to the flip-flop circuit C10 thereby terminating the state of transfer which existed during the time when the digits were being normalized or shifted within the RQ register of the numerical circuit. It may therefore be seen that during the operation of a normalize command, the control circuits are flexible, and permit a state of transfer which is coincident with the period required to normalize the particular number contained in the RQ register of the numerical circuits.

In the event that the machine is operating in a floating point mode, as controlled by a mathematical programmer, it may be desirable to cause a number to be shifted to the left or right in accordance with the magnitude of a particular exponent. The exponent may be established in the accumulator and the right or left hand shift command can be arranged so that it terminates when the correct amount of shifting has been accomplished. The provision of a flexible state of transfer to accommodate this operation occurs by means of a gate circuit C58 which is qualified as to its part *a* by a high signal SW, as to its part *b* by a high signal A13 from the accumulator and as to its part *c* during the 29th digit position of even word times, when the gate circuit C59 is qualified in a manner similar to that described above. At the time when the exponent in the accumulator qualifies the gate circuit C58, the flip-flop circuit C10 will be reset to terminate the transfer state.

In the operation of the computer, different sources may be used for obtaining the command word information. The particular source of a command word is controlled by means of gate circuits C64 and C65. The source of the command to be read depends upon which of the gate circuits C64 or C65 is qualified, and the position of the switch C67 will determine which of the gate circuits C64 or C65 will be qualified as to its part *b*. The gate circuit C64 is adapted to receive the bits of a command word from a flip-flop circuit A13 which is the output flip-flop from the accumulator circuits. The gate circuit C65 is adapted to receive the bits of a command word from either of the magnetic storage circuits 0 or 1 as it is connected to a terminal M65 of the magnetic storage circuit, which is an output treminal for command word bits. The passing of a signal through the gate circuits C64 or C65 will place such a signal upon a line C68 from which it will be delivered to a buffer inverter circuit C69. The output of the buffer inverter circuit C69 is connected in such a manner as to pass signals received by it to a line C71. The line C71 is also shown on FIGURE 32, and is connected to a gate circuit C72 from which the new command word information may be fed to the buffer inverter circuit C73 when the gate circuit C72 is qualified during the state of read command. The information which is passed to the buffer inverter circuit C73 is then passed to the binary adder C23 wherein it is additively combined with certain correction numerical information, to be considered later, and is inserted in the cycling path of the accumulator of the control circuit. The qualification of the gate circuit C72 requires a high signal which occurs during the read-command state.

In addition to the above path, the new command information passing through the buffer inverter circuit C69 of FIGURE 32, passes from the inverter side of the buffer inverter C69 to a gate circuit C74. The gate circuit C74, with the gate circuit C61, and the gate circuit C75, are utilized to halt the operation of the machine. The manner in which the flip-flop circuit C62 is set to halt the operation of the machine will now be further considered. A switch C59 shown in FIGURE 32 is provided to control whether the computer shall be on or off. When the switch C59 is in raised position as shown in FIGURE 32, then the flip-flop circuit C62 will be set, via the line C63, and the gate circuit C24 will become qualified as to its part *b*. The qualifications of the gate circuit C24 is an essential for the machine to go into a state of read-command, as the gate circuit C24 provides the path for a signal to set the flip-flop circuit C25 which occurs prior to the read-command state as previously explained. With the qualification of the gate circuit C24 as to its part *b*, a high signal may pass to change the operational state to read-command. However, in the event the switch C59 is thrown to a down position opposite from that shown in FIGURE 32, then at the time of the next read-command, state when the RC signal is high, a gate circuit C61 will be qualified and pass a high signal onto the flip-flop circuit C62 placing the flip-flop circuit C62 in a reset state and inhibiting the gate circuit C24. The machine may not therefore pass into a state of read-command and operation will be stopped.

The gate circuits C61 and C74 similarly stop operation and are qualified as to their part *b* by the read-command state when the signal of RC is high; therefore, the machine may not halt by these means until a state of read-command is reached.

Consider now the operation of the gate circuit C74 to halt the machine which is effected by a so-called break-indicating digit in digit position 21. Break operation occurs when a break switch C77 is in a made state, such as to apply a high signal to qualify the gate circuit C74 as to its part *a*, at a time when command word contains a one digit in the 21st digit position, thereby qualifying the gate circuit C74 as to its part *c*. The time when no input digit is present in the input command will be indicated by the buffer inverter C69 and detected at part *b* of the gate circuit C74. With the full qualification of the gate circuit C74 a high signal will be passed to the line C76 to reset the flip-flop circuit C62 and halt the operation of the machine at the next read-command state. A halt may thus be programmed at a time when the break switch C77 is in a closed position.

The operation of the gate circuit C75 to halt the machine also depends upon a programmed halt. This programmed halt requires that the special index signal DS, from the index control circuits be high, and that the source signals SU and S4 be high to qualify the gate circuit C75. With the gate circuit C75 qualified a high signal will again be passed by means of the line C76 to reset the flip-flop circuit C62 and halt the operation of the machine.

At a time when the machine is halted, it goes into an idling state, i.e., the machine continues to function with the exception that the read-command state is not permitted to exist; therefore, no new commands are read to instruct the machine as to its next operation.

Attention will now be directed to the accumulator circuit portion of the control circuit as shown in FIGURE 33, for a discussion of the counting operations there performed. As previously stated, a command word is inserted in the accumulator circuit of the control circuit which consists of the magnetic storage channel C32, the reading head C37, the amplifier circuit C34, the flip-flop circuit C33, the gate circuit C38, the buffer inverter circuit C73, the binary adder C23, the amplifier C35, and the writing head C36. Note that during the recirculating period of the command word, the gate circuit C38 will be qualified by a signal from the inverter side of the buffer inverter C96. However, when a new command is being read as indicated by the signal RC being high, the gate circuit C38 will be inhibited, and the gate circuit C72 which provides a path for the new command word will be qualified. The command word recirculating in the accumulator circuit is added to by means of the timing pulses TP13 and TP21 which are applied to a terminal C78, connected to the carry flip-flop circuit C22 through a buffer inverter circuit C79. With each cycle of the command word in the cycling path of the accumulator, digits are added to the command word at the 13th digit position, and at the 21st digit position. By reason of the fact that these digits are placed in the binary adder C23 by means of the carry flip-flop circuit C22, there is a one digit delay while the digits pass through the flip-flop circuit C22; therefore, the actual addition takes place at the digit positions 14 and 22. The digits which are added to the command word at digit position 14 will cause a counting process to be effected utilizing the digit positions 14 through 20 of the command word. At a time when a spill over from the counting process passes a digit into the 21st digit position, the time will be indicated for the machine to pass into a state of read-next-command. A similar counting process takes place within the digit positions 22 through 28 of the command word to carry a digit into the 29th digit position which will cause the machine to pass into a state of transfer. It may, therefore, be seen that depending on the amount of counting or adding digits which must take place with respect to the content of the command word, control is effected over the times when the states of read-command and transfer may come into being.

In addition to the information arriving at the binary adder C23 from the flip-flop circuit C22 and the buffer inverter C73, another numerical information input is provided through the buffer inverter circuit C81. The input to the binary adder C23 through the buffer inverter circuit C81 provides for certain corrections, which must be made in the numbers circulating in the accumulator. Correction must be made for the fact that the machine has 108 word times and 108 is not a natural binary number to count to, and correction must be made depending upon which word is presently under consideration. The numbers to effect correction are taken from the 3,132 pulse-delay magnetic drum channel C97 which will later be described in detail.

The memory cycle, i.e., length of the typical magnetic drum channels, of the computer system, is 108 words in length and in view of the fact that the natural mode of counting for a binary system is to count to 128 words, a twenty-word correction is necessary once during every memory cycle. This must be made by inserting a binary equivalent of the decimal number 20 into the accumulator of the control circuits through the buffer inverter circuit C81 to the binary adder C23. The current word time of the memory cycle will have to be considered to determine the time lapse which must occur before a desired word time will be reached. There must, therefore, be a correction factor applied to the adder circuit C23 which varies as the current word time of the machine.

Signals are also recorded in the magnetic drum channel C97 at the 29th digit position of the words which are used to count odd and even word times, in a manner to be later explained.

The correction information from the 3,132 bit storage magnetic drum channel C97, is applied to the line C107 via the amplifier 101 and the flip-flop circuit C102 to qualify the gate circuit C83 in certain instances as to its part *a*. The gate circuit C83 is qualified as to its part *b* during timing pulse TP2 thereby setting the flip-flop circuit C84, which in turn qualifies a gate circuit C85 as to its part *b*. The gate circuit C85 has its part *a* connected back to the line C82. It may, therefore, be seen that after the time of the timing pulse TP2, correction information on the line C82 may pass through the gate circuit C85 to the buffer inverter circuit C81 and thence into the binary adder circuit C23.

During the word time 107, as arranged by the numerical information stored in the magnetic drum channel C97, the correction number is added to both the next command indicating digits, and the time of transfer indicating digits to compensate for counting to only 108. There are a number of exceptions to the operation, where it may be undesirable to transfer a correction number through the gate circuit C85. Among the exceptions, when information does not transfer through the gate circuit C85, are the times when the machine is producing a multiplication, a division, a shifting or a normalization. During these intervals, provisions are made by means of signals from the index control circuits to qualify fully a gate circuit C86, thereby resetting the flip-flop circuit C84, such as to prevent the passage of the correction numbers into the binary adder C23.

It is also to be noted that the means of resetting the flip-flop circuit C84, for usual operation of the flip-flop circuit C84, is by means of a terminal C88 which is connected to receive timing pulses TP28. The gate circuit C86 requires the following signals to be high for qualification, D7, DX, S6, and timing pulse TP21. It may, therefore, be seen that the gate circuit C86 will be qualified after the 21st digit position when the processes of multiplication, division, shifting, or normalizing are in process. Note that the gate circuit C80 is provided to always set the flip-flop circuit C84 during the read-command state, when a new command is being placed in the accumulator such as to apply a correction factor which varies as the current word time of the memory cycle.

During normal operation of the computer, the numerical information which is recorded in the correction-factor magnetic storage circuit circulates from the magnetic drum channel C97 to the magnetic reading head C98 and, after being read, is passed to an amplifier C101 to be amplified. The presence of a digit in any particular digit position from the amplifier circuit C101 will set the flip-flop circuit C102; however, in the absence of a digit in such a digit position, the flip-flop circuit C102 will be reset by the application of a clock pulse CP. The output from the flip-flop circuit C102 is applied by means of a line C107 to gate circuits C108 and C110. The normal circulation of numerical information is accomplished by means of the gate circuit C108 to the amplifier circuit C106. Numerical information after being amplified by the amplifier circuit C106, is passed to the writing head C99 to be rerecorded in the magnetic drum channel C97.

In the operation of the correction-factor magnetic storage channel C97 to supply correction and counting information to the adder circuit C23, in a manner similar to that taught in the above referred U.S. patent application of Dr. Harry Huskey, it becomes necessary to insert digit information in the 29th digit position of the circulating words to count odd and even word times. The manner of inserting such digits will now be considered. Preparatory to inserting any information in the correction magnetic storage channel C97, it may be desirable to clear the circuit of any previously recorded numerical information. The clearing operation is effected by means of a switch C100 adapted to apply a positive potential to both the gate circuits C108 and C110. Without a positive potential applied by means of the switch C100, the gate circuits C108 and C110 are both inhibited, and numerical information will not be permitted to circulate and be recorded in the magnetic drum channel C97. Opening the switch C100 will therefore clear the correction-factor magnetic storage channel C97 of numerical information.

During the normal operation of the computer, the switch C105 is thrown to the right in a position as shown in FIGURE 33, to qualify the gate circuit C108 to permit normal circulation. During the period when it is desired to insert the digits in the 29th digit position of the words circulating in the correction-factor magnetic storage channel, the switch C105 is thrown to the left to qualify a gate circuit C104 as to its part *c*. The gate circuit C104 is qualified as to its part *b* by the set state of the flip-flop circuit C109. The flip-flop circuit C109 will have been set by means of the gate circuit C110 previous to the switch C105 being thrown to the left. The gate circuit C110 is qualified by the timing pulse TP29 when the switch C105 is thrown to the right unless the flip-flop circuit C109 is in a set state. The gate circuit C104 is qualified as to its part *d* by the timing pulses TP29. Gate circuit C104 is qualified as to its part *a* at a time when the flip-flop circuit C102 does not contain a digit, and is reset. It may therefore be seen that with the qualification of the gate circuit C104 during the 29th digit position, a high signal will be applied to the amplifier circuit C106, to be applied to the writing head C99 and recorded in the magnetic drum channel C97. At a time when the first pulse so recorded in the magnetic drum channel in the 29th digit position arrives at the reading head C98, the flip-flop circuit C102 will be set causing a high signal to occur in the line C107. The high signal in the line C107 will cause the gate circuit C111 to be qualified thereby resetting the flip-flop circuit C109. This reset state of the flip-flop circuit C109 will indicate the word time one, the first odd word. The reset state of the flip-flop circuit C109 will cause a high signal to be applied to the gate circuit C110, qualifying the gate circuit C110 to allow recirculation of the digit information during the period which the gate circuit C108 is inhibited by the switch C105 being thrown to the left. The gate circuit C104, upon the occurrence of the digit setting the flip-flop circuit C102, will be inhibited due to the fact that the signal in the line C103 will now be at a low value inhibiting the gate circuit C104 as to its part *a*. With the pulses established in the 29th digit position of the words in the magnetic drum channel C97, the switch circuit C105 will be thrown to the right to establish normal circulation by means of the gate circuit C108. The pulses established in the 29th digit position of the words serve to set and reset the flip-flop circuit C109 by means of the gate circuits C111 and C122 during alternate word times. It may therefore be seen, that the gate circuit C109 will be set during even word times and reset during odd word times.

In addition to the timing pulse TP29 being recorded in the magnetic drum channel C97, there is a need for the correction information. Such correction information is placed in the magnetic drum channel C97 by means of a gate circuit C120. The gate circuit C120 has one part connected to an input terminal C92 and another part connected to a source of positive potential through a switch C115. The input terminal C92 is to be connected to a certain one of the magnetic storage circuits 2 through 18 such that at the time when the switch C115 is closed, predetermined numerical information positive in a certain one of the magnetic storage circuits 2 through 18 will pass through the gate circuit C120 to the amplifier C106, thence to be recorded in the magnetic drum channel C97 by means of the writing head C99. It may therefore be seen that during the initial period of starting the computer, the necessary correction factor numerical information may be recorded in the correction factor magnetic storage channel.

It will be recalled from the discussion relative to the index control circuits, that the first thirteen bits of the command word are moved into the index control circuits and held in registers in the index control circuits such that they may be utilized to control the flow of the information within the computer. To provide for moving the first 13 letters of the command word to the register circuit of the index control circuits, a clock pulse CP output is provided from the control circuit which is operative only during the first 13 digit positions of each control word. Consider the gate circuit C121 of FIGURE 32. The gate circuit C121 is qualified as to its part *b* during the periods when the flip-flop circuit C25 is in a set state, and as to its part *a* during the read command state. The flip-flop circuit C25 is set at time T21 just preceding the word during which the command is to be transferred, and it is reset by means of a gate C123 which is qualified as to its part *a* by the timing pulses TP13 and TP21, and as to its part *b* by the set state of the flip-flop circuit C25. It may therefore be seen that there will be exactly 13 clock pulses produced by the gate circuit C121 which will occur during the first 13 clock pulse times of the read-command state and which may be utilized to shift the contents of the flip-flop register into the index control circuits.

*Summary.*—A consideration of the above detailed description will disclose that the control circuits function to control which of four different operational states the computer is in. The four different operational states include a wait-command state, a read-command state, a wait-transfer state, and a transfer state. During the wait-command state the machine idles pending the time when the next command becomes available and may be taken into operational locations, from which the operation of the computer may be controlled.

At a time when the desired command becomes available, a state of read-command is effected, and the desired command is read into operational locations. Upon the completion of the read-command state, the machine goes into another period of idling, waiting the time when the desired numerical information will be available for transfer, called wait transfer. When the desired numerical information for transfer becomes available, the control circuits will then set the state of the computer to transfer, and the actual operational movement of the numerical information will be effected.

The control of the various operational states by the control circuits must be such as to vary the time of the states by reason of the flexibility of the computer. Such flexibility is provided for by making provisions for varying each of the operational states in accordance with such requirements as double precision operation, immediate or deferred transfer, and the varying time periods which must be allowed for the operation of the numerical circuits.

MAGNETIC REGISTERS

Reference will now be had to FIGURE 34 which shows registers I and II. The purpose of the registers I and II is to provide the machine with a fast access storage means. The registers may be utilized by a programmer when it is desired to record information in a place where it will be available without appreciable time delay. The registers I and II are also arranged in such a manner that they may be utilized to effect the performance of certain logical operations relative to their contents.

Referring specifically first to register I in FIGURE 34, there is shown a magnetic drum channel R11 having associated therewith, a writing head R12 and a reading head R13. The reading head R13 is connected to an amplifier circuit R10 wherein information read from the magnetic drum channel R11 may be amplified and passed on to a flip-flop circuit R14. The flip-flop circuit R14 is, as is usual for the read-flip-flop circuits, connected to receive clock pulses CP as a reset signal. When the flip-flop circuit R14 is in a set state, indicating the presence of a digit from the magnetic drum channel R11, the gate circuit R15 will be qualified as to its part *c*. If the gate circuit R15 becomes qualified as to its parts *a* and *b*, the information presently available at the flip-flop circuit R14 will be passed through the gate circuit R15 to the early bus EB. The qualification of the gate circuit R15 as to parts *a* and *b* is by means of source signals SU S5, from the index control circuits. Thus the occurrence of a command which forms the signals SU and S5 high, will cause numerical information from the register I to be transferred to the early bus EB.

The numerical information passing through the flip-flop circuit R14 is also passed to the gate circuits R17 and R18. The gate circuits R17 and R18 are qualified each in part by the negation of the signals DU and D5, i.e. *n*DU and *n*D5, being high. The signal *n*DU being high qualifies the gate circuit R17 as to its part *a*, and the signal *n*D5 being high qualifies the gate circuit R18 as to its part *b*. The part *b* of the gate circuit R17 is connected to the output of the flip-flop circuit R14, and the part *a* of the gate circuit R18 is connected to the output of the flip-flop circuit R14. It may therefore be seen that upon the presence of either of the negation signals *n*DU or *n*D5 being high, the information from the flip-flop circuit R14 will pass by way of either the gate circuit R17 or the gate circuit R18 to a line R19. The line R19 is connected to an amplifier circuit R20 which is in turn connected to the writing head R12, associated with the magnetic drum channel R11, such that the information taken from the magnetic drum channel R11 is rerecorded in the magnetic drum channel at the writing head R12. In this fashion, information is cycled and thus stored in the register I.

At a time when new information is to replace the numerical information currently stored in the register I, the register I will be commanded as a destination, and the index control circuit will form the destination signals DU and D5 high. The fact that the signals DU and D5 are high will cause the signals *n*DU and *n*D5 to be low and therefore, when the register I is to act as a destination, the gate circuits R17 and R18 will be inhibited and the numerical information in the register I will be sacrificed. The signals DU and D5 being high will qualify the gate circuit R16, to allow the passage of new information from the late bus LB to the line R19, the amplifier R20, and the recording head R12, to be recorded in the magnetic drum channel R11.

Consider now the operation of the register II which is similar to the operation of the register I. A magnetic drum channel R21 is provided with a reading head R22 and a writing head R23. The reading head R22 is connected to an amplifier circuit R24 which is in turn connected to set a flip-flop circuit R25. The reset state of the flip-flop circuit R25 is effected, as usual, by the application of a clock pulse CP. The output of the flip-flop circuit R25, providing the information as to whether the flip-flop circuit R25 did or did not receive a digit from the magnetic drum channel R21, is applied to a gate circuit R26. The gate circuit R26 is qualified by the source signals S5 and SV being high, which occurs when the register II is commanded as a source. When the register II is commanded as a source, numerical information is passed through the gate circuit R26 to the early bus EB.

The cycling of information within the register II is accomplished by means of the gate circuits R28 and R29. Unless the register II is commanded as a destination, in which event a destination signal DV and a destination signal D5 are both high, one of the negations of these signals *n*DV and *n*D5 will be high and qualify one of the gate circuits R28 or R29, thus allows the information indicative of the states of the flip-flop circuit R25 to be passed through the gate circuit R28 or R29 to a line R31 from which such numerical information will be passed through an amplifier circuit R32 and thence to a writing head R23, wherein the information will be rerecorded upon the magnetic drum channel R21.

In the event new information is to be placed in the register II from the late bus LB, the destination signals DV and D5 will be high and qualify a gate circuit R33. The gate circuit R33 being qualified will allow the passage of numerical information from the late bus LB through the gate circuit R33 to the line R31 from which it may be recorded by the head R23 upon the magnetic drum channel R21. The fact that the signals DV and D5 are high will make the signals *n*DV and *n*D5 both low. When both the signals *n*DV and *n*D5 are low, the numerical information circulating in the register II is cancelled by the gate circuits R28 and R29 both being inhibited.

The numerical register I and the numerical register II, as shown in FIGURE 34, are also used for performing a number of logical operations upon their contents and the contents of the PN register associated with the numerical circuit. Reference back to FIGURE 19 will indicate that certain of the source signals are utilized to draw numerical information from the registers I and II in such a manner as to perform various logical operations upon the numerical information being so taken from sources.

A command which causes the source signals S6 and SX to be high will place upon the early bus EB the sum of logical products (register I)·(register II)+(*n* register I)·(PN register). In effect, this logical operation, on a bit-by-bit basis, calls for a digit when there is a digit in the register I and the register II, or when there is no digit in the register I and a digit in the PN register. The gate circuit R40 is utilized to partly perform the logical operation by testing for the presence of a digit in the register I in coincidence with the presence of a digit in the register II. The gate circuit R40 is qualified in part by the source signals S6 and SX. To qualify the remainder of the gate circuit R40 requires the presence of both a digit from flip-flop circuit R25, and a digit from the flip-flop circuit R14. It may therefore be seen that the gate circuit R40 will become qualified and pass a high signal to the early bus EB at a time when the source signals SX and S6 are high, and when both the flip-flop circuits R14 and R25 contain a digit.

The occurrence of the source signals SX and S6 at a high value also qualifies the gate circuit R42 as to its parts *a* and *b*. The part *c* of the gate circuit R42 is connected to receive a signal from the flip-flop circuit N13. The flip-flop circuit N13 is associated with the PN register of the numerical circuits such that digits being read from the PN register are passed through the flip-flop circuit N13. The part *d* of the gate circuit R42 is connected to receive a signal from the flip-flop circuit R14, which is high at a time when the flip-flop circuit R14 does not contain a digit. It may therefore be seen that the gate circuit R42 will be qualified to pass digit-indicating high signals to the early bus EB at a time when the source signals SX and S6 are high, when a digit is being read from the PN register, and when no digit is being read from the register I. The gate circuits R40 and R42 may therefore be seen to act in combination on the presence of the source signals S6 and SX at a high value to perform the desired logical operation.

When a command is such as to cause the source signals S7 and SV to be at a high value, a test will be made of the coincidence of digits in the individual bit positions of the register I and the register II. The logical operation performed will thus be (register I)·(register II). This logical operation is performed by a gate circuit R44. The gate circuit R44 is qualified in part by the occurrence of signals SV and S7 at a high value. The remainder of the gate circuit R44 is qualified at a time when there is a coincidence of the flip-flop circuit R14 being set and the flip-flop circuit R25 being set. The gate circuit R44 will thus, when commanded by the presence of high signals SV and S7, detect a coincidence of high signals from the flip-flop circuits R14 and R25.

At a time when the command is such as to cause the source signals S7 and SW to be at a high value, the logical operation (*n* register I)·(register II) will be performed. The effect of this logical operation is to detect the presence in the individual digit positions of a digit in the register II and the absence of a digit in the register I. The gate circuit R46 serves to perform this logical operation. Parts *a* and *b* of the gate circuit R46 are qualified at a time when the source signals S7 and SW are at a high value. Part *c* of the gate circuit R46 is connected to the flip-flop circuit R14 in such a manner as to receive a high signal at a time when the flip-flop circuit R14 is in a reset state. The part *d* of the gate circuit R46 is connected to be qualified by a signal from the flip-flop circuit R25, which is high when the flip-flop circuit R25 is in a set state. It may therefore be seen that on command, when the source signals S7 and SW are high, the gate circuit R46 will test for the coincidence of a digit in the register II and the absence of a digit in the register I. Upon qualification, the gate circuit R46 will couple the individual digits to the early bus EB.

At a time when a command is given which causes the source signals S7 and SX to be high, the logical operation (register I)+(register II) will be called for. The effect of this logical operation is to test for the presence of a digit in the individual bit positions of the contents of either the register I or the register II. The gate circuit R48 will serve to perform this logical operation. The gate circuit R48 is qualified as to its part *a* by the source signal S7 being high, as to its part *b* by its source signal SX being high, and as to its part *c* by a signal from either the flip-flop circuit R14 or the flip-flop circuit R25 being high. Upon the occurrence of the source signals S7 and SX high, the presence of a digit in either of the flip-flop circuits R14 or R25, thereby causing either the flip-flop circuit R14 or the flip-flop circuit R25 to be in a set state will qualify the gate circuit R48. Upon qualification, the gate circuit R48 will cause a high digit-indicating signal to be passed to the early bus EB.

*Summary.*—It may therefore be seen that the function of the register I and the register II is to provide a storage space for information to which fast access may be had. In addition the gate circuits associated with the register I and the register II may be utilized for performing various logical operations between the contents of the registers I and II, or the contents of one of the registers I and II and other registers.

The computer performs the solution of differential equations in a digital manner. The numerical solutions to differential equations are accomplished by means of a network of interconnected integration performing systems. Each of the integration performing systems is formed by controlling the flow of numerical information between certain of the magnetic storage circuits.

Figure 35:
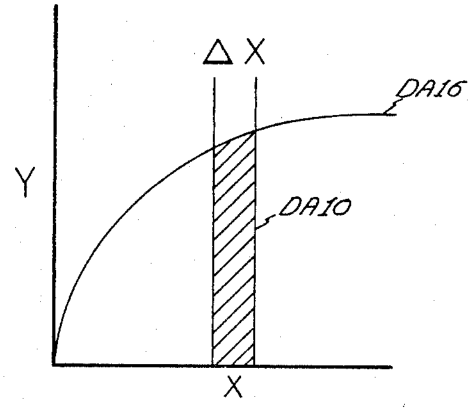
FIGURE 35 shows a diagrammatic representation illustrative of the manner in which the preferred embodiment performs the process of integration.

Referring now to FIGURE 35, there is shown a curve plotted with an independent variable X as abscissa, and a dependent variable Y as ordinate. The operation of integration involves summing incremental area DA10, i.e. $Y\Delta X$. Reference will be made to FIGURE 35 in an explanation of the basic system of digital integration illustrated by FIGURE 36.

Figure 36:
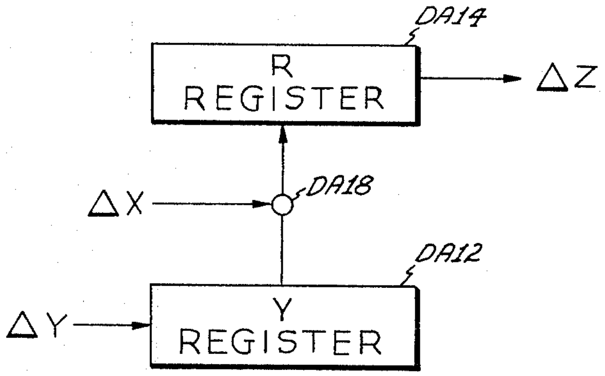
FIGURE 36 shows a block diagrammatic illustration of the mode in which the described embodiment performs the process of integration.

FIGURE 36 shows, in block diagram form, the function of operation of a single integration performing system of the computer which is called a functional integrator. In FIGURE 36, there are shown two registers, DA12 and DA14. The register DA12 is adapted to receive and accumulate signals which represent $\Delta Y$, i.e., the increments of value of the dependent variable Y. The register DA12 will be called the Y register because it will accumulate the changes in the value of Y and therefore will contain the value Y at given instants.

The information stored in the Y register DA12, will, at different instants, be equivalent to the value of Y at different points on the X axis of the curve DA16 as shown in FIGURE 35. The output from the Y register DA12 passes through a transfer system DA18, which is adapted to be controlled by signals indicative of the value $\Delta X$. With the application of a $\Delta X$ indicating signal, digital information represented by electrical impulses and representing the present value of Y will be passed from the Y register DA12 and added into the R register DA14. The R register DA14 therefore accumulates incremental areas $Y\Delta X$. Periodically, the R register DA14 overflows indicating a quantity $\Delta Z$ which is representative of a predetermined amount of area.

Referring back now to FIGURE 35, there is shown an incremental area DA10 under the curve DA16. The incremental area DA10 is of width $\Delta X$, and of height Y. Considering the operation of the functional diagram shown in FIGURE 36, with reference to the FIGURE 35, it may be seen that the height of the element DA10 representing $Y\Delta X$ is stored in the Y register DA12. Upon receiving a $\Delta X$ signal at the transfer system DA18, the information stored in the Y register DA12 will be added into the R register DA14. The R register DA14 will accumulate values representative of $Y\Delta X$, i.e. area DA10, until such time as an overflow of the R register DA14 is produced, at which time a single pulse will be generated from the R register DA14, indicating a predetermined amount of area $\Delta Z$ has been accumulated. At any time when the R register DA14 drops below zero, a negative overflow will be indicated, i.e., a negative $\Delta Z$ will be formed. At any time the content of the R register DA14 becomes very near one, a positive overflow will be indicated, i.e. a positive $\Delta Z$ will be formed.

Figure 37:
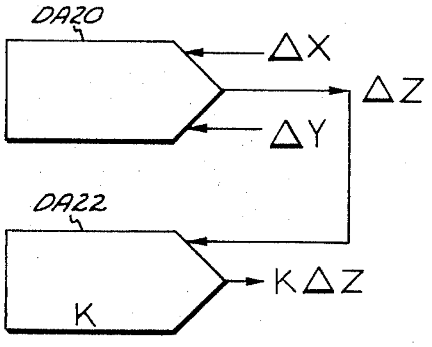
FIGURE 37 shows a block diagrammatic representation of the manner in which the processes of integration are intercoupled within the computer of the described embodiment.

It may therefore be seen that essentially a single functional integrator of the digital type comprises a Y register DA12, coupled through a transfer system DA18 to an R register DA14. It has become somewhat usual to represent the combined functional integrator as shown in FIGURE 36, by a polygon, two of which are shown in FIGURE 37. Consider first the polygon DA20 which has an input $\Delta X$, an input $\Delta Y$, and an output $\Delta Z$. The output from the integrating system DA20 is coupled to act as the $\Delta X$ input on the integrating system represented by the polygon DA22. The Y value in the polygon DA22, representing an integrating system, is set at some constant value K, and therefore, the ouptut from the integrating system represented by the polygon DA22 becomes $K\Delta Z$, i.e., a constant value multiplied by $\Delta Z$.

The above discussion, directed to the combination of the two functional integrators represented by the polygons DA20 and DA22, serves to show the manner in which these units are combined to perform a functional operation in the computer, a functional operation including an integration and a multiplication. Various other functional combinations are also possible, as may be seen from a copending patent application of Floyd G. Steele and William F. Collison, filed on March 26, 1951, Serial No. 217,478, now Patent No. 2,900,134, which indicates in general the manner of operation of a digital differential analyzer. In the operation of the computer of the described embodiment to solve differential equations, several integrator multiplier combinations similar to that shown in FIGURE 37 are utilized to perform a functional operation involving an integration and a multiplication. The computer performs a multiplicity of these functional operations differentially combining values to perform integration and thereby solve differential equations. During even-word times, an integration is performed, the result of which is coupled to the next following multiplication performing stage. During odd-word times, a multiplication is performed involving as factors a constant value and the result of the last integration; the product of which is placed in storage. In the event that it is not desired to alter the result of the last integration by any factor, it will then be necessary to multiply the result of the last integration by a factor of one.

Figure 38:
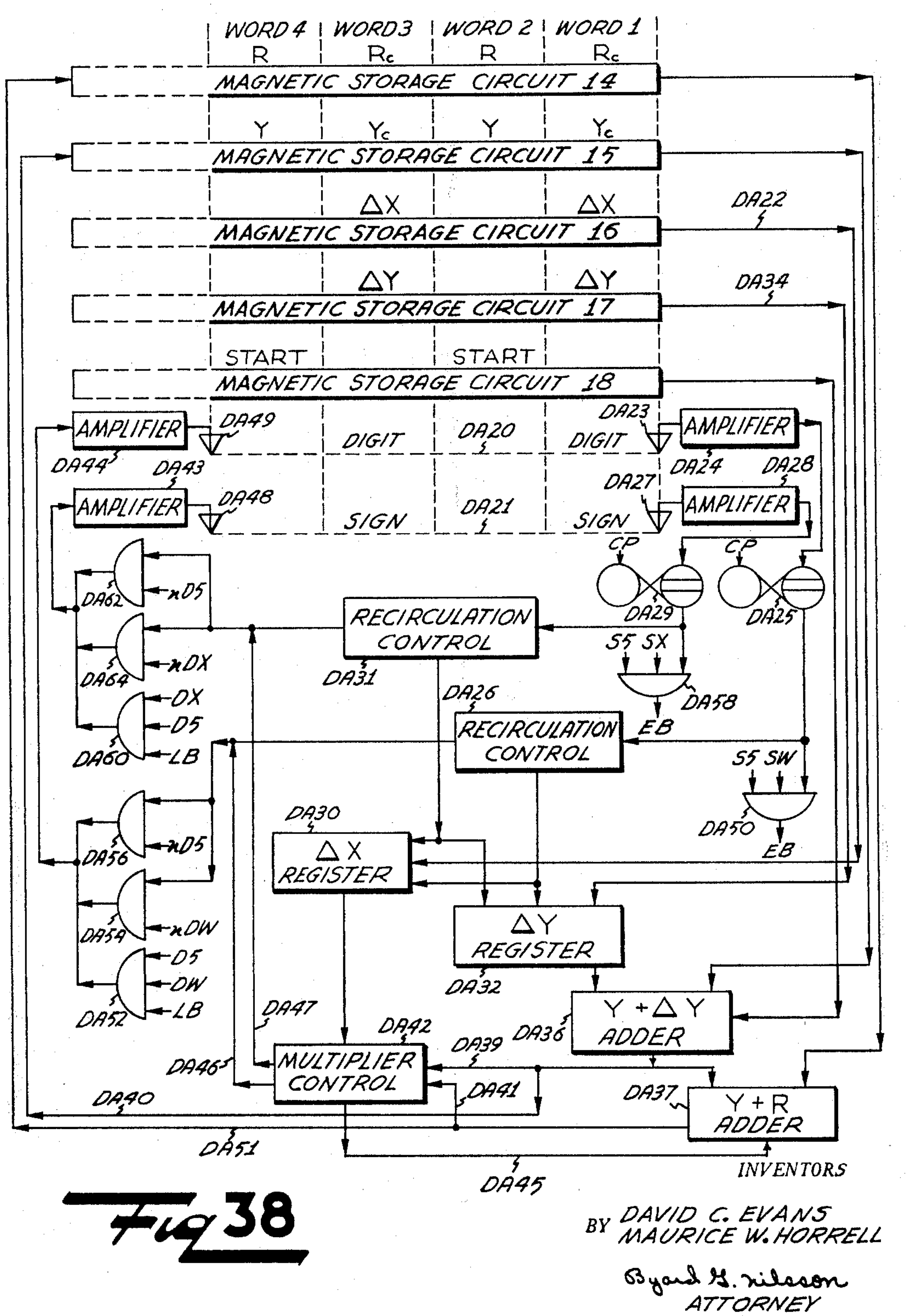
FIGURE 38 shows a symbolic and block diagrammatic representation of the mode of operation of the described embodiment to perform the process of integration.

Reference will now be had to FIGURE 38 which shows a functional diagram that will be utilized in the description of the manner of operation of the computer in the solution of differential equations by the process of integration. It is to be understood that the description with reference to FIGURE 38 will be a block diagram description, and a description relative to detailed structure and the mode of operation thereof will follow in the specification.

There are shown in FIGURE 38 a number of magnetic storage circuits, 14, 15, 16, 17, and 18, of the type previously described as a typical magnetic storage circuit, each capable of storing numerical information, delivering stored numerical information and replacing stored numerical information. A consideration of the first four words of storage of each of the magnetic storage circuits will be sufficient to illustrate one functional operation including an integration and a multiplication. In addition to the magnetic storage circuits 14, 15, 16, 17, and 18, there are shown in FIGURE 38 two magnetic drum channels DA20 and DA21 each of four word length.

As an aid to understanding the operation of the computer to perform the process of integration, four words have been scaled off on the magnetic storage circuits 14, 15, 16, 17, and 18, as well as the magnetic drum channels DA20 and DA21 to reveal the content of these words. At the instant of first consideration of the system as shown in FIGURE 38, an odd-word, word one, is about to be read. The information stored in the odd-word portions of the magnetic storage circuit 16 is the $\Delta X$ address information and during the time interval when word one is read, certain numerical information relative to $\Delta X$ will be taken from the magnetic storage circuit 16 and applied via a line DA22 to a ΔX register DA30 which stores the ΔX value. To register a ΔX digit in the ΔX register DA30, however, requires not only a high signal from the line DA22, but also the presence of a digit from the magnetic drum channel DA20 which passes through a reading head DA23, an amplifier DA24, a flip-flop circuit DA25, and a recirculation control circuit DA26, and is then applied to the ΔX register DA27.

The recirculation control circuit DA26 functions in a manner similar to the recirculation control gates previously discussed relative to the discussion of the magnetic storage circuits, and will be later described in detail. The recirculation control circuit DA26 also contains a one digit storage means, which may serve to delay the circulating information by one bit, i.e. digit position, at a time when an integration is in process, thereby effecting a precession of the bits in the magnetic drum channel DA20.

It is to be noted that a coincidence of signals from the ΔX digit-containing magnetic storage circuit 16, and signals from the digit-indicating magnetic drum channel DA20 is required to be detected by the ΔX register DA30 to indicate the presence of a ΔX digit. The sign of such a ΔX digit is determined by the information detected by the reading head DA27 from the magnetic drum channel DA21. That is to say, the presence of a ΔX digit is indicated when there is a coincidence of impulses from the magnetic storage circuit 16 and the magnetic drum channel DA20, and the sign of such a ΔX digit is indicated by the presence or absence of a pulse signal from the magnetic drum channel DA21. The magnetic drum channel DA21 is read by the reading head DA27, to form a signal which is amplified by an amplifier circuit DA28 and thence coupled through a flip-flop circuit DA29 to recirculation control circuit DA31. The function of the recirculation control circuit DA31 is similar to the function of the recirculation control circuit DA26. The recirculation control circuits DA31 and DA26 serve to either recirculate the information received from the flip-flop circuits DA25 and DA29, or, the information is delayed one digit position and applied to the ΔX register DA30 and to a ΔY register DA32.

To reconsider, the presence of a one digit signal from magnetic storage circuit 16 which is applied to the ΔX register DA30 coinciding with the presence of a one digit signal from the magnetic storage channel DA20 will indicate the presence of a ΔX digit, and in the event that the ΔX digit is to be positive, there will also be a one digit-indicating signal, also in time coincidence, appearing from the magnetic drum channel DA21; however, in the event that the ΔX digit is negative, then there will be no one digit-indicating signal present from the magnetic drum channel DA21. In this manner, during the word one, as during all odd-words, the ΔX register becomes set preparatory to performing an integration function.

The ΔY register DA32 is similarly set with the value of ΔY. The ΔY address information is contained in the odd words of magnetic storage circuit 17, and is applied to the ΔY register DA32 via a line DA 34. The ΔY register DA32 also receives information from the magnetic drum channels DA20 and DA21 by means of the circulation control circuits DA26 and DA32. The information received by the ΔY register DA32 from the magnetic drum channels DA20 and DA21, indicate by coinciding with digit information from the magnetic storage channel 17 the presence of either a positive or a negative ΔY, in a manner similar to that which the ΔX digits are indicated. It may therefore be seen that during the first word time, as during all odd-word times, the ΔX register DA30 and the ΔY register DA32 will be set preparatory to performing an integration process.

Consider now that the ΔX register DA30, and the ΔY register DA32, have been set to contain the ΔX and ΔY information and that the magnetic memory system carrying the magnetic storage circuits 14, 15, 16, 17, and 18, and the magnetic drum channels DA20 and DA21, has now moved to the point where word two, an even word, is now ready to be read. It is during word two, i.e. even-word times, that the integration part of the functional operation is performed. The contents of the Y register as shown in FIGURE 36 will be the numerical information which appears from the magnetic storage circuit 15, and the contents of the R register will appear from the magnetic storage circuit 14. In function, the operation of the system, assuming the presence of a ΔX digit, must now be to add the ΔY information to the Y information taken from the magnetic storage circuit 15, to form new Y information, and to add the new Y information to the R information taken from the magnetic storage channel 14.

The new Y information is also returned to the Y register, i.e., magnetic storage circuit 15, by means of a $Y+\Delta Y$ adder D36, via a line DA40 to replace the old Y information. The new R information, formed by the addition of the old R information and the new Y information and effected in a $Y+R$ adder, is returned to the R register, i.e., magnetic storage circuit 14, via a line DA51 to replace the former R information. In this fashion an integration is performed.

To provide a control means which shall determine at what point in significance the ΔY information shall be added into the Y information in a bit-by-bit manner, the ΔY information is delayed with respect to the Y information until the bits of the ΔY information are in their proper digit position with respect to Y. The amount of displacement of the ΔY information is determined by the information stored in even-word portions of the magnetic storage circuit 18. The even-words of the magnetic storage circuit 18 contain start pulses which have been programmed into the machine. The reading of a start pulse will start the addition of the ΔY information, contained in the ΔY register DA32, to the Y information, which is taken from magnetic storage circuit 15 and applied to a $Y+\Delta Y$ adder circuit DA36. The ΔY information, applied from the ΔY register DA32, and the Y information from the magnetic storage circuit 15, are thus combined in proper significance, as determined by the start pulse information received from the magnetic storage circuit 18, in the $Y+\Delta Y$ adder DA36. The new Y value is coupled to a $Y+R$ adder DA37 and in addition is returned via line DA40 to the magnetic storage circuit 15. The new R numerical information from the $Y+R$ adder DA37, indicating the combined value of $Y+R$, is passed from the $Y+R$ adder DA37 to a multiplier control circuit DA42 via line 41 and also is returned to storage in the magnetic storage circuit 14.

The multiplier control circuit DA38 also receives signals indicating the new Y value from the $Y+\Delta Y$ adder DA36 via a line DA39. The receipt of the new Y value, from the $Y+\Delta Y$ adder DA36, is necessary to the multiplier control circuit DA42 in order to determine whether ΔZ should be positive or negative. In the event that the new Y value is negative, it must be considered in order to determine the sign of any overflow indicating a ΔZ.

The multiplier control circuit DA42, during even-word periods of operation, interprets the information it receives as a ΔZ value which shall be fed onto a multiplication stage as a ΔX input, as explained with reference to FIGURE 37. It is therefore necessary that the multiplier control circuit DA42 does not return this information to be recorded via the amplifiers DA43 and DA44 but, that the information be applied via a line DA45 to the $Y+R$ adder DA37 to be multiplied by a constant during an odd-word time.

At the completion of the word two, the integration has been performed and the product of such an integration is contained in the multiplier control circuit DA42. Assume now that the information stored in the magnetic memory system has proceeded to such a point that word three is in a position to be read. At this time, the operation of the computer is to effect a multiplication of the product of the last integration by a predetermined number. The output of the last integration therefore, will, now form the information input to the next step previously termed ΔX, and the multiplier information Y*c* and R*c* is stored in the odd words of magnetic storage circuits 14 and 15. The R*c* and Y*c* values are applied to the $Y+R$ adder DA37 with the output of the multiplier control circuit DA42, i.e., the last product of integration, which will be applied by the line DA45 to the $Y+R$ adder DA37 to condition the addition or act as a ΔX input to the multiplication. The application of a high signal indicating a product of integration, via the line DA45 to the $Y+R$ adder DA37, is necessary to cause additions to take place which will form a multiplication. The addition taking place in the $Y+R$ adder DA37, has the effect of multiplying the product of the last integration by a constant value Y*c*. The result of the multiplication derived from the $Y+R$ adder DA37 is passed to the multiplier control circuit DA42, similarly to the product of integration which occured during the last even-word time. The output of the multiplier control circuit DA42 is, during this odd-word time, passed on by the lines DA46 and DA47 to the amplifiers DA44 and DA43. The output of the amplifiers DA43 and DA44 is recorded in the magnetic drum channels DA20 and DA21 by means of the writing heads DA48 and DA49.

It shall be noted that during the last discussed word time, i.e. word time 3, just as during word one, the ΔX and the ΔY information was being set into the ΔX register DA23 and the ΔY register DA32, preparatory to being differentially combined to perform the next integration which will occur during the next even-word time.

Summarizing the general operation, it may be seen that during odd-word times, a multiplication takes place which multiplies the product of the last integration by a predetermined constant, and the value of ΔX and ΔY are set in the ΔX and ΔY registers DA30 and DA32, respectively. During the next word time, which will be an even-word time, an integration is performed utilizing the contents of the ΔY and ΔX registers. The combination of functions performed during one odd and one even word shall be termed a single functional operation.

The magnetic drum channels DA20 and DA21 are also provided with means for receiving information from the late bus LB and transferring information to the early bus EB, which may be used preparatory to analyzing a differential equation by the integration process.

The magnetic drum channel DA20 is provided with a gate circuit DA50 having an input from the flip-flop circuit DA25. Numerical information from the magnetic drum channel DA20 may thus be removed from the magnetic drum channel, as it circulates through the flip-flop circuit DA25 in the usual manner by the qualification of the gate circuit DA50. The gate circuit DA50 is qualified by the source signals S5 and SW being high from the index control circuits which designate the magnetic drum channel DA20 as an information source.

Information may be transferred into the magnetic drum channel DA20 from the late bus LB, by means of a gate circuit DA52. The gate circuit DA52 will be qualified by the presence of high destination signals D5 and DW from the index control circuits. Upon the occurrence of high destination signals D5 and DW, the gate circuit DA52 will be qualified thereby allowing the passage of numerical information from the late bus LR through the gate circuit DA52 to the amplifier circuit DA44 to be recorded by the recording head DA49 in the magnetic drum channel DA20. During the time when the destination signals D5 and DW are high, the signals *n*D5 and *n*DW will be low and gate circuits DA54 and DA56 will be unqualified, thereby blocking the numerical information formerly circulating to the magnetic drum channel DA20, as described previously with respect to other magnetic drum channels. During a time when no new numerical information is being coupled from the late bus LB to the magnetic drum channel DA20, the signals *n*D5 and *n*DW will either both or singly be high, thus allowing the circulation of the numerical information through either or both of the gate circuits DA54 or DA56.

The magnetic drum channel DA21 is provided with a gate circuit DA58 having an input from the flip-flop circuit DA29. The numerical information from the magnetic drum channel DA21 may be read from the magnetic drum channel DA21 as it circulates through the flip-flop circuit DA29 upon the qualification of the gate circuit DA58. The gate circuit DA58 is qualified by the source signals S5 and SX, from the index control circuits, which designate the magnetic drum channel DA21 as an information source.

The manner of inserting numerical information into the magnetic drum channel DA21 from the late bus LB is by means of the gate circuit DA60. The gate circuit DA60 is qualified by the presence of high destination signals DX and D5. Upon the qualification of the gate circuit DA60, numerical information may pass from the late bus LB into the magnetic drum channel DA21. The information circulating from the magnetic drum channel DA21 is blocked during the time when new information is being passed into the magnetic drum channel DA21 by means of the gate circuits DA62 and DA64. The gate circuits DA62 and DA64 serve normally to circulate the numerical information during the periods of their qualification.

Figure 39:
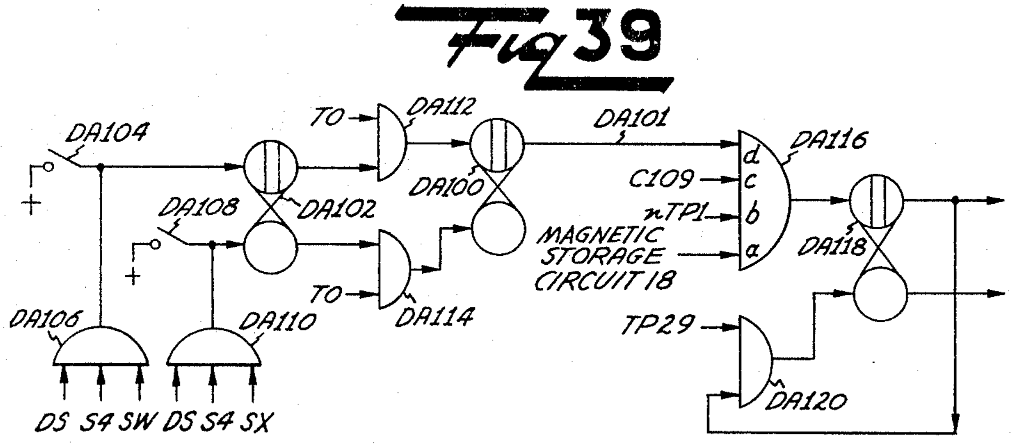
FIGURE 39 shows a symbolic block diagrammatic representation of a starting system for the process of integration.

A discussion will now be directed to the details of the differential analyzing control circuits and their mode of operation. Referring now to FIGURE 39, there is shown circuitry utilized to start and stop the differential analyzing process within the computer. The setting of a flip-flop circuit DA100 will generate a high "go" signal DA100 which will start the differential analyzing process within the computer. Resetting the flip-flop circuit DA100 will cause the differential analyzing process to be stopped.

In setting and resetting the flip-flop circuit DA100, it is arranged that the starting and stopping of the differential analyzing process always occurs at the time of the special timing pulse T0. The reason for starting and stopping at the time of the pulse T0 arises because of the desirability of stopping at a particular point which may be preserved for the next starting time. A flip-flop circuit DA102 is provided and is set or reset preparatory to stopping or starting the differential analyzing process. A manually operative start button DA104 is provided as one means of setting the flip-flop circuit DA102. A second means of setting flip-flop circuit DA102 is by means of a gate circuit DA106 which becomes fully qualified on a special command causing the special index signals DS, S4, and SW to be high, from the index control circuits. The command to qualify the gate circuit DA100, thus provides the programmer with a tool for starting the differential analyzing process at a predetermined time in computation.

The resetting of the flip-flop circuit DA102 may be effected also in either of two ways, by means of a manually operative stop switch DA108, or by means of a gate circuit DA110 which is qualified by a special command which causes the coincidence of high signals DS, S4, and SX from the index control circuits.

Once the flip-flop circuit DA102 has been set or reset, preparatory to starting or stopping the differential analyzing process, the occurrence of the timing pulse T0 will allow a high signal from the flip-flop circuit DA102 to either set or reset the flip-flop circuit DA100. The gate circuit DA112 is qualified upon the occurrence of the timing pulse T0, when the flip-flop circuit DA102 is in a set state. The qualification of the gate circuit DA112 will therefore set the flip-flop circuit DA100 thereby forming a high "go" signal DA100 in line DA101, to start the differential analyzing operation.

At a time when the flip-flop circuit DA102 is in a reset state, the occurrence of the timing pulse T0 will quality the gate circuit DA114, thereby resetting the flip-flop circuit DA100 and stopping the operation of the differential analyzing process.

One of the connections from the flip-flop circuit DA100 is to a gate circuit DA116 via the line DA101. The gate circuit DA116 is utilized to set a flip-flop circuit DA118 which is associated with the $\Delta Y+Y$ adder and is utilized to determine at what particular instant the ΔY numerical information shall be added to the Y numerical information, as previously described, to attach the proper significance to the ΔY numerical information. The gate circuit DA116 is qualified as to part *a* by the occurrence of start pulses contained in the magnetic storage circuit 18, which are programmed to indicate at what point the ΔY numerical information shall be added to the Y numerical information.

The gate circuit DA116 is qualified as to its part *b* by the presence of signal *n*TP1 being high, i.e., a signal which is high at all times except during the timing pulse TP1. The qualification of the gate circuit by the signal *n*TP1 being high prevents the addition of the ΔY information during first digit position which is utilized for the sign bit. The period of the timing pulse TP1 is not, however, utilized as a sign-information storing position in numerical information undergoing the differential analyzing process. The gate circuit DA116 is qualified as to its part *c* by the flip-flop circuit C109 being in a set state. The flip-flop C109 is in a set state during even word times only, and it is to be understood that the addition of the ΔY numerical information to the Y numerical information occurrs only during the even-word intervals. The gate circuit DA116 is further qualified, as to its part *d* by the "go" signal or DA100 being high to indicate the flip-flop circuit DA100 is set. The full qualification of the gate circuit DA116 sets the flip-flop circuit DA118 and thereby forms a signal DA118 high which is required to start the addition of the ΔY numerical information to the Y numerical information.

The resetting of the flip-flop circuit DA118 is effected at the time of the 29th digit position upon the completion of a word, by means of a gate circuit DA120. The gate circuit DA120 is qualified by the timing pulse TP29, and by a signal from the flip-flop circuit DA118.

Figure 40:
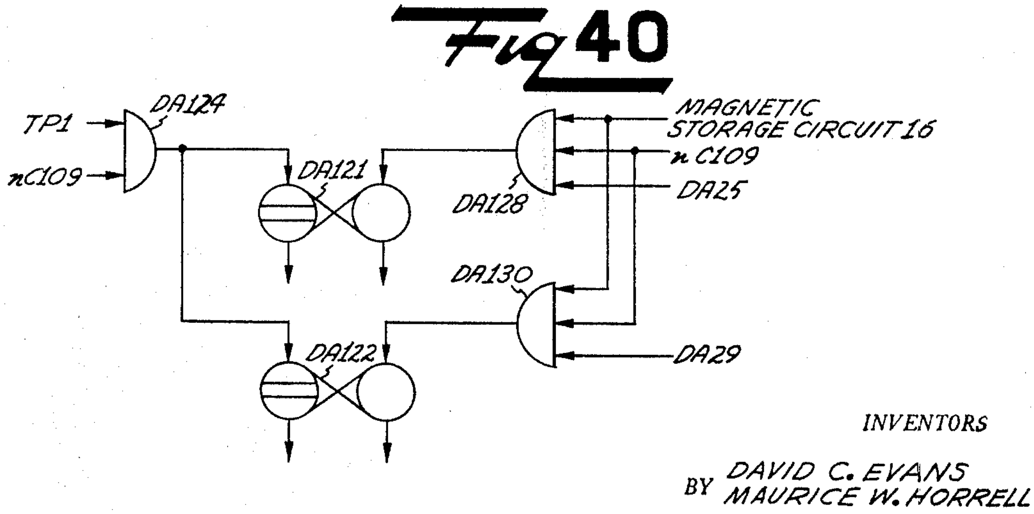
FIGURE 40 shows a symbolic block diagrammatic representation of a register system.

Reference will now be had to FIGURE 40 which shows the ΔX register for storing the ΔX digits and the sign of the ΔX digits. There are provided in the ΔX register two flip-flop circuits, a flip-flop circuit DA121 and a flip-flop circuit DA122. The flip-flop circuit DA121 is used to store the sign of the digit ΔX, and the flip-flop circuit DA122 is utilized to store the presence or absence of a digit ΔX. It may therefore be seen that ΔX may be either positive, negative, or zero, as indicated by the combined states of the flip-flop circuits DA121 and DA122. The flip-flop circuits DA121 and DA122 have two common setting factors, which are detected by means of a gate circuit DA124. The gate circuit DA124 will be qualified fully during odd-word times at the time of occurrence of the timing pulse TP1. The signal *n*C109 is high when the flip-flop circuit C109 of the control circuits is reset, corresponding to odd-word times, and the timing pulse TP1 of course is the first timing pulse of each word. Therefore, the gate circuit DA124 becomes qualified at the beginning of each odd word, and the flip-flop circuits DA121 and DA122 are both placed in a set state to indicate a positive ΔX. In the operation of the system, a positive ΔX is automatically set as the independent variable input to each integrator during each cycle of operation. In the event a ΔX address is used which corresponds to a non-positive ΔX, DA121 and DA122 are reset to a new value.

The resetting of the flip-flop circuits DA121 and DA122 is effected by means of the gate circuits DA128 and DA130. The gate circuits DA128 and DA130 have two common terms, i.e., the signals from the magnetic storage circuit 16 and the signal *n*C109. The signal from the magnetic storage circuit 16 contains the ΔX digit indicating information which may be utilized to remove the ΔX digit set in the ΔX register or to vary the sign of the ΔX digit during odd word times. As previously explained, however, it is necessary that there be a coincidence between digit information from the magnetic drum channel DA20 and the digit information from the magnetic storage circuit 16 to effect the formation of a ΔX digit. The gate circuit DA128 is therefore connected to detect the coincidence of signals from the magnetic storage circuit 16 and the magnetic drum channel DA20 during an odd-word time, and to reset the flip-flop circuit DA121 upon such occurrence. The signal DA25 is a signal from the flip-flop circuit DA25 associated with the magnetic drum channel DA20.

The gate circuit DA130 is utilized to reset the flip-flop circuit DA122 in order to indicate a negative ΔX at a time when there is a coincidence between a digit from the magnetic storage circuit 16 and the absence of a one digit from the magnetic drum channel 21. This lack of a one digit from the magnetic drum channel 21 is manifested by the signal *n*DA29 being high.

It may therefore be seen that the flip-flop circuits DA121 and DA122, forming the ΔX register, are placed in a particular state to indicate the presence of a positive ΔX digit, and are provided with means for changing state upon the occurrence of signals designed to change the positive ΔX value.

Figure 41:
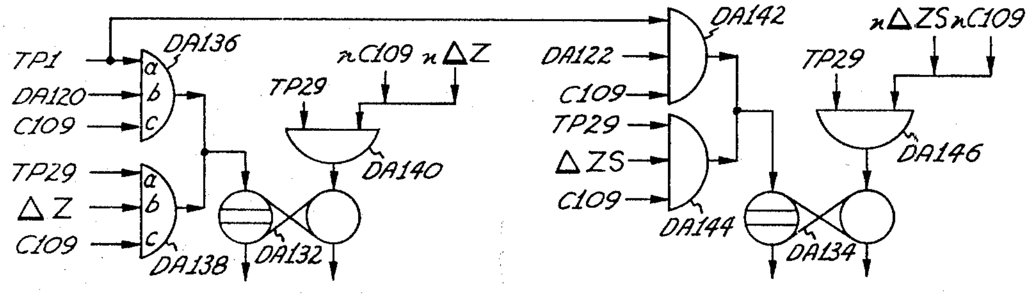
FIGURE 41 shows a symbolic block diagrammatic representation of a multiplier control system.

Consider now FIGURE 41 which shows the structure of the multiplier control circuit DA42 shown in FIGURE 38. The multiplier control circuit DA42 is utilized to store the numerical information which is utilized as the ΔX input to both the integrating operation, and the multiplying operation. That is, preparatory to the integration operation of an odd word, the multiplier control circuit receives the ΔX digit value from the ΔX register DA23. Preparatory to the multiplication operation of an even word, the multiplier control circuit receives the ΔZ value of the last integration operation which shall now function as a ΔX digit for the next multiplication operation, as explained with reference to FIGURE 38.

The information stored in the register formed by the flip-flop circuits DA132 and DA134 may be thought of as the ΔX information to be utilized during the next cycle of operation, be it an integrating operation or a multiplying operation.

The flip-flop circuit DA132 may be set either by a gate circuit DA136 or by a gate circuit DA138. The gate circuit DA138 is qualified as to its part *a* during the timing pulse TP29 and its part *c* during even-word times when the signal C109 is high. It may therefore be seen that during the even word times, i.e. integrating periods, the gate circuit DA138 will be qualified fully except as to its part *b*. The qualification of the gate circuit DA138 as to its part *b* depends upon the presence of a ΔZ digit resulting from the integration just performed. The presence of such a ΔZ digit which is a carry digit from the addition of Y and R (the development of which will be later described), will then qualify the gate circuit DA138 and will then set the flip-flop circuit DA132 such as to indicate the presence of a ΔZ digit. The presence of a ΔZ digit to set the flip-flop circuit DA132 will indicate a ΔX digit input for the next multiplier stage of an odd word as previously explained.

The gate circuit DA136, which provides another means of setting the flip-flop circuit DA132, is qualified as to its parts *a* and *c* during the time of timing pulse TP1 of even words. The gate circuit DA136 provides the means of transfer for digit information from the ΔX register DA23 into the multiplier control circuit DA42 as shown in FIGURE 38 preparatory to an integration operation. The qualification of the gate circuit DA136 as to its part *b* depends upon the state of the flip-flop circuit DA120, which has previously been discussed and indicates the presence of a ΔX digit in the ΔX register. The qualification of the gate circuit DA136 indicates the presence of a digit in the ΔX register at the beginning of an even-word time. The qualification of the gate circuit DA138 indicates the presence of a ΔZ at the end of an even-word time, or a carry from the addition of R and Y.

The resetting of the flip-flop circuit DA132 is effected by means of a gate circuit DA140. The gate circuit DA140 is qualified during the timing pulse TP29 of each odd-word time, and also at TP29 of even words if ΔZ is zero. The flip-flop circuit DA132 may therefore be seen to be set when there is a ΔX digit present for the input to the current operation and is otherwise reset.

In regard to the flip-flop circuit DA134, which is the sign storage flip-flop circuit of the multiplier control circuit DA42, a similar gating arrangement is provided. In the control of the state of the flip-flop circuit DA134, however, the sign information is to be stored and utilized, and not the digit information. The gate circuits DA142 and DA144 function with respect to the flip-flop circuit DA134 as the gate circuits DA136 and DA138 function with respect to the flip-flop circuit DA132. The resetting of the flip-flop circuit DA134 is effected by means of a gate circuit DA146.

The flip-flop circuit DA134 may be set by means of the gate circuit DA144 during an even-word time when C109 is high, at the time of the timing pulse TP29, if there is an output ΔZS from the integration stage indicating a positive ΔZ has been produced. That is to say, the gate circuit DA144 becomes qualified during the timing pulse TP29 of every even word if there is an output from the integrator indicating a positive sign-indicating digit, i.e., if there is present a digit ΔZS.

The gate circuit DA142 becomes qualified at the first digit position of an even word when there is a digit stored in the flip-flop circuit DA122. In this manner a positive-indicating sign digit stored in the flip-flop circuit DA122 of the ΔX register DA23 is transferred into the flip-flop circuit DA134 of the multiplier control circuit preparatory to an integrating operation.

The gate circuit DA144 is utilized as a means to place a positive-indicating sign digit into the flip-flop circuit DA134 preparatory to performing a multiplication operation. The multiplication operation will utilize the former ΔZS sign-indicating digit as a ΔX sign input, therefore the qualification of the gate circuit DA144 depends on the presence of a ΔZS digit at the time of the timing pulse TP29 during an even-word time.

The gate circuit DA146 is provided to reset the flip-flop circuit DA134 at the last digit position of odd-word times and at the same position of even-word times when no ΔZS digit is present, i.e., when a *n*ΔZS signal is high.

Figure 42:
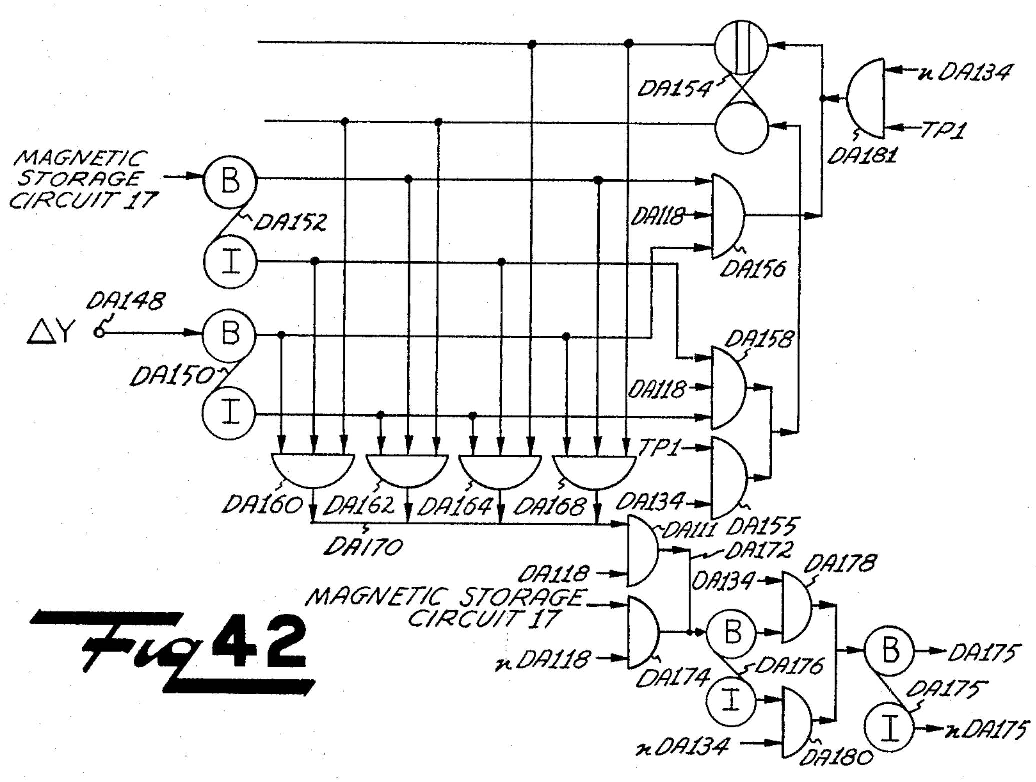
FIGURE 42 shows a symbolic block diagrammatic representation of an adder circuit.

Referring now to FIGURE 42, there is shown the $Y+\Delta Y$ adder circuit for combining the Y value with the ΔY value to form the new Y value. The Y value is stored in the magnetic storage circuit 17 and the ΔY value is stored in the ΔY register which will be later described in detail. The ΔY register has an output adapted to be connected to the terminal DA148. The ΔY information is serially applied from the input terminal DA148 to a buffer inverter circuit DA150.

Signals from the magnetic storage circuit 17 which represent the Y information are applied to a buffer inverter circuit DA152. A consideration of the circuitry of the adder circuit of FIGURE 42 will reveal that the system is similar to the general binary adder as previously described, with the further requirement that the setting and resetting of a carry flip-flop DA154 requires the presence of the start signal from the flip-flop circuit DA118. This requirement of a high start signal DA118 is effected by means of the gate circuits DA156 and DA158. The reason for the additional qualifying factor DA118, to set or reset the carry flip-flop circuit DA154 is due to the necessity of attaching the proper significance to the ΔY numerical information with respect to the Y information. The setting of the flip-flop circuit DA118 does not occur until the correct time for the addition to take place when the digit position of the Y information about to be considered is of the same significance as the first ΔY digit to be considered. Therefore, the gate circuits DA156 and DA158 will be qualified fully only at the time when it is proper for the addition of Y to ΔY to be made.

The carry flip-flop circuit DA154, is also reset at the beginning of each word time by the timing pulse TP1 applied to a gate circuit DA155. This occurs to clear the carry flip-flop circuit DA154 preparatory to each addition, unless the signal DA134 is not high, in which event, as will be later explained, it is not desired to clear the flip-flop circuit DA181, prior to the beginning of a new word.

The output of the $Y+\Delta Y$ adder of FIGURE 42 is formed by the gate circuits DA160, DA162, DA164, and DA168. The manner of operation of gate circuits DA160, DA162, DA164, and DA168, has been previously described with reference to a general adder description. The outputs from the gate circuits DA160, DA162, DA164, and DA168, will appear upon the line DA170 and be indicative of the sum of the binary numbers representing the new Y numerical information. The output of the line DA170 is qualified by a high signal from the flip-flop circuit DA118, which indicates the proper time for the addition to take place as previously discussed. The signal appearing at the line DA172 will be the sum of $Y+\Delta Y$ or the new value of Y.

During the time when the flip-flop circuit DA118 is not in a set state, a gate circuit DA174 may be qualified by the presence of digit information in the magnetic storage circuit 17. The provision of the gate circuit DA174 thus allows the digits of the Y value to pass to the line DA172 prior to the occurrence of the start pulse, when the ΔY information is not being added to the Y information.

The signal on the line DA172 is applied to a buffer inverter DA176 which applies its two outputs to two gate circuits DA178 and DA180. Depending on which of the gate circuits DA178 and DA180 is qualified, the final output of the adder will either be complemented or not complemented. In the event that the ΔX value is negative, as will be indicated by the flip-flop circuit DA134 of the multiplier control circuit being in a reset state, the gate circuit DA180 will be qualified and complementation will partly be performed by the inversion of the digits in the sum. To complete the complementation, it is necessary to add one to the inverted digits of the new value of Y. This additional digit is placed in the carry flip-flop circuit DA154 of the adder circuit by a gate circuit DA181. At a time when the new value of Y should be complemented, the signal *n*DA134 will be high and the gate circuit DA181 will be qualified during the time of the timing pulse TP1. The qualification of the gate circuit DA181 will place a carry digit in the flip-flop circuit DA154 in the first digit position.

It may therefore be seen that if the new value of Y should be complemented, as indicated by the signal *n*DA134 being high, then the digits of the new value of Y will be inverted and a one digit will be added to the inverted value If, however, the ΔX input value is positive, then the flip-flop circuit DA134 will be in a set state causing the signal DA134 to be high, and the numerical information appearing at a buffer inverter circuit DA175 will not be complemented.

It may therefore be seen that the function of the $Y+\Delta Y$ adder circuit DA36 as shown in detail in FIGURE 42 is to add the values $Y+\Delta Y$ to form a new Y value, and in addition to complement the new Y value in the event the ΔX input is negative.

Figure 43:
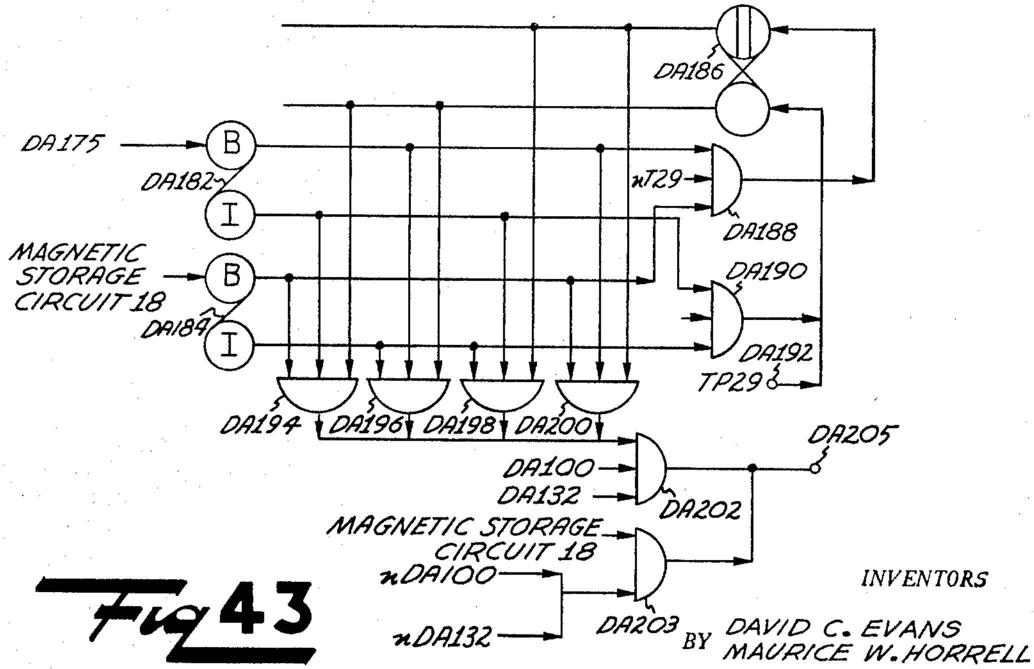
FIGURE 43 shows a symbolic block diagrammatic representation of an adder circuit.

Referring now to FIGURE 43, there is shown the $R+Y$ adder for combining the R value information with the Y value information. The Y information from the buffer side of the buffer inverted circuit DA175 of FIGURE 42 is applied to a buffer inverter circuit DA182 and the R information which has been previously stored in the magnetic storage circuit 18, is applied at a buffer inverter circuit DA184. The function of the $R+Y$ adder circuit of FIGURE 43 is similar to that described earlier in the specification; however, it is to be noted that the setting of the carry flip-flop circuit DA186 is conditioned by the presence of a signal *n*T29 indicative of the time when the timing pulse TP29 is not high, by means of the gate circuit DA188. It may therefore be seen that no carry digit may be propagated into the 29th digit position of a word. The resetting of the carry flip-flop circuit DA186 is effected by means of a gate circuit DA190 or by means of an input at a terminal DA192 which is adapted to receive the timing pulse TP29. It may therefore be seen that at every interval of the timing pulse TP29, the carry flip-flop DA186 will be placed in a reset state or cleared, preparatory to starting the addition of the next word.

The numerical information resulting from the summing of the R value and the Y value is detected by gate circuits DA194, DA196, DA198, and DA200. The output of digit information from the adder circuit of FIGURE 43 is conditioned by means of a gate circuit DA202 which detects the presence of the "go" signal DA100 and the presence of a ΔX input digit DA132 indicated by the presence of a digit in the digit flip-flop circuit DA132 of the multiplier control circuit DA42. The output of the gate circuits DA202 and DA203 is to a terminal DA205. A gate circuit DA203 is provided to recycle the information in the magnetic storage circuit 18 at a time when differential analyzing is not in process or when no ΔX digit is present during a particular operation. The information from the magnetic storage circuit 18 may then be applied to the terminal DA205 via the gate circuit DA203 when the signals *n*DA100 and *n*DA132 are high.

Figure 44:
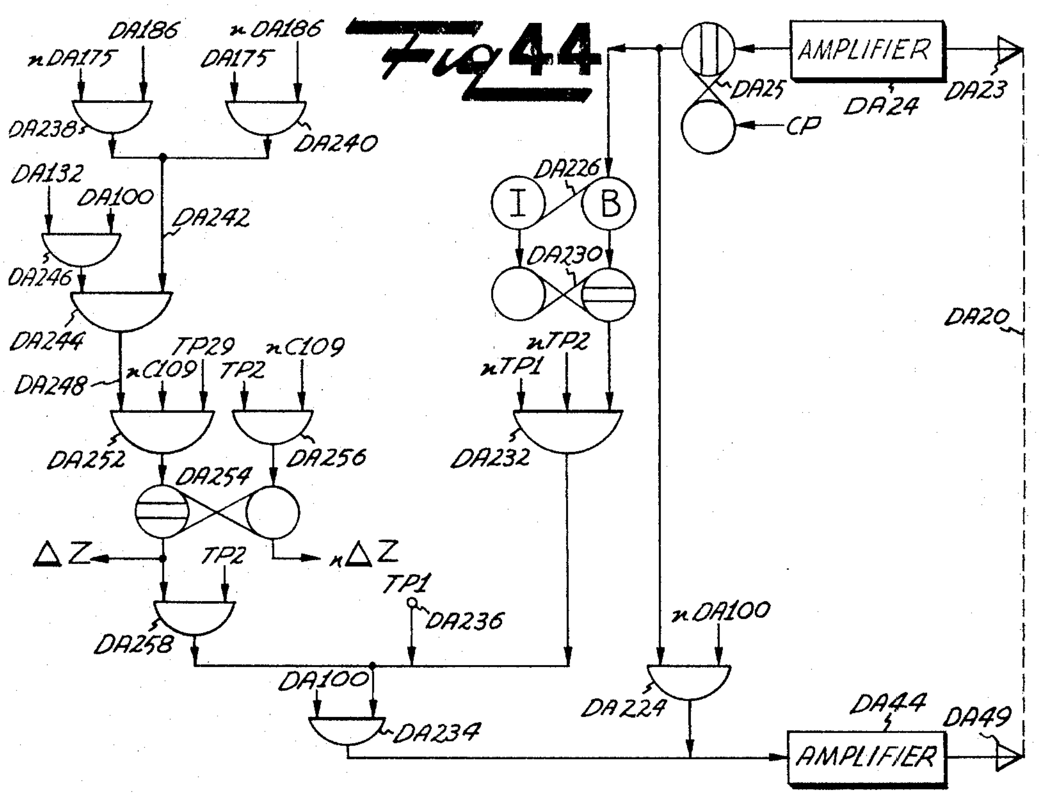
FIGURE 44 shows a symbolic block diagrammatic representation including a showing of a recirculation control circuit.

Reference will now be had to FIGURE 44 which shows the manner in which information from the magnetic drum channel DA20, passing through the flip-flop circuit DA25, is removed either to be recirculated, or to be utilized in the integrating circuit, and includes a showing of the recirculation control circuit DA26. The gate circuits DA50, DA52, DA54, and DA56 of FIGURE 38 which serve as the means to transfer numerical information from the early bus EB to the magnetic drum channel DA20 and from the magnetic drum channel DA20 to the late bus LB are not shown in FIGURE 41 as these circuits are not considered in the following description.

The information which is stored in the magnetic drum channel DA20 which is indicative of the presence of either a ΔY or a ΔX digit when coinciding in time with the proper numerical information from the magnetic storage circuits 15 or 16, is detected by means of the reading head DA23. The reading head DA23 is positioned adjacent to the magnetic drum channel DA20. The output from the reading head DA23 is coupled to an amplifier circuit DA24 wherein the numerical information read from the magnetic drum channel DA20 is amplified and then supplied to a flip-flop circuit DA25. The flip-flop circuit DA25 is set upon receiving digit information from the amplifier circuit DA24, and is reset when no digit information is so received by the application of a clock pulse CP to the flip-flop circuit DA25. The flip-flopt circuit DA25 is coupled to a gate circuit DA224 and to a buffer inverter circuit DA226.

The gate circuit DA224 is qualified by the absence of the "go" signal, i.e. *n*DA100, which indicates that the flip-flop circuit DA100 is in a reset state and that the machine is not performing differential analysis. At the time when the flip-flop circuit DA100 is in a reset state, i.e., the signal *n*DA100 is high, the differential analyzing process is not in operation, and therefore it is desired to cycle the information from the magnetic drum channel DA20 back to the magnetic drum channel DA20. The qualification of the gate circuit DA224, by the signal *n*DA100 being high, will allow the digit information from the flip-flop circuit DA25 to pass through the gate circuit DA224 to an amplifier circuit DA44, and thence to a writing head DA49 wherein the digit information will be rerecorded on the magnetic drum channel DA20

The digit information passing through the flip-flop circuit DA25 is also applied to the buffer inverter circuit DA226, which is in turn connected to a flip-flop circuit DA230. The digit output from the flip-flop circuit DA230 is applied to a gate circuit DA232, which is qualified during all periods except the intervals of timing pulses TP1 and TP2. The output from the gate circuit DA232 is applied to a gate circuit DA234 which is qualified by the "go" signal DA100. The output of the gate circuit DA234 is applied to the amplifier circuit DA44 to be recorded on the magnetic drum channel DA20. In consideration of the above described path of the information stored in the magnetic drum channel DA20, it may be seen, that the effect is to cycle the information; however, due to the action of the flip-flop circuit DA230, the path of the cycling numerical information has been increased by one bit time. The addition of one bit time to the path will cause the information to be precessed one digit position, i.e. bit, in the magnetic drum channel DA20. In addition, due to the qualifying factors of the gate circuit DA232, it is to be noted that no information will be cycled during the times of the timing pulses TP1 or TP2. The effect therefore during periods of differential analysis, is to cycle the numerical information in the magnetic drum channel DA20 precessing it one digit position, and leaving blanks in digit positions one and two.

During the first digit position, coinciding in time to the timing pulse TP1, the timing pulse TP1 will be applied to the terminal DA236. The application of the timing pulse TP1 to the terminal DA236 causes a high signal to be passed through the gate circuit DA234 to place a one digit in the first digit position of each word. This digit is to be utilized in setting a ΔX value in the ΔX register at the beginning of each word.

The operation of the system of FIGURE 44 discussed to this point, may now be seen, during the period of the differential analyzing process, to be to precess the digits in the magnetic drum channel DA20 by one digit position, but to place a digit in the digit position one and to leave the digit position 2 empty. The digit position 2 is reserved for the ΔZ digit information resulting from not the last, but the next to last performed functional operation. The explanation of the utilization of the second digit position to receive the result of the previous functional operation, including an integrating operation and a multiplying operation shall be considered later; however, it may now be noted that the ΔX digit information resulting from the last functional operation, i.e., integration and multiplication, will be stored in a flip-flop circuit DA254 of FIGURE 44, and then inserted in the second digit position of magnetic drum channel DA20 during the next functional operation.

Consider now the operation of the gate circuits DA238 and DA240. The gate circuits DA238 and DA240 function to detect the presence of a carry digit from the addition of the values of Y and R which will indicate a ΔZ digit. The output from the gate circuits DA238 and DA240 is later qualified by the timing pulse TP29. There are two possibility conditions which indicate the occurrence of a carry digit. A carry digit will be indicated if a digit exists in the carry flip-flop circuit DA186 of the $R+Y$ adder in the 29th digit position if the Y quantity were added, i.e., uncomplemented to the R quantity. A carry digit will also be indicated when no digit exists in the carry flip-flop circuit DA186 of the $R+Y$ adder in the 29th digit position if the Y quantity is subtracted, i.e. complemented prior to addition, from the R quantity. Whether the Y quantity was not or was complemented is indicated by the absence or presence respectively of a high signal applied to the buffer inverter DA175 of the $\Delta Y+Y$ adder during the 29th digit position.

The gate circuit DA238 is qualified by the coincidence of a signal $n$DA175 and a signal indicating that the flip-flop circuit DA186 is in a set state. The flip-flop circuit DA186, which is shown in FIGURE 43, is the carry flip-flop of the $R+Y$ adder, and therefore the presence of a digit in the flip-flop circuit DA186 indicates that there has been a carry digit produced by the addition. In the event the Y value added to the R value was uncomplemented, the signal $n$DA175 would be high, indicating that the voltage applied to the buffer inverter $n$DA175 is low at the time of the 29th digit position of odd words. The timing pulse TP29 and odd word times enter as a qualifying factor at a later point. The gate circuit DA238 will in this manner be qualified during a period of when there is a carry digit resulting from the $R+Y$ addition.

Consider now the manner in which the gate circuit DA240 will become qualified at a time when there has been a carry digit from the addition of the values Y and R. During the 29th digit position of odd words which later becomes a qualifying factor, if there is no digit in the flip-flop circuit DA186 which is the carry flip-flop circuit to the $Y+R$ adder circuit, and if there is a high signal from the buffer side of the buffer inverter DA175, which indicates that a complemented value of Y was added in the $Y+R$ adder, then the gate circuit DA240 will be qualified indicating there has been a carry digit formed.

It shall be understood that the gate circuits DA238 and DA240 indicate merely the occurrence of a carry digit which must be later qualified by other factors to indicate a ΔZ digit. It may now be seen that a high signal at the common output from the gate circuits DA238 and DA240 indicates the presence of a carry digit and the resulting signal will appear in the line DA242.

The presence of a high signal in line DA242 serves to qualify a gate circuit DA244 in part. The remainder of the gate circuit DA244 is qualified by the coincidence of the set states of the flip-flop circuits DA132 and DA100. The flip-flop circuit DA132 is in a set state when there is a ΔX digit present in the multiplier control circuit DA42 of FIGURE 38, therefore the signal DA132 will be high when there is a ΔX digit present. The flip-flop circuit DA100 is in a set state at a time when the "go" signal DA100 is high. The qualification of the gate circuit DA246 by the above two signals therefore accomplishes the full qualification of the gate circuit DA244. The output signal from the gate circuit DA244 which appears in the line DA248 further indicates the presence of a carry digit from the addition of the values Y and R. This digit is passed to a gate circuit DA252 which is qualified during the 29th digit position of odd words, by reason of the fact that the gate circuit DA252 requires for qualification the signal $n$C109 being high at the time of the timing pulse TP29. The presence of a high signal in line DA248 during the 29th digit position of odd words will qualify the gate circuit DA252 and set a flip-flop circuit DA254. The signal $n$C109 qualifies the gate circuit DA252 at odd word times, and the timing pulse TP29 qualifies the gate circuit DA252 at the 29th digit position. The set state of the flip-flop circuit DA254 indicates a ΔZ digit from the last functional operation or KΔZ as shown with reference to FIGURE 37. Such a ΔZ digit representing the output from the last integration operation which was a multiplication, remains stored in the flip-flop circuit DA254 for one cycle of operation.

The flip-flop circuit DA254 is adapted to be reset by means of a gate circuit DA256 at the time of the second digit of the next odd word occurring after the setting of the flip-flop circuit DA254.

The digit stored by the set state of the flip-flop circuit DA254 is applied to a gate circuit DA258 which, at the next occurrence of the timing pulse TP2, becomes qualified. With the qualification of the gate circuit DA234, a ΔZ digit is passed to be recorded in the magnetic drum channel DA20 by means of the recording head DA228, to be recorded at the time of timing pulse TP2.

A consideration of the overall system shown in FIGURE 44 will indicate that during the period when the differential analyzing process is not in operation, the numerical information within the magnetic drum channel DA20 will simply be recirculated.

During the time when the differential analyzing process of the computer is in operation, the numerical information in the magnetic drum channel DA20 will be precessed one digit position each cycle by reason of the addition of the flip-flop circuit DA30 to the cycling path. The information, however, will not be precessed into the first or second digit positions. The first digit position will receive a one digit in every case to indicate, in part, a ΔX digit. The second digit position will receive a ΔZ digit from the previously performed functional operation if such a digit resulted. The ΔZ digit so recorded will have been temporarily stored in the flip-flop DA254. Any ΔZ digit from the current functional operation is recorded in the 29th digit position and is also now stored in the flip-flop circuit DA254 until the occurrence of the next cycle, at which time the stored digit will be placed again in the second digit position. A further consideration of the arrangement of numerical information in the magnetic drum channel DA20 will be made later in the specification to indicate the manner in which digits are so stored.

Figure 45:
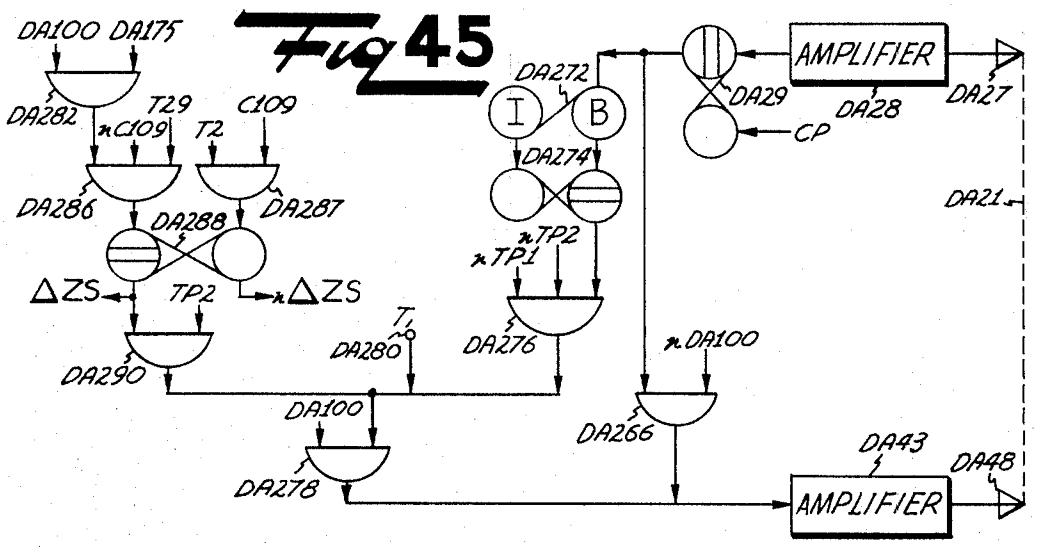
FIGURE 45 shows a symbolic block diagrammatic representation including a showing of a recirculation control circuit.

Reference will now be had to FIGURE 45 which shows the manner of control and utilization of the magnetic drum channel DA21 and includes a showing of the recirculation control circuit DA31. The gate circuits DA58, DA60, DA62, and DA64, of FIGURE 38 which serve to transfer information from the magnetic drum channel DA21 to the early bus EB, and from the late bus LB to the magnetic drum channel DA21, are not shown in FIGURE 42, because such circuits are not pertinent to the following discussion. It is to be noted that the system shown in FIGURE 45 is quite similar to that of FIGURE 44. The circuitry in each case is utilized to control a four-word magnetic drum channel. The magnetic drum channel DA20 shown in FIGURE 44 which was previously described, is utilized to store the presence of signals which, in coincidence with other signals, form a ΔY or a ΔX digit. The magnetic drum channel DA21 is utilized to indicate whether such a ΔY or ΔX digit shall be positive or negative. In the event a digit occurs in a particular position in the magnetic drum register DA21, such a digit will indicate by its coincidence with other digits from the ΔY or ΔX register that a positive ΔX or ΔY is under consideration.

The magnetic drum channel DA21 is adapted to be read by the magnetic head DA27 the output of which is amplified by an amplifier circuit DA28. The output from the amplifier circuit DA28 is connected to control a flip-flop circuit DA29 which is also connected to receive clock pulses CP in the usual previously described manner. The output from the flip-flop circuit DA29 is to a gate circuit DA266 and, when high, serves to qualify the gate circuit DA266 in part. The remaining part of the gate circuit DA266 is qualified by the "go" signal $n$DA100 which indicates that the differential analyzing process is inoperative. When the differential analyzing process is not in operation, the information detected by the reading head DA27 and amplified by the amplifier circuit DA28 will pass from the flip-flop circuit DA29 through the gate circuit DA266 to the amplifier circuit DA43 and thence to a writing head DA48 from which it will be recorded in the magnetic drum channel DA21.

When the differential analyzing system within the machine is computing, signals in the magnetic drum channel DA21 must be precessed one digit position per cycle in a manner similar to the digits in the magnetic drum channel DA20. To accomplish this precession, the output from the flip-flop circuit DA29 is coupled to a buffer inverter circuit DA272, which is in turn connected to a flip-flop circuit DA274. The output from the flip-flop circuit DA274 is applied to a gate circuit DA276, and thence to a gate circuit DA278. From the gate circuit DA278 digits may be applied to the amplifier circuit DA43 to be recorded on the magnetic drum channel DA21 by means of the recording head DA48. The addition of the flip-flop circuit DA274 to the cycling path increases the path by one digit position and precession is thus effected.

The gate circuit DA276 is disqualified during the time intervals of the first and second digit position when the signals $n$TP1 and $n$TP2 are not high. A gate circuit DA278 requires the presence of a high "go" signal DA100 to indicate that the differential analyzing process is in process. With the qualification of the gate circuits DA276 and DA278, digit information will be cycled with a one bit precession.

The timing pulse TP1 is applied at the terminal DA280 to cause a digit for indicating the presence of a positive ΔX or ΔY to always be present in the first digit position. The digit placed in the first digit position of each word serves to indicate that a ΔX indicated at the beginning of the word, shall be taken as a positive ΔX unless other digits appear to reverse such an indication.

Consider now the qualification of the gate circuit DA282. The gate circuit DA282 is qualified as to one part by the "go" signal DA100 being high. The gate circuit DA282 also requires for qualification, the presence of a signal DA175. It shall be recalled that the presence of a high signal DA175 at the time of the 29th digit position of an odd word (the latter conditions being applied as factors later), indicates that, in effect, the value of Y be subtracted from the value in the R register. A low signal DA175, i.e., a high signal $n$DA175, during the 29th digit position of odd words, indicates that an addition takes place between the values of $R+Y$.

It may therefore be seen that the gate circuit DA282 will be qualified at a time of operation of the differential analyzing process when a complemented value of Y is being added to the R value.

The high sign from the gate circuit DA282 indicating a negative carry digit is applied to a gate circuit DA286, which is qualified during odd words of the 29th digit position. The qualification of the gate circuit DA286 serves to set a flip-flop circuit DA288 in which a sign-indicating digit ΔZS is stored until the time of occurrence of the next second digit position, at which time the sign-indicating digit ΔZS will pass a gate circuit DA290 to be applied to and recorded in the magnetic drum channel DA21 after passing through the gate circuit DA278. The flip-flop circuit DA288 will be reset at the next time of the second digit position of an even word as indicated by the presence of high signal C109 and timing pulse TP2 to qualify the gate circuit DA287.

The function of the flip-flop circuit DA288, and its associated gate circuits is to place the sign-indicating digit ΔZS in the 29th digit position of a word in the magnetic drum channel DA21, and also to store the sign-indicating digit ΔZS until the occurrence of the next second digit position of a word, at which time the information will be placed in the second digit position of the magnetic drum channel DA21. The manner of filling and utilizing the information stored in the magnetic drum channel DA21 will be later described in greater detail; however, it is to be noted that the method of handling the digit ΔZS is similar to that of handling the digit ΔZ.

Figures 46, 47:
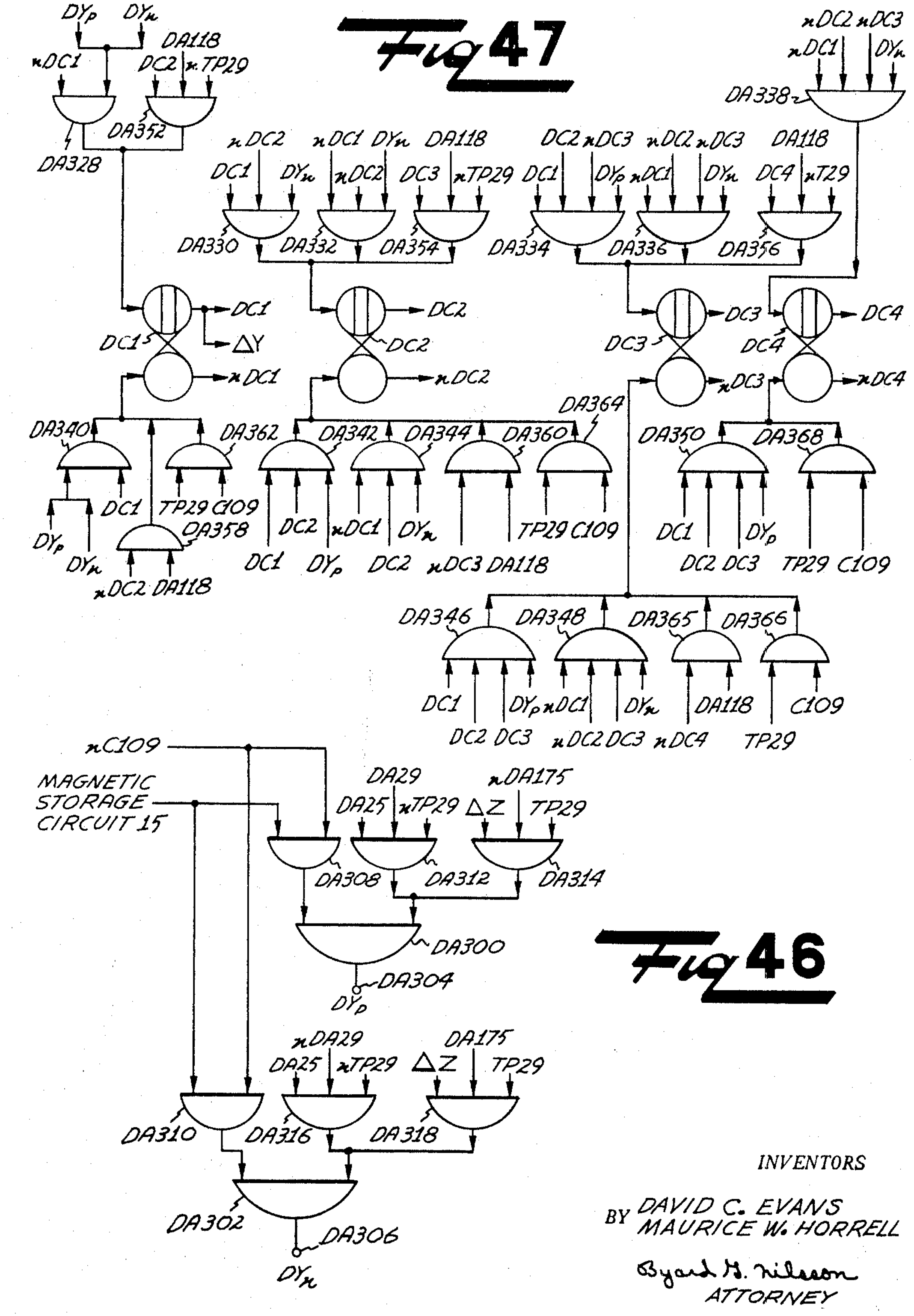
FIGURE 46 shows a symbolic block diagrammatic representation of a portion of a register.
FIGURE 47 shows a symbolic block diagrammatic representation of another portion of a register.

In the construction of the differential analyzing control circuits of the computer, it becomes a necessary function of a part of the ΔY register DA32 to form signals which are indicative of the sign and digit of the elemental increments of ΔY which are combined to form the ΔY value to vary the Y value which in turn is added to the R value. The gate circuits which are utilized to form a signal which indicates the presence and the sign of the ΔY digit are shown in FIGURE 46. There are shown in FIGURE 46, gate circuits DA300 and DA302. The presence of a high output signal $DY_p$ from the gate circuit DA300 indicates a positive elemental increment of ΔY. The output signal $DY_n$ from the gate circuit DA302 when high indicates an elemental increment of ΔY which is negative. The gate circuits DA300 and DA302 are both qualified in part by requiring the coincidence, of a high signal from the magnetic storage circuit 15 and a high signal $n$C109 which indicates that an odd word is in progress. The magnetic storage circuit 15 is utilized as a storage position to indicate in part the presence of an elemental increment of ΔY. Before an increment of ΔY will be indicated there must be a coincidence between a digit stored in the magnetic storage circuit 15 and a digit stored in the magnetic drum channel DA20. It is to be understood that the gate circuits DA308 and DA310 are utilized to detect the digits stored in the magnetic storage circuit 15 during odd words, the occurrence of which will partially indicate an elemental increment of a ΔY digit.

Consider now the qualification of the gate circuit DA300. The gate circuit DA300 requires for qualification the coincidence of high signals from the gate circuit DA308 and from either a gate circuit DA312 or a gate circuit DA314. The gate circuit DA312 is qualified by the coincidence of a high signal, i.e., digit, from the magnetic drum channel DA20, present in the flip-flop circuit DA25 and a digit from the magnetic drum channel DA21 present in the flip-flop circuit DA29, and the signal $n$TP29, which is high during all intervals except the 29th digit position. It shall be recalled, as previously explained, that the coincidence of three digit signals are required to indicate the presence of an element of a ΔY digit. Digit signals must coincide from the magnetic storage circuit 15, the magnetic drum channel DA20, and the magnetic drum channel DA21. This is true, however, only during the digit positions 0 to 28. It may therefore be seen that when the gate circuits DA312 and DA308 are fully qualified, a high signal $DY_p$ indicating a positive elemental increment of ΔY will be present at the terminal DA304.

The gate circuit DA300 may also be qualified by the gate circuit DA314 and the gate circuit DA308. The qualification of the gate circuit DA314 may occur only during the 29th digit position time. It may therefore be seen that the gate circuit DA314 is utilized to indicate the presence of a positive increment of ΔY during the 29th digit position. Such an increment of ΔY is the just-calculated ΔZ digit which may be used as an increment of a ΔY input to another stage of integration. The presence of a digit ΔZ during the timing pulse TP29, at a time when the signal $n$DA175 is high, will indicate that the just-calculated ΔZ digit was positive. It may therefore be seen that the output signal $DY_p$ at the terminal DA304 will be high at a time when a positive elemental increment of ΔY is present during any given digit time.

Consider now the manner of qualifying the gate circuit DA302, which will form a high signal $DY_n$ to appear at the terminal DA306 at a time when a negative elemental increment of ΔY is present.

The gate circuit DA302, requires for partial qualification, the qualification of the gate circuit DA310 which is qualified in a manner similar to the gate circuit DA308 by the coincidence of the presence of a digit from the magnetic storage circuit 15 during odd-word times when the signal $n$C109 is high. In adidtion to the qualification of the gate circuit DA310, the gate circuit DA302 requires for qualification, the qualification of either a gate circuit DA316 or a gate circuit DA318. The gate circuit DA316 is qualified by the persence of signals DA25 and $n$DA29 from the magnetic drum channels 20 and 21 during all time intervals except the time intervals of digit position 29.

The gate circuit DA316 thus becomes qualified by the coincidence of digit-indicating information in the magnetic drum channel DA20, and no digit-indicating information in the magnetic drum channel DA21 during all times except the 29th digit position. It shall be recalled that the coincidence of digit-indicating information from the magnetic drum channel 20 and the magnetic storage circuit 15 indicates the presence of an incremental $\Delta Y$ digit which is negative if there is no coinciding digit in magnetic drum channel DA21. The gate circuit DA316 may therefore be seen to become qualified during all periods other than the period of the 29th digit position when a negative increment of $\Delta Y$ has been indicated. The gate circuit DA318 is utilized for indicating that an increment of a negative $\Delta Y$ digit resulted from the integration just performed.

It is to be understood that the gate circuit DA314 and the gate circuit DA318 are in effect utilized for indicating the presence and sign of a $\Delta Z$ digit; however, the $\Delta Z$ digit is now being considered as an increment of a $\Delta Y$ digit since it is now being considered as an input to another process of integration and not as an output. The gate circuit DA318 will be qualified by the occurrence of a $\Delta Z$ digit when the signal DA175 is high during timing pulse TP29, indicating the formation of a negative $\Delta Z$ digit in the just performed operation. It may therefore be seen that the qualification of the gate circuit DA302 will indicate a negative increment of a $\Delta Y$ digit.

A consideration will now be made of the $\Delta Y$ register which is utilized to accumulate the increment of the $\Delta Y$ digits occurring during the odd word interval in order to form a value of $\Delta Y$ which may be added to the Y value during the integration process.

A diagrammatic representation of the $\Delta Y$ register is shown in FIGURE 47. The $\Delta Y$ register shown in FIGURE 47 comprises a four digit register consisting of four flip-flop circuits, DC1, DC2, DC3, and DC4. The digit-indicating, or set state indicating, output signals from the flip-flop circuits DC1, DC2, DC3, and DC4, will respectively as usual be termed DC1, DC2, DC3, and DC4. The use of multivbirators in counting circuits is well known as shown and described in a copending U.S. patent application, Serial No. 152,041, filed on March 12, 1950, by Floyd G. Steele; however, disclosure of the $\Delta Y$ counting circuit is made to complete the logical diagrammatic representations of the differential analyzer control circuits of the computer.

Due to the complexity of the diagrammatical representation of the register shown in FIGURE 47, there are set out below a set of logical equations which may be utilized in understanding the operation of the register shown in FIGURE 47.

$$DC1 = \text{to set } DC1 = nDC1\,(DY_p \overset{(1)}{+} DY_n) + (DC2 \cdot DA\overset{(2)}{1}18 \cdot nTP29)$$

$$nDC1 = \text{to reset } DC1 = DC1\,(DY_p \overset{(1)}{+} DY_n) + (nDC_2 \overset{(2)}{\cdot} DA118) + (TP29 \overset{(3)}{\cdot} C109)$$
$$DC2 = \text{to set } DC2 = (DC1 \cdot nDC2 \cdot DY_n) + (nDC1 \cdot nDC2 \cdot DY_n) + (DC3 \cdot DA118 \cdot nTP29)$$
$$nDC2 = \text{to reset } DC2 = (DC1 \cdot DC2 \cdot DY_p) + (nDC1 \cdot DC2 \cdot DY_n) + (nDC3 \cdot DA118) + (TP29 \cdot C109)$$
$$DC3 = \text{to set } DC3 = (DC1 \cdot DC2 \cdot nDC3 \cdot DY_p) + (nDC1 \cdot nDC2 \cdot nDC3 \cdot DY_n) + (DC4 \cdot DA118 \cdot nTP29)$$
$$nDC3 = \text{to reset } DC3 = (DC1 \cdot DC2 \cdot DC3 \cdot DY_p) + (nDC1 \cdot nDC2 \cdot DC3 \cdot DY_n) + (nDC4 \cdot DA118) + (TP29 \cdot C109)$$
$$DC4 = \text{to set } DC4 = (nDC1 \cdot nDC2 \cdot nDC3 \cdot DY_n)$$
$$nDC4 = \text{to reset } DC4 = (DC1 \cdot DC2 \cdot DC3 \cdot DY_p) + (TP29 \cdot C109)$$

A consideration of the equations shown above for the diagrammatical representation shown in FIGURE 47 will indicate that the states of the flip-flop circuits DC1, DC2, DC3, and DC4, will indicate the manner in which the increments of $\Delta Y$ are summed or accumulated to form a $\Delta Y$ value. To illustrate, assume that positive increments of $\Delta Y$ are being received. The positive increments of $\Delta Y$ will be detected by the gate circuit DA300 shown in FIGURE 46 and cause a high signal $DY_p$ to appear at the terminal DA304. The presence of a high signal $DY_p$ in the first equation above, coinciding with the fact that the flip-flop circuit DC1 is in a reset state which shall be assumed initially, will cause the flip-flop circuit DC1 to be set thereby providing a high signal DC1. Upon receipt of the next incremental $\Delta Y$ elemental signal, the flip-flop circuit DC1 will be reset by reason of the first term the second equation shown above. The following increment of $\Delta Y$ will serve to set the flip-flop circuit DC1, and set the flip-flop circuit DC2. Still another incremental $\Delta Y$ element will reset the flip-flop circuit DC1, reset the flip-flop circuit DC2, and set the flip-flop circuit DC3. In this manner the counting process will go on as is usual in the application of a group of flip-flop circuits to a counting device.

At a time when the increments of $\Delta Y$ are negative, subtraction will be effected from the content of the $\Delta Y$ register by varying the states of the flip-flop circuits DC1, DC2, DC3, and DC4.

Referring more specifically now to FIGURE 47, the flip-flop circuit DC1 may be set by means of the gate circuit DA328 to effect the addition and subtraction of the increments of $\Delta Y$. Similarly the flip-flop circuit DC2 will be set and reset by the gate circuits DA330 and DA332 to effect the counting operation. The setting of the flip-flop circuit DC3 for counting occurs by means of gate circuits DA334 and DA336. The setting of the state of the flip-flop circuit DC4 is effected by means of the gate circuit DA338. The qualification of the gate circuits, DA328, DA330, DA332, DA334, DA336, and DA338, is effected in accordance with the counting procedure outlined by the above equations; that is to say, as the counting process of the increments of $\Delta Y$ goes on, the accumulated value of the elements is held in these flip-flop circuits, in accordance with the states effected by qualifications of the gate circuits.

Similarly, the reset state of the flip-flop circuits DC1, DC2, DC3, and DC4, is effected by means of gate circuits DA340, DA342, DA344, DA346, DA348, and DA350. These gate circuits all have as one of the terms used the signal $DY_m$ or $DY_n$, indicating the occurrence of either a positive or a negative increment of $\Delta Y$. The other terms which are utilized to qualify the gate circuits are terms which depend upon the present states of the register. It may therefore be seen that depending upon the states of the register made up of the flip-flop circuits DC1, DC2, DC3, and DC4, upon the receipt of the elemental increments of $\Delta Y$ impulses, various of the states of the register flip-flop circuits will be rearranged to provide a new indication for the value of $\Delta Y$. The use of the flip-flop circuits DC1, DC2, DC3, and DC4, may therefore be seen to be in accordance with the usual manner of utilizing flip-flop circuits and gate circuits in combination to act as counters, or accumulating register circuits.

The flip-flop circuit DC4 is utilized to store the sign of the accumulated $\Delta Y$ value. In the event that the flip-flop circuit DC4 is in a set state, the sign will be indicated to be negative; conversely, in the event that the state of the flip-flop circuit DC4 is in a reset state, the sign of the accumulated $\Delta Y$ value shall be indicated as being positive.

Figures 48, 49:
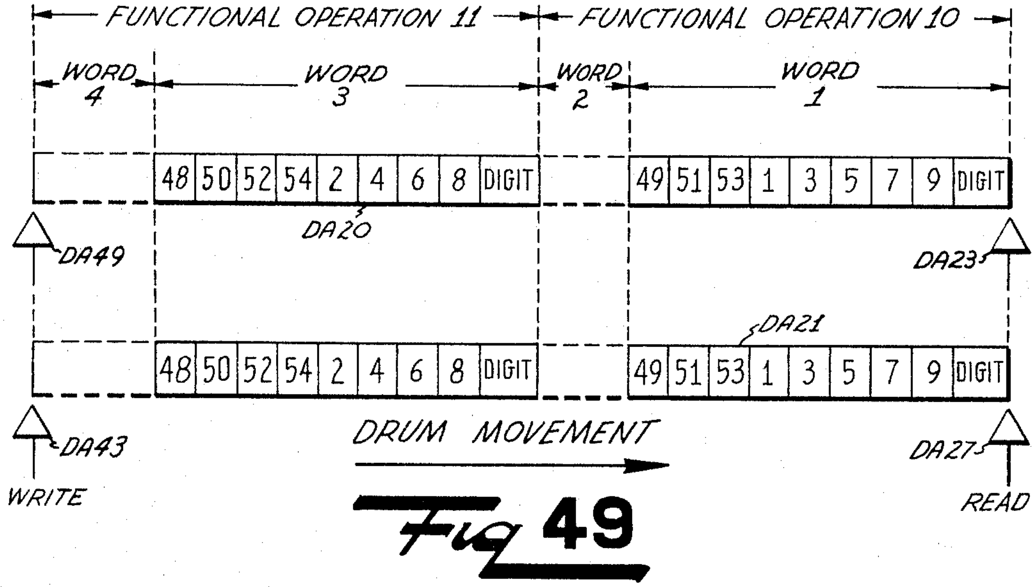
FIGURE 48 shows a chart illustrative of the manner of operation of a register.
FIGURE 49 shows a chart illustrative of the content of certain magnetic drum channels or registers.

The digits which are stored in the registers formed by the flip-flop circuits DC1, DC2, DC3, and DC4, are, of course, in binary form and a truth table is shown in FIGURE 48 indicating the states of the flip-flop circuits DC1 through DC4 during a representation of various numbers. It is to be noted that the negative numbers are stored in their complimentary form.

Referring now to the equations set out above, a consideration will now be made with reference to FIGURE 48, indicating the manner of removing the information from the ΔY register. In a general way, it may be said, that the digits stored in the flip-flop circuits DC1, DC2, DC3, and DC4, forming the ΔY register are shifted from the higher numbered flip-flop circuits to the lower numbered flip-flop circuits, such that the output ΔY value is taken from the flip-flop circuit DC1. In the event that a negative ΔY value has been stored in the ΔY register, the output from the ΔY register will provide the necessary complement, due to the fact that the flip-flop circuit DC4 will remain in a one indicating, i.e. set state, during the higher digit positions, therefore, a series of ones in the more significant digit positions will be formed to give the complement. The gate circuits DA352, DA358, DA364, DA360, DA356, and DA365 are utilized for shifting the digits in the register to the flip-flop circuit DC1, from which the ΔY digits may be taken. It shall be noted that each of these gate circuits is qualified by the signal DA118 which is high during the time when it is desired to add the ΔY value to the Y value. Each of the gates are also qualified by the presence of a digit in a flip-flop circuit higher in number than the flip-flop circuit effected by the gate under consideration. To review, the terms applied to the gates set out above have the effect of precessing the digits stored in the flip-flop circuits to the next lower numbered circuit, i.e., the state of the flip-flop circuit DC4 will be precessed into the flip-flop circuit DC3. In this manner the fourth digit coming out of the register is the most significant digit, or that which was stored in the flip-flop circuit DC4. In the event that this most significant bit is a zero, zeros will be propagated to the output and appear in the more significant digit positions of the addition of Y to ΔY. If the bit stored in the flip-flop circuit DC4 is a zero, then a positive ΔY value is indicated and after the most significant digit has passed, zeros will continue to be passed from the flip-flop circuit DC1, due to the flip-flop circuit DC4 remaining in a reset state, which occurred when the register indicated ΔY. If, however, the contents of the ΔY register were negative and a digit was present in the flip-flop circuit DC4, i.e., the flip-flop circuit DC4 was set, then one digits would be precessed from the flip-flop circuit DC4 through the flip-flop circuits of the register and out of the flip-flop circuit DC1 indicating one digits in the higher digit positions of the ΔY value which will result in a complementary form of the negative ΔY value. There is, therefore, no provision made for cancelling the digits stored in the flip-flop circuit DC4 until such time as it is desired to reset the ΔY register or counter.

The ΔY register is reset by means of the gate circuits, DA362, DA364, DA366, and DA368, at the time of the timing pulse TP29 during even word times.

From the above detailed description, it may be seen that the logical circuits shown in the various diagrammatic representations will serve to perform the functional operations outlined with respect to FIGURE 35, such that integration is repeatedly performed followed by multiplication. A discussion will now be made of the manner in which the digit and sign-indicating information digits are stored respectively in the magnetic drum channels DA20 and DA21.

The magnetic drum channels DA20 and DA21 are graphically represented in FIGURE 49. In the four word magnetic drum channels DA20 and DA21, information is stored only in the two even word portions of the channels. During the first digit position of word one, a digit will be placed in channels DA20 and DA21 which may be used to indicate a presence of a positive ΔX or an increment of ΔY. The digit is placed every cycle and is used to assume the presence of a ΔX. In the event it is desired to not have a ΔX digit occur, a negative ΔX digit must be positioned in the program later in the line. The digit is shown positioned in the first digit position indicated at the extreme right hand side of the channels DA20 and DA21 during every odd word time.

In the assumed state shown by the FIGURE 49, the machine is in process of performing a functional operation, labelled functional operation 10, which includes one integration and one multiplication of the result of the integration. Due to the delay effected by an additional multivibrator as previously described, during operation, the information contained in the channels DA20 and DA21 will be precessed one digit to the left during each functional operation. Exceptions occur, however, as to the digit positions one and two, the first two digit positions on the right in each odd word of the channels DA20 and DA21. As to the first digit position, the digit is inserted each word time so that there is always a digit placed in the first digit position. As to the second digit position, the result of the prior functional operation, which has to this time been stored for one word time, will now be inserted in the second digit position. During the time when an even numbered functional operation is in progress, including an odd and an even word, an odd operation result is being stored in the flip-flop circuits DA288 and DA254. These are the flip-flop circuits which store the result of the last integration until the next proper word position occurs in the channels DA20 and DA21. It may therefore be seen that during functional operation 10, the digits of the prior operations 1, 3, 5, 7, and 9, are passing under the read heads DA32 and DA27 to be delayed by one bit and inserted in word 5, in a precessed manner. After functional operation 10 has been performed, the results of the functional operation 10 will be stored in a flip-flop circuit as previously described, and the next word, word 3, as shown in FIGURE 49, will be considered. As the second digit position of word 3 passed under the write heads, DA43, and DA49, the digit previously stored resulting from functional operation 8 was placed in the digit position 2 of the word 3.

The pattern set up in the magnetic drum channels DA20 and DA21 is such as to fill the first word of the four word channel with the results of odd functional operations, and to fill the third word of the four word register with the results of even functional operations. The machine programmer may thus, as in a manner described in a previously referenced patent application of Steele et al., interlock the functional operation results by means of programming.

*Summary*.—It may be seen from a consideration of the above detailed description, that a system is provided within the computer for performing the function of differential analysis by means of the cooperative action of various function performing systems, including the differential analyzing control circuits, the control circuits, and certain of the magnetic storage circuits. The differential analyzing control circuits function as an auxiliary control and information handling circuit with respect to certain other portions of the overall computer to perform the integration. Processes of integration are repeatedly performed in an interlocked fashion, in such a manner as to perform the analysis of a differential equation in accordance with programmed instructions.

INPUT-OUTPUT SYSTEM

Figure 50:
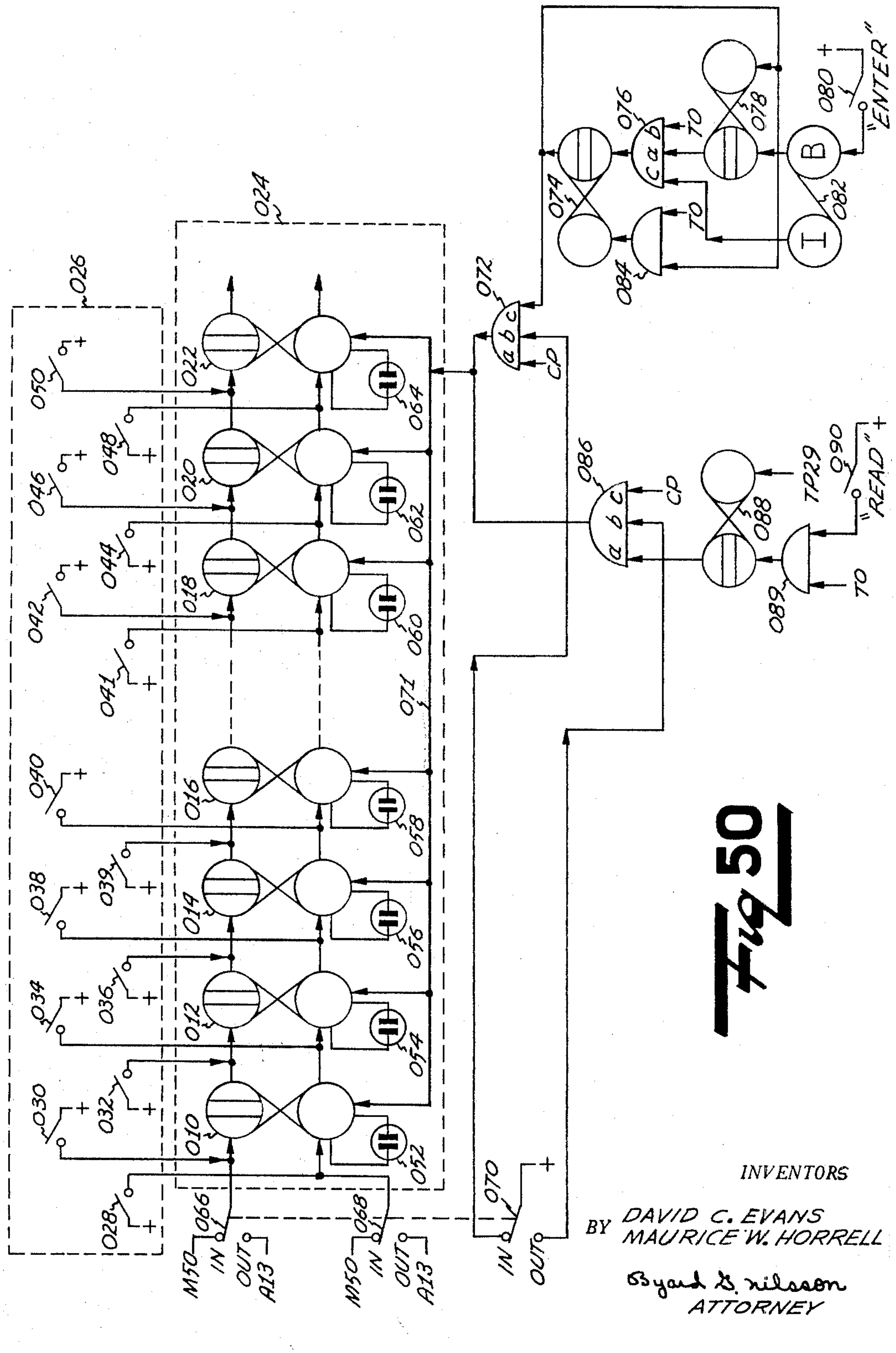
FIGURE 50 shows a symbolic block diagrammatic representation of an input-output circuit.

Reference will now be had to FIGURE 50 which shows the details of the input-output circuit. FIGURE 50 shows a row of interconnected flip-flop circuits, including flip-flop circuits 010, 012, 014, 016, 018, 020, and 022, which are shown. This row of flip-flop circuits including the flip-flop circuits 010, 012, 014, 016, 018, 020, and 022, forms a flip-flop register 024 which consists of 29 such flip-flop circuits. Words of 29 bits to be transferred into the computer are set up in the flip-flop register 024 by means of a manual switching system 026 which includes switches 028, 030, 032, 034, 036, 038, 039, 040, 041, 042, 044, 046, 048, and 050. Two switches are provided in the manual switching control circuit 026, for each of the flip-flop circuits in the flip-flop register 024. Each of the switches in the switching control circuit 026 may, therefore, be utilized either to set or to reset one of the flip-flop circuits in the flip-flop register 024. Each flip-flop circuit in the flip-flop register 024 has associated with it, a glow discharge tube, as for example, glow discharge tubes 052, 054, 056, 058, 060, 062, and 064. At a time when a digit is contained in one of the flip-flop circuits, that is, when one of the flip-flop circuits is set, the glow discharge tube associated with that particular flip-flop circuit will glow. The glow discharge tubes are, in fact, connected to the plate circuit of one of the vacuum tubes which makes up the flip-flop circuit in such a manner that when the flip-flop circuit is set, the plate to which the glow discharge tube is connected will be carrying sufficient current to cause the glow discharge tube to glow and thereby indicated the presence of the digit.

Consider now the method of inserting a word into the computer by means of the input-output circuits as shown in FIGURE 50. The digits of the word to be entered in the computer are individually entered bit-by-bit into the 29 flip-flop circuits of the flip-flop register 024. That is to say, in the event it is desired to have a digit in the bit position 29, the momentary contact switch 030 will be manually closed, thereby applying a positive potential to the flip-flop circuit 010. In this manner, the flip-flop circuit 010 will be placed in a set state to indicate the presence of a digit in bit position 29 of the word contained in the flip-flop register 024. To further illustrate the manner of operation, assume that it is desired to place a 0 bit in the 28th digit position of the word to be entered in the computer. To place a 0 bit in the 28th digit position, the switch 034 will be momentarily closed, thereby applying a positive potential to the flip-flop circuit 012, in such a manner as to cause the flip-flop circuit 012 to be reset. The other switches in the switching control circuit 026 may be similarly operated in such a manner as to place the desired bits of a word in the flip-flop register 024. It shall be noted that the one digits placed in the flip-flop register 024 will indicate their presence by causing the glow discharge tubes associated with each of the flip-flop circuits in the register 024 to glow.

After setting the desired word in the flip-flop register 024, by means of the switching control circuit 026, the mechanically intercoupled switches 066, 068, and 070, are placed in the raised or "in" position. The switches 066 and 068 connect the flip-flop circuit 010 to the flip-flop circuit M50 (not shown in FIGURE 50). The flip-flop circuit M50 is the output flip-flop circuit from the command-storing magnetic storage channel 0. It may therefore be seen that information circulating within the magnetic storage register 0, will be applied by means of the manually operated switches 066 and 068 to the flip-flop circuit 010.

The flip-flop circuits contained in the flip-flop register 024 are not provided with the usual clocking pulses to shift the digits through the register; however, digits are shifted in the flip-flop register 024 in a manner similar to that previously explained with reference to the index control circuits. The digits contained in the flip-flop register 024 may be shifted only upon the presence of shifting pulses which are applied to the flip-flop circuits of the register 024, via a line 071.

With the flip-flop circuit 010 connected to the flip-flop circuit M50, the flip-flop register 024 is connected to the magnetic storage channel 0; however, there will be no digit information transferred into the flip-flop register 024, until such time as the shifting pulses are received via the line 071.

The output from the flip-flop circuit 022 of the flip-flop register 024 is connected to a gate circuit M64 (not shown in FIGURE 47) which is associated with the magnetic storage channel 0, and serves as the gate circuit utilized to place information into the magnetic storage circuit 0. It may therefore be seen that with the interconnected switches 066, 068, and 070, in the raised or "in" position, the flip-flop circuits of the flip-flop register 024 will be effectively serially connected with the magnetic storage circuit 0. The application of shifting signals to the line 071 will therefore cause digit shifting to occur in the flip-flop register 024, to thereby transfer the digits in the flip-flop register 024 into the magnetic storage circuit 0.

The shifting signals are derived through a gate circuit 072. The gate circuit 072 will be qualified as to its part *b* by switch 070 being in the raised or "in" position. The gate circuit 072 (which may be a vacuum tube gate) is qualified as to its part *c* by the flip-flop circuit 074 being in a set state. The flip-flop circuit 074 is coupled in such a manner as to be placed in a set state during one full period of a magnetic memory cycle, i.e. 108 word times. It may therefore be seen that the gate circuit 072 will be qualified during a 108 word period, as to its part *c*. With the qualification of the gate circuit 072 as to parts *b* and *c*, clock pulses applied to the part *a* of the gate circuit 072 will pass to the line 071 and thereby allow the shifting of the digits through the flip-flop register 024.

The manner of setting the flip-flop circuit 074 for exactly one memory cycle is substantially as the following. The flip-flop circuit 074 will be set by the qualification of a gate circuit 076. The gate circuit 076 becomes qualified as to its part *b* at a time when the flip-flop circuit 078 is placed in a set state. The flip-flop circuit 078 is placed in a set state by means of a manual "enter" switch 080 which is connected to apply a positive voltage through a buffer inverter circuit 082 to the flip-flop circuit 078. The "enter" switch 080 is to be depressed at the time when the digits making up a word, desired to be placed in the computer, have been set up in the flip-flop register 024. The gate circuit 076 is further qualified as to its part *c* by a high signal from the buffer inverter circuit 082, to indicate that the "enter" switch 080 has been released. The requirement for the high signal from the inverter side of the buffer inverter 082 makes the period during which the manual "enter" switch 080 is in a made state immaterial, but requires that the "enter" switch 080 is released. With the qualification of the gate circuit 076 as to its parts *a* and *c*, the signal T0, indicating the beginning of a memory signal, as has been previously explained, may pass through the gate circuit 076 and set the flip-flop circuit 074. With the setting of the flip-flop circuit 074, the flip-flop circuit 078 wil be reset preparatory to another entering operation. The flip-flop circuit 074 will be reset by means of the gate circuit 084. The gate circuit 084 becomes qualified to reset the flip-flop circuit 074 at the next occurrence of the signal T0 high, after the setting of the flip-flop circuit 074. It may therefore be seen that the flip-flop circuit 074 upon the closing of the "enter" switch 080, will be placed in a set state for exactly one memory cycle, i.e. 108 words, or from the occurrence of one T0 signal high until the next occurrence of the signal T0 high.

The numerical information contained in the flip-flop register 024 will thus be entered in the magnetic storage circuit 0, because of the presence of the shifting pulses on the line 071. As previously described with the application of shifting pulses to the line 071, the numerical information appearing at the flip-flop circuit 010 of the flip-flop register 024 will be shifted, a flip-flop at a time. The shifting through the interconnected flip-flop circuits will be in such a manner as to fully occupy the flip-flop register 024, and at the same time the information contained in the flip-flop register 024 will be shifted into the magnetic storage circuit 0 via the flip-flop circuit 022. The information which has been set up in the flip-flop register 024 will thus be transferred into word position 108 of the magnetic storage circuit 0. The entry of another word will cause the word previously entered to be shifted into word position 107 and will set the last word entered into word position 108. The entry of further words will eventually fill the magnetic storage circuit 0.

At a time when numerical information is being removed from the computer, the interconnected switches 066, 068, and 070 are placed in the down position. With these switches in the down or "out" positions, the flip-flop register 024 is connected to the flip-flop circuit A13 (not shown in FIGURE 50), which is the output flip-flop for numerical information from the accumulator circuit.

During the time when information is being read from the accumulator circuit of the computer, the shifting pulses are applied to the line 071 by means of a gate circuit 086. The gate circuit 086 is qualified as to its part *a* during the first word of a memory cycle of 108 words, which coincides to the set state of a flip-flop circuit 088. The flip-flop circuit 088 is placed in a set state by the signal T0 being high, which occurs at the beginning of each memory signal, to qualify a gate circuit 089 when a "read" switch 090 is depressed. The "read" switch 090 is depressed during the interval when it is desired to execute the movement of the information from the computer to the flip-flop register 024. The flip-flop circuit 088 is reset by the occurrence of a timing pulse TP29 occurring at the end of the word. It may therefore be seen that the flip-flop circuit 088 will be placed in a set state for the first word time of each memory cycle when the "enter" switch 090 is depressed. The gate circuit 086 is qualified as to its part *b* at a time when the switch 070 is placed in an "out" position. With the qualification of the gate circuit 086, as to its parts *a* and *b*, the clock pulses CP, applied at the part *c* of the gate circuit 086, will be passed onto the line 071 to become the shifting pulses to effect the digit shifting from the accumulator circuit to the flip-flop register 024.

When the mechanically intercoupled switches 066, 068, and 070 are in the "out" position, the flip-flop circuit 010 is connected to the flip-flop circuit A13. The flip-flop circuit A13 is the flip-flop circuit of the accumulator circuits through which numerical information in the accumulator circuits circulates. It may therefore be seen that the first word time of a memory cycle will see the movement of a word formerly stored in the accumulator circuit into the flip-flop register 024. The content of the flip-flop register 024 may be read by means of the glow discharge tubes associated with the register 024. In this manner, information is taken from the computer by placing such numerical information in the accumulator circuit, and then transferring the numerical information into the flip-flop register 024.

In the consideration of the operation of the above described system, numerical information which is to be transferred into the computer will be set up in a flip-flop register 024, by means of manually operated switches in the switching control circuit 026, including switches 028, 030, 032, 034, 036, and 038. Once the information has been so set up in the flip-flop register 024, the operation of the manually operated "enter" switch 080 will effect the transfer of the numerical information into an operating position within the computer, i.e. magnetic storage circuit 0. Similarly, information is removed from the computer by transferring the information into a particular location, i.e., word one of the accumulator circuits, and then shifting the information into the flip-flop register 024 from which it may be read by means of a group of glow discharge tubes including tubes 052, 054, 056, and 058.

*Summary.*—A consideration of the above description will reveal that an input-output circuit is provided for the computer which comprises a register capable of holding one numerical word. Glow discharge tubes are associated with the register for indicating its contents and switches are associated with the register for manually varying its contents. The input-output system is provided with associated circuitry for transferring numerical information between the register and operative locations within the computer.

CONCLUSIONS

From the above specification, it may be seen that the applicants have provided an improved electronic computing system. This improved electronic computing system will find advantageous application for the solution of complex mathematical problems in that differential analysis type computing, performed by iterative processes of integration, may be associated with general type computing, comprising various arithmetic processes, to result in simplified mathematical programming.

Applicants' computing system also provides an advantageous means of control wherein continuous adjustment of various factors is required. In such a control application, arithmetic combining processes including: logical operations, division, multiplication, addition, and subtraction, may be utilized to analyze a situation, make decisions, and establish initial conditions. The processes of integration may then be utilized to provide the continuous adjustment required.

Although for the purpose of explaining the invention a particular embodiment thereto has been shown and described, obvious modification will occur to a person skilled in the art, and, we do not desire to be limited to the exact details shown and described.

Having thus described the invention, what is claimed is:

1. In a computing apparatus operating under control of program means according to variable program data signals registered therein: a plurality of storage sections for storing signal representations of numerical information; arithmetic circuit means for performing arithmetic and logic functions upon signal representations of numerical information; integration control means for operating upon signal representations of numerical information in such a manner as to effect the performance of the function of integration upon numerical information; and control means for selectively transferring signal representations of numerical information between said storage sections, said arithmetic circuit means, and said integration control means according to said program data.

2. A computing system comprising: a plurality of storage means for storing signal representations of numerical information; arithmetic circuit means for performing arithmetic and logic operations with respect to signal representations of numerical information whereby to form representations of the results of said arithmetic operations; integration control means for combining signal representations of numerical information such as to effect the performance of the process of integration of numerical information so combined whereby to form representations of results of said process of integration; an input-output system adapted to receive and transmit various signal representations of numerical information; and transfer means for selectively effecting the movement of signal representations of numerical information between said storage means, said arithmetic circuit means, said integration control means, and said input-output system.

3. In a computing apparatus operating under control of program means according to variable program data signals indexed therein: storage means including a plurality of storage sections for storing signals representative of numerical information; means for deriving sets of discrete electrical signals from each of said storage sections, said sets of discrete electrical signals being digitally representative of numerical values; arithmetic circuit means for combining certain sets of discrete electrical signals to form other sets of discrete electrical signals, said other sets of discrete electrical signals being digitally representative of arithmetic and logic combinations of numerical values represented by said certain sets of discrete electrical signals; integration control means for interconnecting predetermined of said storage sections in such a manner as to combine sets of discrete signals derived from said predetermined of said storage sections to form sets of discrete electrical signals representative of products of the process of integration performed with respect to said sets of said discrete electrical signals derived from said predetermined of said storage sections; and computer control means for selectively effecting the transfer of sets of discrete electrical signals between said storage sections, said arithmetic circuit means and said integration control means according to said program data.

4. In a computing apparatus operating under control of program means according to variable program data signals indexed therein: storage means including a plurality of storage sections for storing numerical information; means for deriving sets of discrete electrical signals from each of said storage sections, said sets of discrete electrical signals being digitally representative of numerical values; arithmetic circuit means for combining sets of discrete electrical signals representative of numerical values, to form other sets of discrete electrical signals digitally representative of arithmetic and logic combinations of numerical values represented by said sets of discrete electrical signals so combined; integration control means for interconnecting predetermined of said storage sections in such a manner as to combine sets of discrete electrical signals derived from said predetermined of said storage sections to form certain sets of discrete electrical signals, said certain sets of discrete electrical signals being representative of products of the process of integration performed with respect to said sets of said discrete electrical signals derived from said predetermined of said storage sections; input-output means adapted to receive and transmit electrical signals representative of numerical information; and computer control means for selectively effecting the transfer of sets of discrete electrical signals between said storage sections, said arithmetic circuit means, said integration control means, and said input-output means according to said program data.

5. A computing system comprising: a plurality of storage means for storing numerical information, said storage means having means to form first electrical storage signals digitally representing various numerical information stored in said storage means; an arithmetic means for selectively combining predetermined of said first electrical storage signals in such a manner as to derive result second electrical signals, said result second electrical signals digitally representing a numerical result of arithmetic and logic functions performed relative to the numerical information represented by said predetermined of said first electrical storage signals; means for returning said result first electrical signals to certain of said storage means; integration control means for combining certain of said first electrical storage signals such as to form integrated third electrical signals digitally representing a numerical result of integrating functions performed relative to the numerical information represented by said certain of said first electrical storage signals; and means for returning said integrated third electrical signals to predetermined of said storage means.

6. A sytem useful for mathematical computing comprising: a plurality of storage means, said storage means having means to form electrical storage signals, said electrical storage signals being digitally representative of various stored numerical information; an arithmetic system, said arithmetic system for selectively combining certain of said electrical storage signals in such a manner as to form resulting electrical signals, said resulting electrical signals digitally representing the result of arithmetic and logic combinations of the numerical information represented by said certain of said electrical storage signals; integrating control means for effecting the process of integration, by selectively combining predetermined of said electrical storage signals to form electrical integrator signals digitally representing the product of integration processes performed with respect to the numerical information represented by said predetermined electrical storage signals and means for controlling the transfer of signals in said system and the operation of said arithmetic system and said integrating control means.

7. A computing system comprising: a plurality of cyclically operating numerical registers, said registers being such that numerical information contained in said registers sequentially becomes available in the form of discrete electrical signals; an arithmetic circuit for performing arithmetic and logic combinations of numerical information as represented by discrete electrical signals in such a manner as to form other discrete signals, said other discrete signals being representative of arithmetic and logic results of said arithmetic and logic combinations; an integration control system for effecting the performance of an integration with respect to predetermined numerical information represented by discrete electrical signals, whereby discrete electrical signals are formed which are representative of a product of integration resulting from said integration; and control means for effecting the transfer of signals within said system and controlling the operation of said arithmetic circuit and said integration control system.

8. A computing system comprising: a plurality of cyclically operating numerical registers, said registers being such that numerical information contained in said registers sequentially becomes available as discrete signals; an arithmetic circuit for performing logic and arithmetic combinations of numerical information represented by discrete electrical signals in such a manner as to form other discrete electrical signals, said other discrete signals being representative of arithmetic and logic results of said arithmetic combination; an integration control system for effecting the performance of an integration with respect to predetermined numerical information represented by discrete electrical signals, whereby discrete electrical signals are formed which are representative of a product of integration resulting from said integration; input-output means for converting numerical information into discrete electrical signals representative of numerical information, and for manifesting the numerical information indicative of discrete electrical signals; an interconnecting means for selectively interconnecting in accordance with a stored program, said plurality of cyclically operating numerical registers, said arithmetic circuit, said integration control system, said input-output system, and said interconnecting means.

9. A system useful for computing according to program signals comprising: a plurality of storage means for storing signal-represented numerical data; entry and exit means for said storage means for selectively transferring signal-represented numerical data into and out of each of said storage means; an early bus connected to each of said exit means and a late bus connected to each of said entry means; a sign control circuit coupled between said late bus and said early bus for selectively complementing certain signal-represented numerical data; and arithmetic circuit means coupled between said early bus and said late bus for performing plural arithmetic operations upon signal-represented numerical data; transfer means for registering program signals and for gating the transfer of signal-represented numerical data to said early bus and from said late bus; and an integration circuit for selectively interconnecting certain of said storage means according to said program signals such as to effect the process of integration with respect to signal-represented numerical data indexed in said certain of said storage means.

10. In a computing apparatus operating under control of variable program data signals: storage means including a number of storage sections for storing signals representative of numerical information; means for deriving sets of discrete electrical signals from each of said storage sections, said sets of discrete electrical signals being digitally representative of numerical values; a sign control circuit for complementing selected sets of discrete electrical signals to form other predetermined sets of discrete electrical signals, said other predetermined sets of elestrical signals being digitally representative of the complement of numerical values represented by said selected sets of discrete electrical signals; arithmetic circuit means for combining certain sets of discrete electrical signals to form other sets of discrete electrical signals, said other sets of discrete electrical signals being digitally representative of logic and arithmetic combinations of numerical values represented by said certain of discrete electrical signals; integration control means for interconnecting predetermined of said storage sections in such a manner as to combine plural sets of discrete signals derived from said predetermined of said storage sections to form sets of discrete electrical signals representative of products of the process of integration performed with respect to said plural sets of said discrete electrical signals; and computer control means for selectively interconnecting said storage sections, said sign control circuit, said arithmetic circuit means, and said integration control means.

11. A computing system comprising: storage means for storing plural signals representative of numerical information; arithmetic means for combining signals representative of numerical information to provide signals representative of the results of arithmetic manipulations, upon the numerical information represented by the signals so combined; integrating means for operating upon signals representative of numerical information to provide signals representative of the products of integration of the numerical information represented by the signals operated upon; and signal-controlled means for selectively transferring signals between locations in said storage means, said arithmetic means, said integrating means, and said signal-controlled means.

12. A computing system comprising: storage means for storing plural signals representative of numerical information; arithmetic means for combining signals representative of numerical information to provide signals representative of the results of arithmetic and logic manipulations upon the numerical information represented by the combined signals; integrating means for operating upon signals representative of numerical information to provide signals representative of the products of integration of the numerical information represented by the signals operated upon; and signal-controlled means for selectively transferring signals between locations in said storage means, said arithmetic means, said integrating means, and said signal-controlled means.

13. Apparatus according to claim 11 wherein said integrating means comprises means for operating upon signals registered in said storage means whereby to provide a plurality of functional integrators; and wherein said signal-controlled means includes means for selectively transferring signals between said functional integrators.

14. A computing system comprising: storage means for storing plural signals representative of numerical information; arithmetic means for combining signals representative of numerical information to provide signals representative of the results of arithmetic and logic manipulations upon the numerical information represented by the combined signals; integrating means for operating upon signals representative of numerical information to provide signals representative of the products of integration of the numerical information represented by the signals operated upon; and means for selectively transferring signals between said storage means, said arithmetic means and said integrating means in accordance with a variable program of operation.

15. Apparatus according to claim 14 wherein said signal-controlled means includes means for selectively transferring signals between said functional integrators.

16. A computing system comprising: storage means for storing plural signals representative of numerical information; arithmetic means for combining signals representative of numerical information to provide signals representative of the results of arithmetic and logic manipulations upon the numerical information represented by the combined signals; integrating means for operating upon signals representative of numerical information to provide signals representative of the products of integration of the numerical information represented by the signals operated upon; and signal-controlled means for transferring signals from one of: said storage means, said arithmetic means, said integrating means, to one of: said storage means, said arithmetic means, said integrating means.

17. Apparatus according to claim 16 wherein said integrating means comprises means for operating upon signals registered in said storage means whereby to provide a plurality of functional integrators; and wherein said signal-controlled means includes means for selectively transferring signals between said functional integrators.

18. A computing system comprising: storage means for storing plural signals representative of numerical information; arithmetic means for combining signals representative of the results of arithmetic manipulations upon the numerical information represented by the signals so combined; logic means for combining signals representative of the result of logic manipulations upon the numerical information represented by the signals so combined; integrating means for operating upon signals representative of numerical information to provide signals representative of the products of integration of the numerical information represented by the signals operated upon; and signal-controlled means for selectively transferring signals between locations in said storage means, said logic means, said integrating means and said signal-controlled means.

19. In combination, means for providing signals representing instructions; means responsive to such instructions for receiving signal information representing the values of particular quantities in accordance with such instructions; means responsive to the signal indications from the instruction means for performing arithmetical operations including addition, substraction and multiplication on the received information in accordance with such instructions and for producing signal indications representing the values of the resultant quantities; means for providing a plurality of integrators, means for providing for each integrator in the plurality signal indications representing a dependent quantity, signal indications representing variations in an independent quantity and signal indications representing the cumulative value of an output quantity resulting from the differential combination of the dependent quantity and the variations in the independent quantity for that integrator; and means responsive to the signal indications from the instruction means and from the last two mentioned means for introducing the resultant signal indications from the arithmetical operations to particular integrators in the plurality in accordance with the instructions to serve as the dependent quantities for such particular integrators.

References Cited by the Examiner

UNITED STATES PATENTS

| | | | |
|---|---|---|---|
| 2,604,262 | 7/1952 | Phelps et al. | 235—61 |
| 2,609,143 | 9/1952 | Stibitz | 235—61 |
| 2,701,095 | 2/1955 | Stibitz | 235—61 |
| 2,737,342 | 3/1956 | Nelson | 235—61 |
| 2,749,037 | 6/1956 | Stibitz | 235—61 |
| 2,767,908 | 10/1956 | Thomas | 235—61 |
| 2,770,797 | 11/1956 | Hamilton et al. | 235—61 |
| 2,787,416 | 4/1957 | Hansen | 235—61 |
| 2,789,759 | 4/1957 | Tootill et al. | 235—61 |
| 2,792,987 | 5/1957 | Stibitz | 235—61 |
| 2,800,277 | 7/1957 | Williams et al. | 235—61 |
| 2,850,232 | 9/1958 | Hagen et al. | 235—152 |

(Other references on following page)

FOREIGN PATENTS

| | | |
|---|---|---|
| 526,058 | 2/1954 | Belgium. |
| 736,144 | 9/1955 | Great Britain. |
| 1,055,460 | 10/1953 | France. |
| 1,056,750 | 10/1953 | France. |
| 1,084,147 | 6/1954 | France. |
| 1,094,570 | 12/1954 | France. |
| 1,095,026 | 12/1954 | France. |

OTHER REFERENCES

Bush et al.: A New Type of Differential Analyzer, Journal of The Franklin Institute, October 1945, vol. 240, No. 4, pages 255 to 326.

Description of a Relay Calculator: Harvard Univ. Computation Lab, 1949, pages 1 to 3, 7 to 10, 15, 16, 21, 22, 25, 26, 29, 30, 33, 34, 37 to 40.

Proc. of IRE "SEAC" by Greenwald, Oct. 1953, pages 1300–1312.

MALCOLM A. MORRISON, *Primary Examiner.*

L. M. ANDRUS, W. W. BURNS, Jr., C. D. ANGEL, A. BERLIN, L. SMILOW, *Examiners.*

G. SADOWSKY, H. P. HARTMAN, M. SPIVAK, *Assistant Examiners.*